United States Patent
Mabuchi

(10) Patent No.: US 10,868,981 B2
(45) Date of Patent: Dec. 15, 2020

(54) SHOOTING CONTROL APPARATUS, SHOOTING CONTROL METHOD, AND SHOOTING APPARATUS

(71) Applicant: SONY CORPORATION, Tokyo (JP)

(72) Inventor: Ken Mabuchi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/094,755

(22) PCT Filed: Mar. 9, 2017

(86) PCT No.: PCT/JP2017/009554
§ 371 (c)(1),
(2) Date: Oct. 18, 2018

(87) PCT Pub. No.: WO2017/187811
PCT Pub. Date: Nov. 2, 2017

(65) Prior Publication Data
US 2019/0124277 A1     Apr. 25, 2019

(30) Foreign Application Priority Data

Apr. 27, 2016   (JP) .................................. 2016-088783

(51) Int. Cl.
*H04N 5/351* (2011.01)
*G03B 17/02* (2006.01)
(Continued)

(52) U.S. Cl.
CPC ............... *H04N 5/351* (2013.01); *B60R 1/00* (2013.01); *B60R 11/02* (2013.01); *G03B 15/00* (2013.01);
(Continued)

(58) Field of Classification Search
None
See application file for complete search history.

(56) References Cited

U.S. PATENT DOCUMENTS 6,320,618 B1   11/2001   Aoyama
6,455,831 B1   9/2002   Bandera et al.
(Continued)

FOREIGN PATENT DOCUMENTS

JP    10-075397 A    3/1998
JP    10-75397 A     3/1998
(Continued)

OTHER PUBLICATIONS

Extended European Search Report of EP Patent Application No. 17789100.9, dated Feb. 28, 2019, 07 pages.
(Continued)

*Primary Examiner* — Daksesh D Parikh
(74) *Attorney, Agent, or Firm* — Chip Law Group

(57) ABSTRACT

There is provided a shooting control apparatus, a shooting control method for controlling operations of a shooting part mounted on a mobile object such as automobile, and a shooting apparatus mounted on a mobile object for use. A center region includes fine pixels, for high-resolution shooting. On the other hand, peripheral regions includes large-size pixels or are at a high sensitivity by pixel addition, thereby reducing blur or focal plane distortion by shortening the exposure time when fast driving or shooting a moving object. Further, while traveling during the nighttime or in a dark place, the peripheral regions not irradiated by the headlamps can be shot in a long exposure time and at a sufficient sensitivity.

19 Claims, 33 Drawing Sheets

(51) Int. Cl.

| | | |
|---|---|---|
| *B60R 11/02* | (2006.01) | |
| *G03B 15/00* | (2006.01) | |
| *H04N 5/369* | (2011.01) | |
| *H04N 5/232* | (2006.01) | |
| *B60R 1/00* | (2006.01) | |
| *H04N 5/341* | (2011.01) | |
| *H04N 5/378* | (2011.01) | |
| *B60R 11/04* | (2006.01) | |
| *B60R 11/00* | (2006.01) | |
| *G06K 9/00* | (2006.01) | |

(52) U.S. Cl.
   CPC .............. *G03B 17/02* (2013.01); *H04N 5/232* (2013.01); *H04N 5/341* (2013.01); *H04N 5/369* (2013.01); *H04N 5/3696* (2013.01); *H04N 5/378* (2013.01); *B60R 11/04* (2013.01); *B60R 2011/0003* (2013.01); *G06K 9/00791* (2013.01); *G06K 9/00832* (2013.01)

(56) References Cited

U.S. PATENT DOCUMENTS

| | | |
|---|---|---|
| 2005/0007460 A1 | 1/2005 | Stavely et al. |
| 2005/0173616 A1 | 8/2005 | Jang |
| 2007/0126900 A1 | 6/2007 | Jang |
| 2016/0156826 A1* | 6/2016 | Hagiwara ............ H04N 5/3535 348/221.1 |

FOREIGN PATENT DOCUMENTS

| | | | | |
|---|---|---|---|---|
| JP | 2002-026304 A | | 1/2002 | |
| JP | 2002026304 A | * | 1/2002 | ........... H01L 27/148 |
| JP | 2006-148496 A | | 6/2006 | |
| JP | 2006-245909 A | | 9/2006 | |
| JP | 3832902 B2 | | 10/2006 | |
| JP | 2007-288527 A | | 11/2007 | |
| JP | 2007-823522 A | * | 11/2007 | ............ H04N 5/335 |
| JP | 2008-131580 A | | 6/2008 | |
| JP | 2010-183281 A | | 8/2010 | |
| JP | 2011-130022 A | | 6/2011 | |
| JP | 4740607 B2 | | 8/2011 | |
| JP | 2013-115625 A | | 6/2013 | |
| JP | 2014-155175 A | | 8/2014 | |
| JP | 2014-165520 A | | 9/2014 | |
| JP | 2014-204149 A | | 10/2014 | |
| KR | 10-2005-0080236 A | | 8/2005 | |
| WO | 2016/052437 A1 | | 4/2016 | |

OTHER PUBLICATIONS

Office Action in JP Patent Application No. 2018-514180 dated Sep. 12, 2018.

International Search Report and Written Opinion of PCT Application No. PCT/JP2017/009554, dated May 16, 2017, 11 pages of ISRWO.

Office Action for JP Patent Application No. 2018-514180, dated Aug. 4, 2020, 06 pages of Office Action and 06 pages of English Translation.

* cited by examiner

SHOOTING CONTROL APPARATUS, SHOOTING CONTROL METHOD, AND SHOOTING APPARATUS

CROSS REFERENCE TO RELATED APPLICATIONS

This application is a U.S. National Phase of International Patent Application No. PCT/JP2017/009554 filed on Mar. 9, 2017, which claims priority benefit of Japanese Patent Application No. JP 2016-088783 filed in the Japan Patent Office on Apr. 27, 2016. Each of the above-referenced applications is hereby incorporated herein by reference in its entirety.

TECHNICAL FIELD

The technology disclosed in the present specification relates to a shooting control apparatus and a shooting control method for controlling operations of a shooting part, as well as a shooting apparatus, and particularly to a shooting control apparatus and a shooting control method for controlling operations of a shooting part mounted on a mobile object such as automobile, as well as a shooting apparatus mounted on a mobile object for use.

BACKGROUND ART

In recent years, camera-equipped automobiles have increased (see Patent Document 1, for example). Images shot by the vehicle-mounted camera can be recorded on a dashboard camera or images shot by the vehicle-mounted camera can be used for traveling support or eyesight support. For example, an image shot by the vehicle-mounted camera is processed to sense the headlamps of an oncoming vehicle or the tail lamps of a leading vehicle and to detect information on other vehicles therearound while traveling during the nighttime.

CITATION LIST

Patent Document

Patent Document 1: Japanese Patent Application Laid-Open No. 2013-115625
Patent Document 2: Japanese Patent Application Laid-Open No. 2006-148496
Patent Document 3: Japanese Patent Application Laid-Open No. 2011-130022
Patent Document 4: Japanese Patent Application Laid-Open No. 2014-204149
Patent Document 5: Japanese Patent Application Laid-Open No. 2014-155175
Patent Document 6: Japanese Patent Application Laid-Open No. 2014-165520
Patent Document 7: Japanese Patent Application Laid-Open No. 2008-131580

SUMMARY OF THE INVENTION

Problems to be Solved by the Invention

The technology disclosed in the present specification is directed to providing a shooting control apparatus and a shooting control method for controlling operations of a shooting part mounted on a mobile object such as automobile, as well as a shooting apparatus mounted on a mobile object for use.

Solutions to Problems

The technology disclosed in the present specification is made in consideration of the above object, and a first aspect thereof is a shooting control apparatus including: a control part configured to control shooting conditions of a center region in a shooting part having a plurality of pixels to be any of a higher sensitivity, a higher frame rate, a shorter exposure time, and a higher operation frequency than peripheral regions in the shooting part.

According to a second aspect of the technology disclosed in the present specification, the control part of the shooting control apparatus according to the first aspect sets the peripheral regions at a higher sensitivity than the center region.

According to a third aspect of the technology disclosed in the present specification, the control part of the shooting control apparatus according to the first aspect sets the peripheral regions at a shorter exposure time than the center region.

According to a fourth aspect of the technology disclosed in the present specification, the control part of the shooting control apparatus according to the first aspect sets the peripheral regions at a longer exposure time than the center region.

According to a fifth aspect of the technology disclosed in the present specification, the control part of the shooting control apparatus according to the first aspect sets the peripheral regions at a higher frame rate than the center region.

According to a sixth aspect of the technology disclosed in the present specification, the control part of the shooting control apparatus according to the first aspect performs a signal processing in the peripheral regions at a higher operation frequency than in the center region.

According to a seventh aspect of the technology disclosed in the present specification, the control part of the shooting control apparatus according to the first aspect sets the peripheral regions at a higher sensitivity and a higher frame rate than the center region.

According to an eighth aspect of the technology disclosed in the present specification, the control part of the shooting control apparatus according to the first aspect sets the peripheral regions at a higher sensitivity than the center region and at the same frame rate as the center region.

According to a ninth aspect of the technology disclosed in the present specification, the control part of the shooting control apparatus according to the first aspect sets the peripheral regions at a higher sensitivity than the center region and at the same or a longer exposure time as or than the center region.

According to a tenth aspect of the technology disclosed in the present specification, the control part of the shooting control apparatus according to the second aspect performs pixel addition reading or thinning reading on the peripheral regions.

According to an eleventh aspect of the technology disclosed in the present specification, the control part of the shooting control apparatus according to the first aspect controls shooting conditions of the peripheral regions relative to the center region depending on a place where the shooting part is mounted on a vehicle or a driving situation of the vehicle.

According to a twelfth aspect of the technology disclosed in the present specification, the control part of the shooting control apparatus according to the first aspect controls at least one of the position, the shape, and the size of the center region depending on a place where the shooting part is mounted on a vehicle or a driving situation of the vehicle.

According to a thirteenth aspect of the technology disclosed in the present specification, the control part of the shooting control apparatus according to the first aspect controls at least one of the number of phases of the peripheral regions, the position, the shape, and the size of each peripheral region depending on a driving situation of a vehicle mounting the shooting part thereon.

In addition, a fourteenth aspect of the technology disclosed in the present specification is a shooting control method including: a control step of controlling shooting conditions of a center region in a shooting part having a plurality of pixels to be any of a higher sensitivity, a higher frame rate, a shorter exposure time, and a higher operation frequency than peripheral regions in the shooting part.

In addition, a fifteenth aspect of the technology disclosed in the present specification is a shooting apparatus including: an imaging device including a center region, and peripheral regions configured of larger-size pixels than the center region.

According to a sixteenth aspect of the technology disclosed in the present specification, in the shooting apparatus according to the fifteenth aspect, each of the center region and the peripheral regions is scanned in parallel.

According to a seventeenth aspect of the technology disclosed in the present specification, the shooting apparatus according to the fifteenth aspect further includes: a signal processing part configured to perform pixel reading and an AD conversion processing for each of the center region and the peripheral regions.

According to an eighteenth aspect of the technology disclosed in the present specification, in the shooting apparatus according to the fifteenth aspect, the peripheral regions are set at a shorter exposure time than the center region.

According to a nineteenth aspect of the technology disclosed in the present specification, in the shooting apparatus according to the fifteenth aspect, the peripheral regions are set at a higher frame rate than the center region.

According to a twentieth aspect of the technology disclosed in the present specification, in the shooting apparatus according to the fifteenth aspect, at least one of an exposure time or a frame rate of the peripheral regions is controlled relative to the center region depending on a driving situation of a vehicle mounting the shooting apparatus thereon.

Effects of the Invention

According to the technology disclosed in the present specification, it is possible to provide a shooting control apparatus and a shooting control method for controlling operations of a shooting part mounted on a mobile object such as automobile, as well as a shooting apparatus mounted on a mobile object for use.

Additionally, the effects described in the present specification are merely exemplary, and the effects of the present invention are not limited thereto. Further, the present invention may produce additional effects other than the above effects.

Still other objects, characteristics, or advantages of the technology disclosed in the present specification will be apparent by more detailed description based on embodiments described below or the accompanying drawings.

MODE FOR CARRYING OUT THE INVENTION

Embodiments of the technology disclosed in the present specification will be described below in detail with reference to the drawings.

A. System Configuration

Figure 1:
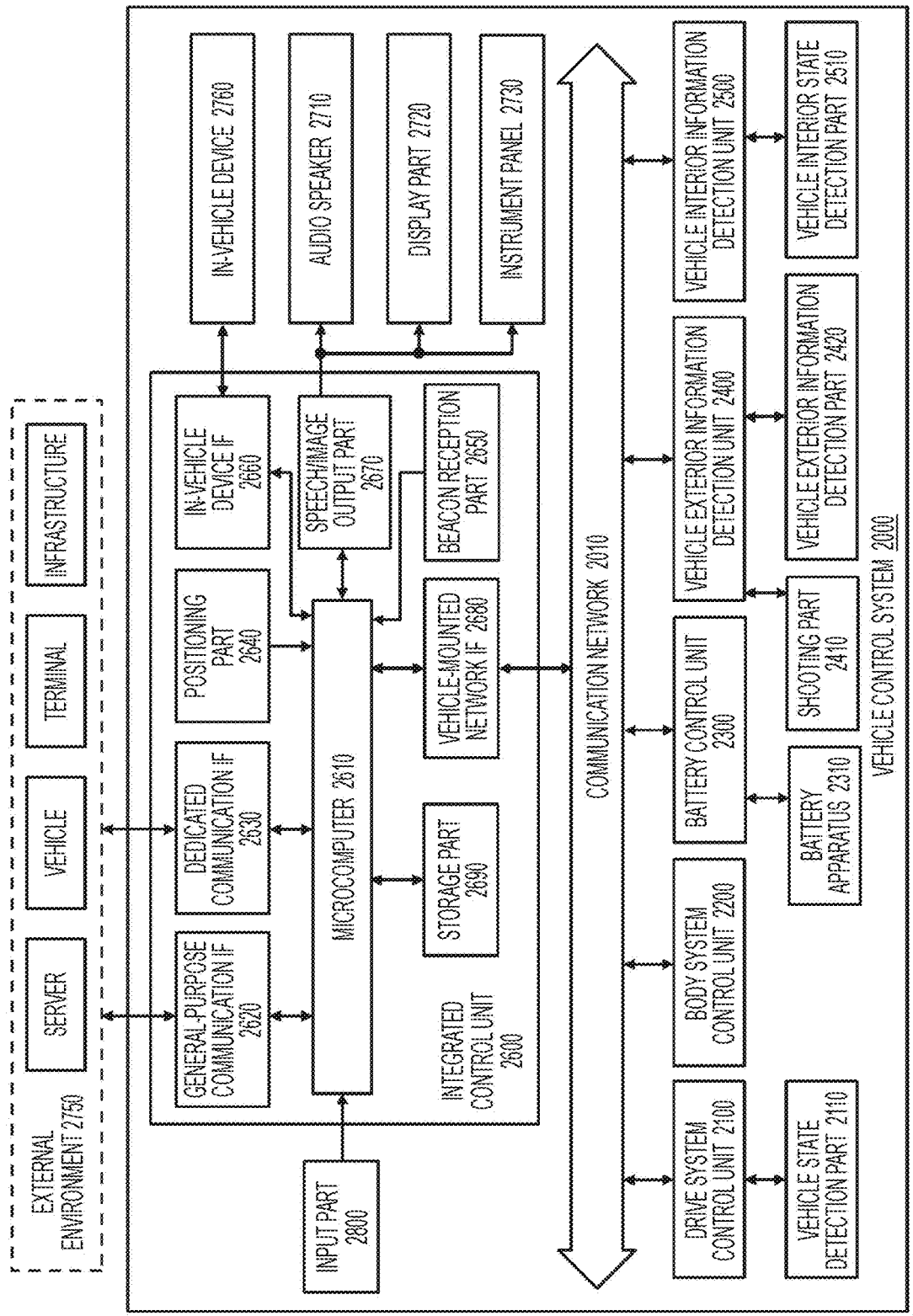
FIG. 1 is a diagram schematically illustrating an exemplary configuration of a vehicle control system 2000 to which the technology disclosed in the present specification can be applied.

FIG. 1 schematically illustrates an exemplary configuration of a vehicle control system 2000 to which the technology disclosed in the present specification can be applied. The illustrated vehicle control system 2000 is configured of a plurality of control units such as a drive system control unit 2100, a body system control unit 2200, a battery control unit 2300, a vehicle exterior information detection unit 2400, a vehicle interior information detection unit 2500, and an integrated control unit 2600.

The respective control units 2100 to 2600 are mutually connected via a communication network 2010. The communication network 2010 may be a vehicle-mounted communication network conforming to any communication standard such as controller area network (CAN), local interconnect network (LIN), local area network (LAN), or FlexRay (registered trademark), or a network conforming to a locally-defined communication standard, for example.

Each of the control units 2100 to 2600 includes a microcomputer configured to perform computation processings according to various programs, a storage part configured to store programs executed by the microcomputer, parameters used for various computations, or the like, and a drive circuit configured to drive various apparatuses to be controlled, for example. Further, each of the control units 2100 to 2600 includes a network interface (IF) configured to make communication with other control units via the communication network 2010, and includes a communication interface configured to make wired communication or wireless communication with apparatuses, sensors, or the like outside the vehicle.

The drive system control unit 2100 controls operations of apparatuses for vehicle drive system according to various programs. For example, the drive system control unit 2100 functions as a control apparatus of a driving force generation apparatus configured to generate a vehicle driving force such as internal combustion engine or drive motor, a driving force transmission mechanism configured to transmit a driving force to the wheels, a steering mechanism configured to adjust a steering angle of the vehicle, a braking apparatus configured to generate a braking force of the vehicle, and the like. Further, the drive system control unit 2100 may include functions as a control apparatus such as antilock brake system (ABS) or electronic stability control (ESC).

A vehicle state detection part 2110 is connected to the drive system control unit 2100. The vehicle state detection part 2110 includes at least one of a gyro sensor configured to detect an angular speed of axial rotation of the vehicle body, an acceleration sensor configured to detect an acceleration of the vehicle, and a sensor configured to detect the operation amount of the acceleration pedal, the operation amount of the brake pedal, a steering angle of the steering wheel, engine revolutions, a rotation speed of the wheels, or the like, for example. The drive system control unit 2100 performs a computation processing by use of a signal input from the vehicle state detection part 2110, and controls the internal combustion engine, the drive motor, the electric power steering apparatus, the brake apparatus, and the like (none of which is illustrated).

The body system control unit 2200 controls operations of various apparatuses mounted on the vehicle body according to various programs. For example, the body system control unit 2200 functions as a control apparatus configured to lock and unlock the doors and to start and stop the system 2000 such as keyless entry system or smart key system, or a control apparatus for a power window apparatus or various lamps (including headlamps, tail lamps, brake lamp, turn signals, and fog lamp) (is assumed to include a function of switching the headlamps between high beam and low beam). When a radio wave sent from a portable transmitter incorporated in a key (or instead of a key) or a signal from various switches arrives at the body system control unit 2200, the body system control unit 2200 controls the door lock apparatus, the power window apparatus, the lamps, and the like of the vehicle (none of which is illustrated in FIG. 1).

The battery control unit 2300 controls a secondary battery as a power supply source of the drive motor according to various programs. For example, in the battery control unit 2300, a battery apparatus 2310 including a secondary battery measures a battery temperature, a battery output voltage, a battery remaining capacity, and the like of the secondary battery, and outputs them to the battery control unit 2300. The battery control unit 2300 performs the computation processing by use of the information input from the battery apparatus 2310, and controls temperature adjustment of the secondary battery, or controls a cooling apparatus (not illustrated) and the like provided in the battery apparatus 2310.

The vehicle exterior information detection unit 2400 detects information on the exterior of the vehicle mounting the vehicle control system 2000 thereon. For example, at least one of a shooting part 2410 or a vehicle exterior information detection part 2420 is connected to the vehicle exterior information detection unit 2400.

The shooting part 2410 is what is called a vehicle-mounted camera, and includes at least one of a time of flight (ToF) camera, a stereo camera, a monocular camera, an infrared camera, and other camera. According to the technology disclosed in the present specification, the shooting operations of the shooting part 2410 are dynamically controlled depending on a driving situation or the like. The shooting operations to be controlled include sensitivity, exposure time, frame rate, and the like. Controlling the shooting operations will be described below in detail. Additionally, an exposure time described below indicates a time in which the shutter is opened and the imaging device is exposed to light (or exposed) during shooting, and is synonymous with shutter speed (SS) (a short exposure time corresponds to a high shutter speed, and a long exposure time corresponds to a low shutter speed). Further, a frame rate is the number of frames processed per unit time, and is generally expressed in a unit of frame per second (fps) indicating a numerical value per second. A frame rate of the display apparatus is the number of frames switched per unit time, and a frame rate during moving picture shooting by the shooting apparatus is the number of frames shot per unit time. A "high" frame rate indicates a short interval between frames. Thus, a high frame rate is synonymous with "fast continuous shooting".

The vehicle exterior information detection part 2420 includes at least one of an environment sensor configured to detect current weather or meteorological phenomenon, a surrounding information detection sensor configured to detect a peripheral vehicle, an obstacle, a pedestrian, and the like, and a speech sensor (microphone configured to collect sounds generated around the vehicle) (none of which is illustrated), for example. In a case where the vehicle exterior information detection part 2420 is a speech sensor, sounds outside the vehicle along with accident or near-miss, such as horn, sudden braking, and collision sound, can be acquired.

An environment sensor described herein is a raindrop sensor configured to detect rainy weather, a fog sensor configured to detect fog, a sunshine sensor configured to detect a degree of sunshine, a snow sensor configured to detect snowfall, or the like, for example. Further, a surrounding information detection sensor is configured of an ultrasonic sensor, a radar apparatus, alight detection and ranging, laser imaging detection and ranging (LIDAR) apparatus, or the like.

The shooting part 2410 and the vehicle exterior information detection part 2420 may be configured as an independent sensor or apparatus, respectively, or may be configured as an apparatus in which a plurality of sensors or apparatuses are integrated. The installation positions of the shooting part 2410 and the vehicle exterior information detection part 2420 will be described below in detail.

The vehicle exterior information detection unit 2400 causes the shooting part 2410 to shoot an image of the exterior of the vehicle, and receives the shot image data from the shooting part 2410. Further, the vehicle exterior information detection unit 2400 receives detected information from the vehicle exterior information detection part 2420. In a case where the vehicle exterior information detection part 2420 is an ultrasonic sensor, a radar apparatus, or a LIDAR apparatus, the vehicle exterior information detection unit 2400 originates an ultrasonic wave, an electromagnetic wave, or the like, and receives information on a reflected wave from the vehicle exterior information detection part 2420.

The vehicle exterior information detection unit 2400 may perform an image recognition processing of recognizing, for example, surrounding person, vehicle, obstacle, road sign (road guidance) installed along a road, or road sign drawn on a road, an object recognition processing of detecting or recognizing an object outside the vehicle, and a processing of detecting a distance to an object outside the vehicle on the basis of the information received from the vehicle exterior information detection part 2420. Further, the vehicle exterior information detection unit 2400 may perform an environment recognition processing of recognizing a surrounding environment such as rainfall, fog, or state of road on the basis of the information received from the vehicle exterior information detection part 2420.

Additionally, the vehicle exterior information detection unit 2400 may perform a distortion correction, positioning processing, or the like on the image data received from the vehicle exterior information detection part 2420. Further, the vehicle exterior information detection unit 2400 may generate a perspective image or panorama image by combining the image data shot by different shooting parts 2410. Further, the vehicle exterior information detection unit 2400 may perform a viewpoint conversion processing by use of the image data shot by different shooting parts 2410.

The vehicle interior information detection unit 2500 detects information on the interior of the vehicle. The vehicle interior information detection unit 2500 is connected with a vehicle interior state detection part 2510 configured to detect a state of the driver driving the vehicle, for example, and detects information on the interior of the vehicle on the basis of the driver's state information input from the vehicle interior state detection part 2510. A driver described herein is a passenger seated on the driver seat in the vehicle among the passengers inside the vehicle, or a passenger who is stored as a person to drive by the integrated control unit 2600.

For example, the vehicle interior information detection unit 2500 may calculate a degree of fatigue or a degree of concentration of the driver, or determines whether the driver is falling asleep. Further, the vehicle interior information detection unit 2500 detects various driver's states, and determines whether the driver (or a passenger other than the driver) can drive the vehicle. The vehicle interior information detection unit 2500 may sense the driver on the basis of the positions where the passengers are seated, or may determine the driver by comparing a face image previously registered as a driver with shot face images on the basis of the faces of the passengers included in the image shooting the interior of the vehicle.

The vehicle interior state detection part 2510 may include a vehicle-mounted camera (Dramoni camera) configured to shoot the interior of the vehicle such as the driver or other passenger, a biological sensor configured to detect biological information of the driver, a microphone configured to collect sounds inside the vehicle, or the like. Facial authentication of the driver or other passenger can be performed by facial recognition of an image shot by the Dramoni camera. Further, a point of gaze (or an eye direction) of the driver can be detected on the basis of a direction in which the recognized face directs or a motion of the eyes included in the recognized face. The biological sensor is provided on the seat, the steering wheel, or the like, for example, and detects biological information on the driver seated on the driver seat or the driver gripping the steering wheel. Further, the microphone can acquire sounds inside the vehicle along with accident or near-miss such as horn, sudden braking, or speech (scream) of a passenger. The vehicle interior information detection unit 2500 may perform a signal processing such as noise canceling on a speech signal collected by the microphone. The vehicle interior information detection unit 2500 may modulate speech other than specific speech (such as driver's or previously-registered voice) in order to protect privacy, for example.

Further, the vehicle interior state detection part 2510 may include a load sensor configured to detect a load (whether or not a person is seated on the seat) applied on the driver seat or the other seats (such as the front passenger seat and the rear passenger seats). Further, the vehicle interior state detection part 2510 may detect a driver's state on the basis of operations on various devices by which the driver operates the vehicle such as accelerator, brake, steering wheel, windshield wipers, turn signals, air conditioner, and other switches. Further, the vehicle interior state detection part 2510 may check a status such as whether the driver has his/her driver's license or whether the driver refuses to drive.

The integrated control unit 2600 controls the total operations in the vehicle control system 2000 according to various programs. In the example illustrated in FIG. 1, the integrated control unit 2600 includes a microcomputer 2610, a general-purpose communication interface 2620, a dedicated communication interface 2630, a positioning part 2640, a beacon reception part 2650, an in-vehicle device interface 2660, a speech/image output part 2670, a vehicle-mounted network interface 2680, and a storage part 2690. Further, the integrated control unit 2600 is connected with an input part 2800.

The input part 2800 is configured of an apparatus which the driver or other passenger can operate for input, such as touch panel, button, microphone, switch, or lever, for example. The input part 2800 may be a remote control apparatus using infrared ray or other radio wave, or may be an externally-connected device such as cell phone, personal digital assistant (PDA), Smartphone, or tablet terminal corresponding to the operations of the vehicle control system 2000 (none of which is illustrated), for example. The input part 2800 may be operated by speech input via a microphone. The input part 2800 may be a camera, for example, and in this case, a passenger can input information into the integrated control unit 2600 by his/her gesture. Further, the input part 2800 may include an input control circuit or the like configured to generate an input signal on the basis of the information input by the passenger or the like by use of the input part 2800, for example, and to output it to the integrated control unit 2600. The passengers including the driver can input various items of data into the vehicle control system 2000 or can give an instruction on a processing operation by operating the input part 2800.

The storage part 2690 may include a random access memory (RAM) configured to store various programs executed by the microcomputer, or an electrically erasable and programmable read only memory (EEPROM) configured to store various parameters, calculation results, sensors' detected values, and the like. Further, the storage part 2690 may include a large-capacity storage apparatus (not illustrated) configured of a magnetic storage device such as hard disc drive (HDD), a semiconductor storage device such as solid state drive (SSD), an optical storage device, a magnetooptical storage device, or the like. The large-capacity storage apparatus can be used to record (as a dashboard camera) videos around the vehicle or inside the vehicle shot by the shooting part 2410, for example.

The general-purpose communication interface 2620 is a general-purpose communication interface configured to mediate communication with various devices present in the external environment. The general-purpose communication interface 2620 mounts a cellular communication protocol such as global system of mobile communications (GSM) (registered trademark), WiMAX, long term evolution (LTE), or LTE-advanced (LTE-A), wireless LAN such as Wi-Fi (registered trademark), or other wireless communication protocol such as Bluetooth (registered trademark). The general-purpose communication interface 2620 can connect to a device (such as application server, control server, management server, or the like) present on an external network (such as Internet, Cloud network, or provider-specific network) via a base station in the cellular communication, an access point in the wireless LAN, or the like, for example. Further, the general-purpose communication interface 2620 may connect with a terminal present near the vehicle (such as an information terminal owned by the driver or a pedestrian, a shop terminal installed in a shop adjacent to a road on which the vehicle is traveling, a machine type communication (MTC) terminal connected to a communication network not via a person (such as gas meter for home use or automatic vendor), or the like) by use of the peer to peer (P2P) technology, for example.

The dedicated communication interface 2630 is a communication interface configured to support a communication protocol defined for use in the vehicle. The dedicated communication interface 2630 may mount a standard protocol such as wireless access in vehicle environment (WAVE) as a combination of the lower-layer IEEE 802.11p and the higher-layer IEEE 1609, dedicated short range communications (DSRC), or cellular communication protocol, for example. The dedicated communication interface 2630 typically makes V2X communication as a concept including one or more of vehicle to vehicle communication, vehicle to infrastructure communication, vehicle to home communication, and vehicle to pedestrian communication.

The positioning part 2640 receives a global navigation satellite system (GNSS) signal from the GNSS satellite (such as a global positioning system (GPS) signal from the GPS satellite), for example, to perform positioning, and generates position information including the latitude, longitude, and altitude of the vehicle. Additionally, the positioning part 2640 may specify a current position on the basis of electronically-measured information from a wireless access point by use of PlaceEngine (registered trademark), or may acquire position information from a portable terminal of a passenger such as cell phone, personal handy-phone system (PHS), or Smartphone having a positioning function.

The beacon reception part 2650 receives a radio wave or electromagnetic wave originated from a wireless station installed on a road, and the like, for example, and acquires a current position of the vehicle, or road traffic information (information on traffic jam, road blocked, required time, or the like). Additionally, the functions of the beacon reception part 2650 can be included in the dedicated communication interface 2630 to be mounted.

The in-vehicle device interface 2660 is a communication interface configured to mediate connection between the microcomputer 2610 and various devices 2760 present inside the vehicle. The in-vehicle device interface 2660 may establish wireless connection by use of a wireless communication protocol such as wireless LAN, Bluetooth (registered trademark), near field communication (NFC), or wireless universal serial bus (USB) (WUSB). Further, the in-vehicle device interface 2660 may establish wired connection of USB, high definition multimedia interface (HDMI) (registered trademark), mobile high-definition link (MHL), or the like via a connection terminal (and a cable as needed) (not illustrated). The in-vehicle device interface 2660 exchanges controls signals or data signals with a mobile device or wearable device of a passenger, or an in-vehicle device 2760 installed or attached in the vehicle, for example.

The vehicle-mounted network interface 2680 is an interface configured to mediate communication between the microcomputer 2610 and the communication network 2010.

The vehicle-mounted network interface 2680 exchanges signals and the like according to a predetermined protocol supported by the communication network 2010.

The microcomputer 2610 in the integrated control unit 2600 controls the vehicle control system 2000 according to various programs on the basis of the information acquired via at least one of the general-purpose communication interface 2620, the dedicated communication interface 2630, the positioning part 2640, the beacon reception part 2650, the in-vehicle device interface 2660, and the vehicle-mounted network interface 2680.

For example, the microcomputer 2610 may compute a control target value of the driving force generation apparatus, the steering mechanism, or the braking apparatus on the basis of the acquired vehicle interior and exterior information, and output a control command to the drive system control unit 2100. For example, the microcomputer 2610 may perform cooperative control for collision avoidance or collision alleviation of the vehicle, follow traveling based on inter-vehicle distance, driving at kept vehicle speed, automatic driving, and the like.

Further, the microcomputer 2610 may create local map information including peripheral information of a current position of the vehicle on the basis of the information acquired via at least one of the general-purpose communication interface 2620, the dedicated communication interface 2630, the positioning part 2640, the beacon reception part 2650, the in-vehicle device interface 2660, and the vehicle-mounted network interface 2680. Further, the microcomputer 2610 may predict dangers such as collision of the vehicle, approach to a pedestrian or building, and entry into a road blocked, or the like on the basis of the acquired information, and generate an alarm signal. An alarm signal described herein is a signal for issuing an alarm sound or turning on an alarm lamp, for example.

Further, the microcomputer 2610 may realize a dashboard camera function by use of the storage part 2690 or the like. Specifically, the microcomputer 2610 may control recording videos around the vehicle or inside the vehicle shot by the shooting part 2410.

The speech/image output part 2670 transmits an output signal of at least one of speech or image to an output apparatus capable of visually or aurally notifying the passengers in the vehicle or the outside of the vehicle of information. In a case where the output apparatus is a display apparatus, the display apparatus visually displays the results acquired in various processings performed by the microcomputer 2610 or the information received from other control unit in various forms such as text, image, table, and graph. Further, in a case where the output apparatus is a speech output apparatus, the speech output apparatus converts an audio signal configured of reproduced speech data, acoustic data, or the like into an analog signal, and aurally outputs the analog signal. In the example illustrated in FIG. 1, an audio speaker 2710, a display part 2720, and an instrument panel 2730 are equipped as output apparatuses.

The display part 2720 may include at least one of an onboard display and a head-up display, for example. The head-up display is a device configured to show an image (formed at a point at infinity) within the driver's eyesight by use of the windshield. The display part 2720 may include an augmented reality (AR) display function. The vehicle may be provided with headphones, projector, lamp, or the like in addition to the above items.

Further, the instrument panel 2730 is arranged in front of the driver seat (and the front passenger seat), and includes a speedometer or tachometer, a meter panel indicating information required for traveling of the vehicle such as fuel meter, water temperature meter, and distance meter, or a navigation system for traveling guidance to a destination.

Additionally, at least two control units among a plurality of control units configuring the vehicle control system 2000 illustrated in FIG. 1 may be integrally configured into one physical unit. Further, the vehicle control system 2000 may further include control units other than those illustrated in FIG. 1. Alternatively, at least one of the control units 2100 to 2600 may be configured as a physical collection of two or more units. Further, part of the functions to be served by the control units 2100 to 2600 may be realized by other control unit. In other words, if the computation processing realized by exchanging information via the communication network 2010 is configured to be performed in any control unit, the configuration of the vehicle control system 2000 can be permitted to change. Further, the sensors or apparatuses connected to any control unit may be connected to other control unit, and information detected or acquired by a sensor or apparatus may be mutually exchanged between a plurality of control units via the communication network 2010.

Figure 2:
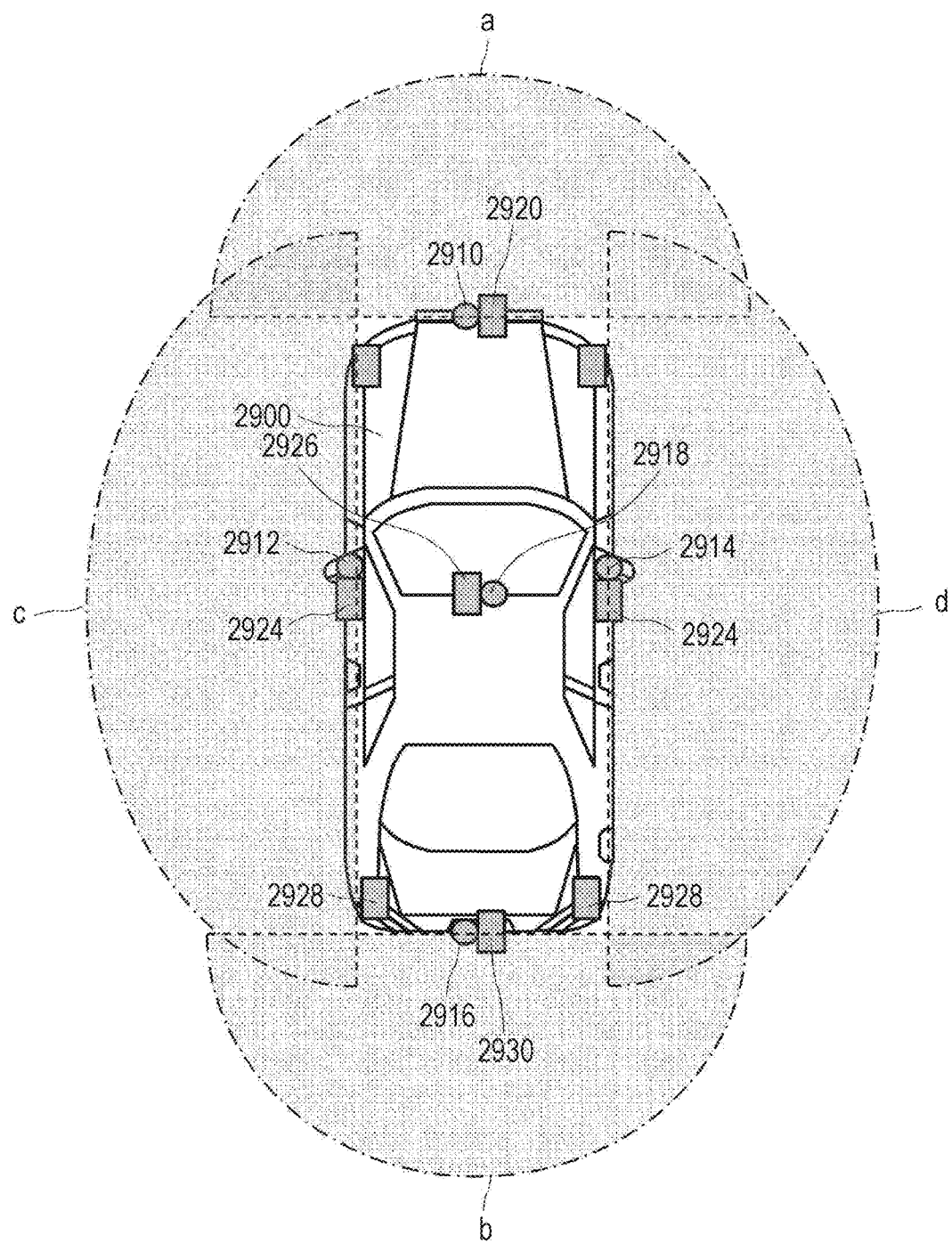
FIG. 2 is a diagram illustrating exemplary installation positions of a shooting part 2410 and a vehicle exterior information detection part 2420.

FIG. 2 illustrates exemplary installation positions of the shooting part 2410 and the vehicle exterior information detection part 2420. In the Figure, shooting parts 2910, 2912, 2914, 2916, and 2918 correspond to the shooting part 2410, and are arranged on at least one position of the front node, side mirrors, the rear bumper, the back door of a vehicle 2900, and the top of the windshield inside the vehicle, for example. The shooting part 2910 provided almost at the center of the front nose and the shooting part 2918 provided at the top of the windshield inside the vehicle mainly capture images in front of the vehicle 2900. A leading vehicle, a pedestrian, an obstacle, a traffic light, a road sign, a lane, and the like can be detected on the basis of the images captured in front of the vehicle 2900. Further, the shooting parts 2912 and 2914 provided on the side mirrors mainly capture images on the sides of the vehicle 2900. Further, the shooting part 2916 provided on the rear bumper or the back door mainly captures images behind the vehicle 2900.

In FIG. 2, a shooting range a indicates a shooting range of the shooting part 2910 provided almost at the center of the front nose, shooting ranges b and c indicate shooting ranges of the shooting parts 2914 and 2912 provided on the right and left side mirrors, respectively, and a shooting range d indicates a shooting range of the shooting part 2916 provided on the rear bumper or the back door. For example, the image data shot by the shooting parts 2910, 2912, 2914, and 2916 are overlapped thereby to acquire a perspective image of the vehicle 2900 viewed from above. Additionally, a shooting range of the shooting part 2918 provided at the top of the windshield inside the vehicle is omitted.

The vehicle exterior information detection parts 2920, 2922, 2924, 2926, 2928, and 2930 provided at the front, the rear, the sides, and the corners of the vehicle 2900, and at the top of the windshield inside the vehicle are configured of an ultrasonic sensor or a radar apparatus, for example. The vehicle exterior information detection parts 2920, 2926, and 2930 provided at the front nose, the rear bumper or the back door of the vehicle 2900, and at the top of the windshield inside the vehicle may be LIDAR apparatuses, for example. The vehicle exterior information detection parts 2920 to 2930 are mainly used to detect a leading vehicle, a pedestrian, an obstacle, or the like.

B. Shooting Control of Vehicle-Mounted Camera

B-1. Images Shot by Vehicle-Mounted Camera

FIG. 2 illustrates the installation positions of the vehicle-mounted cameras by way of example. One of the characteristics of images shot by a camera mounted on a mobile object such as vehicle-mounted camera is that motions and changes of an object are non-uniform per position in the screen.

Figure 3:
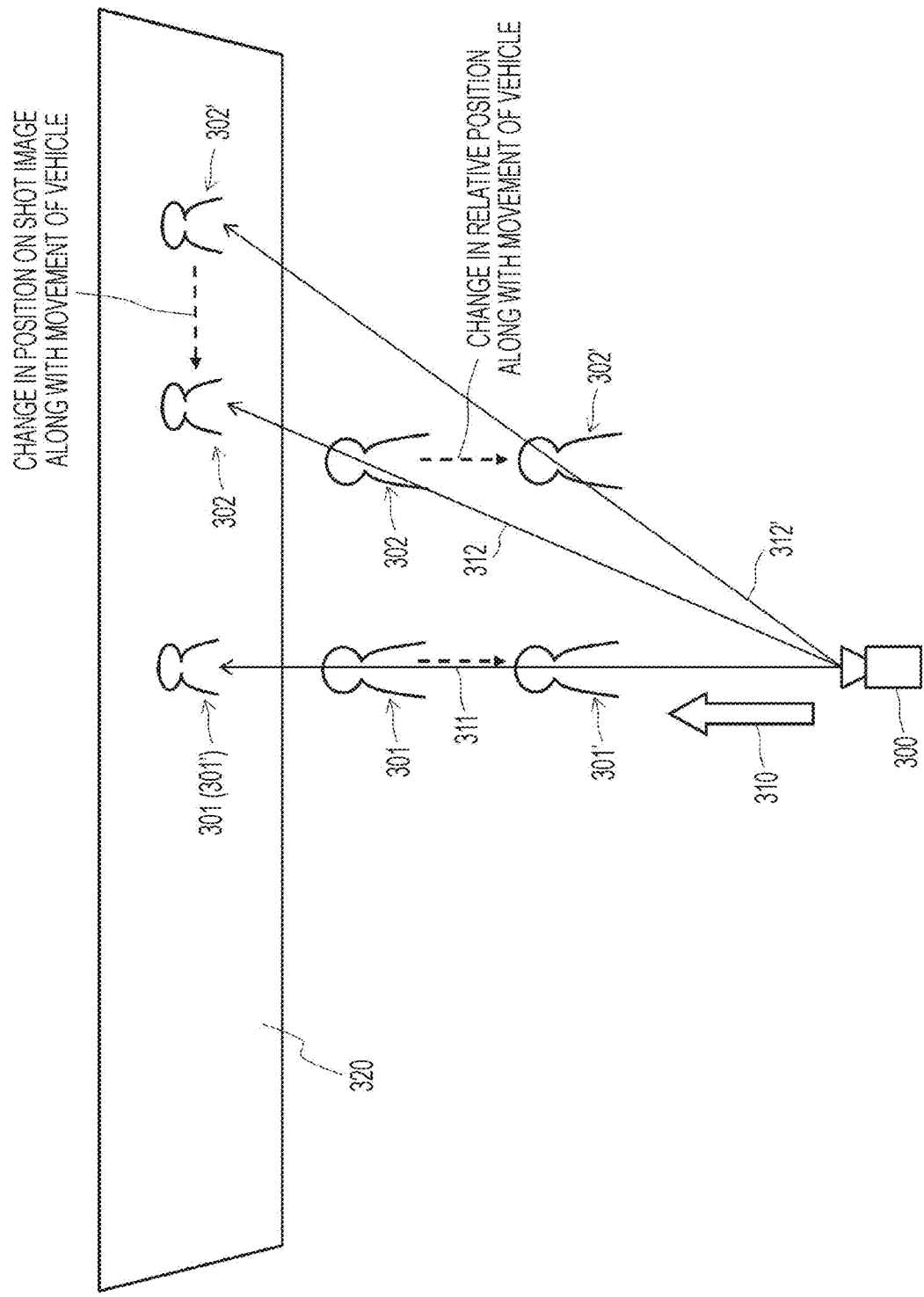
FIG. 3 is a diagram illustrating how respective objects 301 and 302 in an image shot by a vehicle-mounted camera 300 change as a vehicle travels.

FIG. 3 illustrates how respective objects 301 and 302 in an image shot by the vehicle-mounted camera 300 change as the vehicle travels.

The object 301 which can be captured in an eye direction 311 almost equal to a front direction 310 of the vehicle is rarely different in the eye direction 311 of an object 301' even after the vehicle travels, and rarely changes in its position on a shot image 320. Further, a change in the image per frame is small. Thus, the object 301 can be shot to be relatively clear (or at a high resolution) by the vehicle-mounted camera 300.

On the other hand, the object 302 captured in an eye direction 312 which forms a large angle with the front direction 310 of the vehicle is different in the eye direction 312 of an object 302' after the vehicle travels, and the position on the shot image 302 largely moves from the object 302 before moving, and the image is easily defocused. When the speed of the vehicle increases, the amount of movement in the image is larger, and blur or focal plane distortion easily occurs to the object 302' and the object is difficult to recognize. As the vehicle speed is higher, blur or focal plane distortion is more serious.

Figure 4:
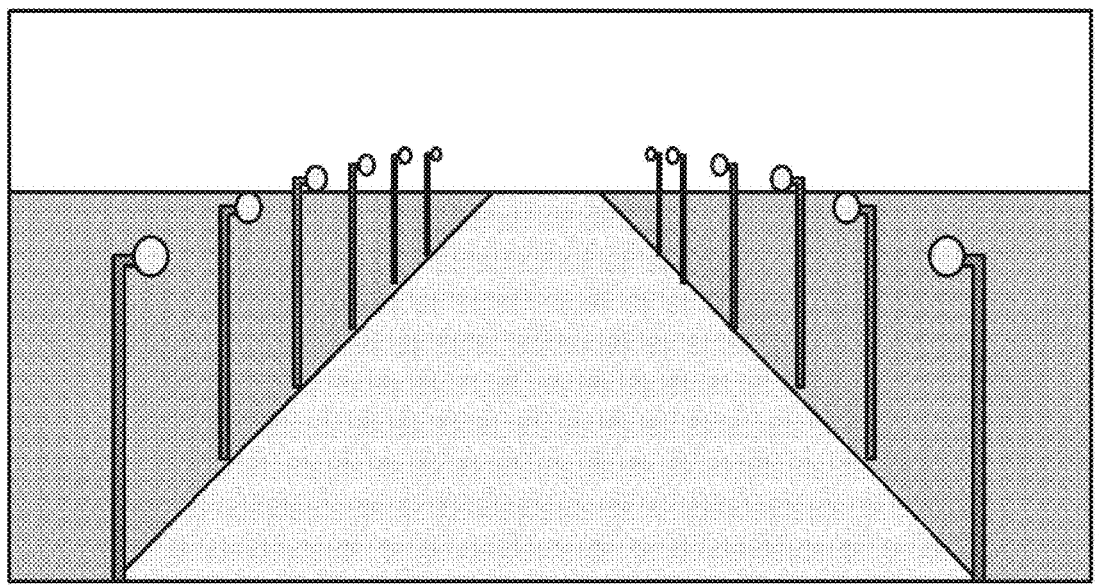
FIG. 4 is a diagram illustrating a landscape in front of a vehicle by way of example.
Figure 5:
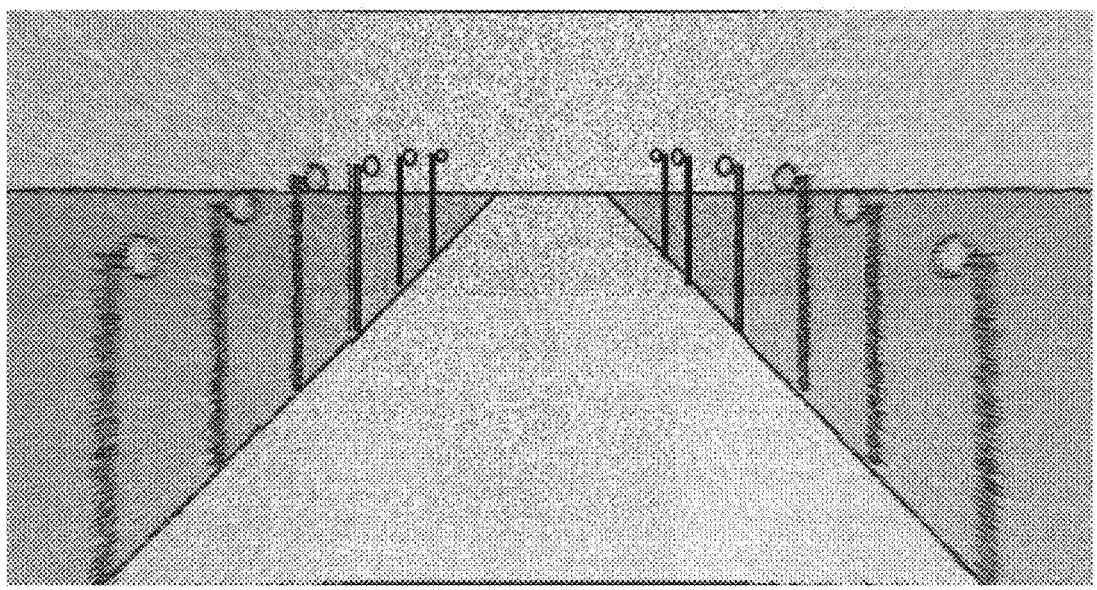
FIG. 5 is a diagram illustrating an image shot by a vehicle-mounted camera on a vehicle traveling toward the landscape illustrated in FIG. 4.

For example, assuming that the landscape in front of the vehicle as illustrated in FIG. 4 is shot while the vehicle is traveling (is going straight ahead), around the center of the shot image is relatively clear, but blur of a moving object occurs in the periphery of the shot image as illustrated in FIG. 5.

Figure 6:
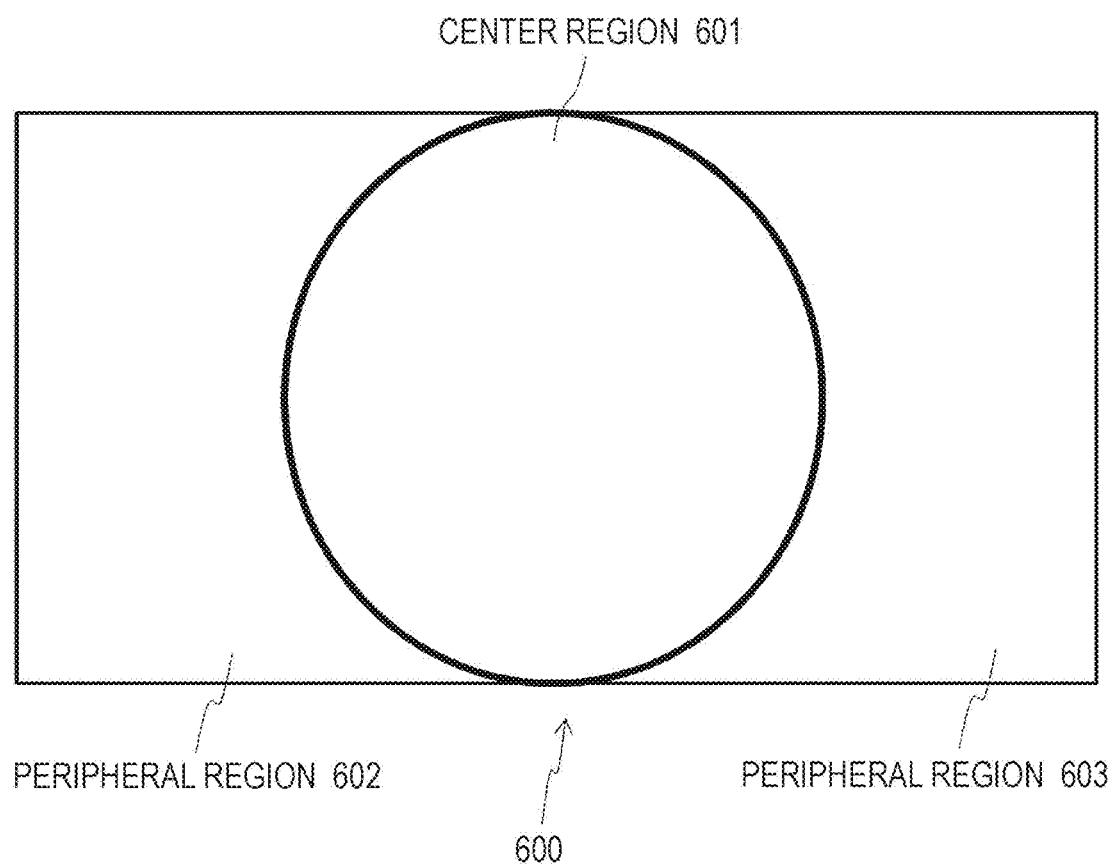
FIG. 6 is a diagram for explaining characteristics of an image shot by a vehicle-mounted camera.

An image shot by the vehicle-mounted camera can be divided into a center region 601 with a small amount of movement of an object and with a high resolution and a peripheral region 602 with a large amount of movement of an object as illustrated in FIG. 6. An object can be shot relatively clearly in the center region 601, which does not cause a problem. To the contrary, the present applicants think that the peripheral region 602 needs to be shot in a short exposure time, at a high reading speed, and in fast continuous shooting (or at a high frame rate) in order to restrict blur or focal plane distortion of a moving object and to improve the object recognition rate.

Here, focal plane distortion is a phenomenon which occurs in an imaging device configured to perform a reading operation in units of row as in a complementary metal oxide semiconductor (CMOS) image sensor or the like, and is a phenomenon that a moving object is distorted in one image due to gradual offset in reading time per row (see Patent Document 2, for example). If the reading speed of the imaging device is higher, focal plane distortion is automatically eliminated.

Additionally, FIG. 6 illustrates that the vehicle is going straight ahead with the vehicle-mounted camera installed such that the eye direction matches with the front direction of the vehicle by way of example. FIG. 6 can illustrate that a region including a vanishing point is defined as a center region by way of example. In a case where the eye direction of the vehicle-mounted camera is tilted toward the front direction of the vehicle, or when the vehicle turns right or left not going straight ahead, or when the vehicle is traveling on a slope (upward slope or downward slope), the arrangement of the center region changes (described below).

Further, other characteristic of an image shot by the vehicle-mounted camera is that luminance per region is non-uniform while the vehicle is traveling during the nighttime (including cloudy weather or rainy weather) or in a dark place, for example.

Figure 7:
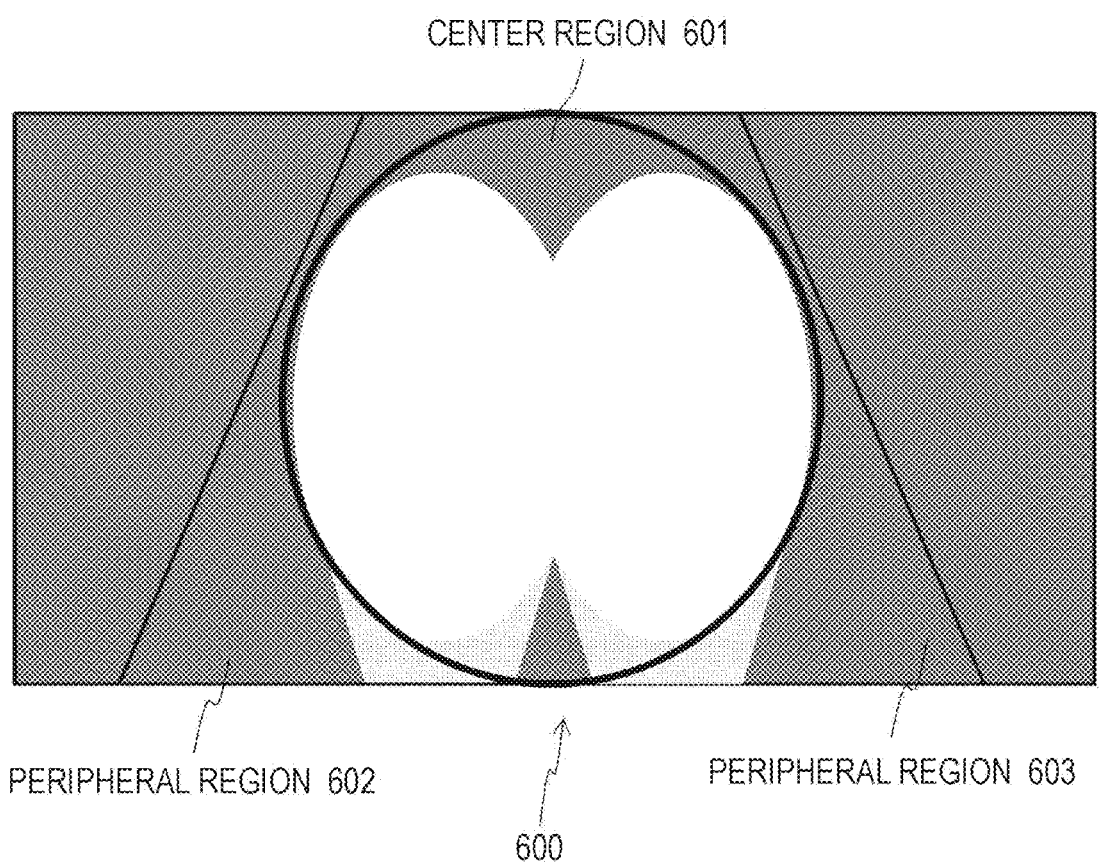
FIG. 7 is a diagram illustrating an exemplary image shot by a vehicle-mounted camera on a vehicle traveling during the nighttime or in a dark place.

FIG. 7 illustrates an exemplary image shot by the vehicle-mounted camera of the vehicle while traveling during the nighttime or in a dark place. In the illustrated example, a road in the center region 601 in a shot image 600 is irradiated by the headlamps of the vehicle, and thus it has high luminance and can be clearly shot. To the contrary, the lights emitted from the headlamps do not reach the peripheral region 602, and the peripheral region 602 stays dark. If the center region 601 and the peripheral region 602 are shot under the same exposure condition or shot by the imaging device with the same sensitivity, the peripheral region 602 is shot dark. Alternatively, the exposure condition or the sensitivity of the imaging device is adapted to the peripheral region 602, the center region 601 is excessively exposed and may be saturated to be white (not illustrated). Therefore, the present applicants think that the peripheral region 602 needs to be shot by the imaging device in a longer exposure time or at a higher sensitivity than the center region 601.

Additionally, an image shot by a general camera is common with an image shot by the vehicle-mounted camera in that luminance per region is non-uniform since an illumination is in the angle of view. However, the vehicle-mounted camera is characterized in that the center region 601 irradiated by the headlamps has high luminance and the peripheral region 602 where the lights emitted from the headlamps do not reach has low luminance (or each region with high luminance or low luminance is fixed).

In summary, there is required a shooting apparatus or a shooting control apparatus capable of realizing an operation of shooting the peripheral region in a shorter (or longer) exposure time, at a higher reading speed, or at a higher frame rate than the center region depending on a driving situation of the vehicle. This is similarly applicable to an imaging device using not CMOS but charge coupled device (CCD).

B-2. Configuration of Shooting Apparatus

Figure 31:
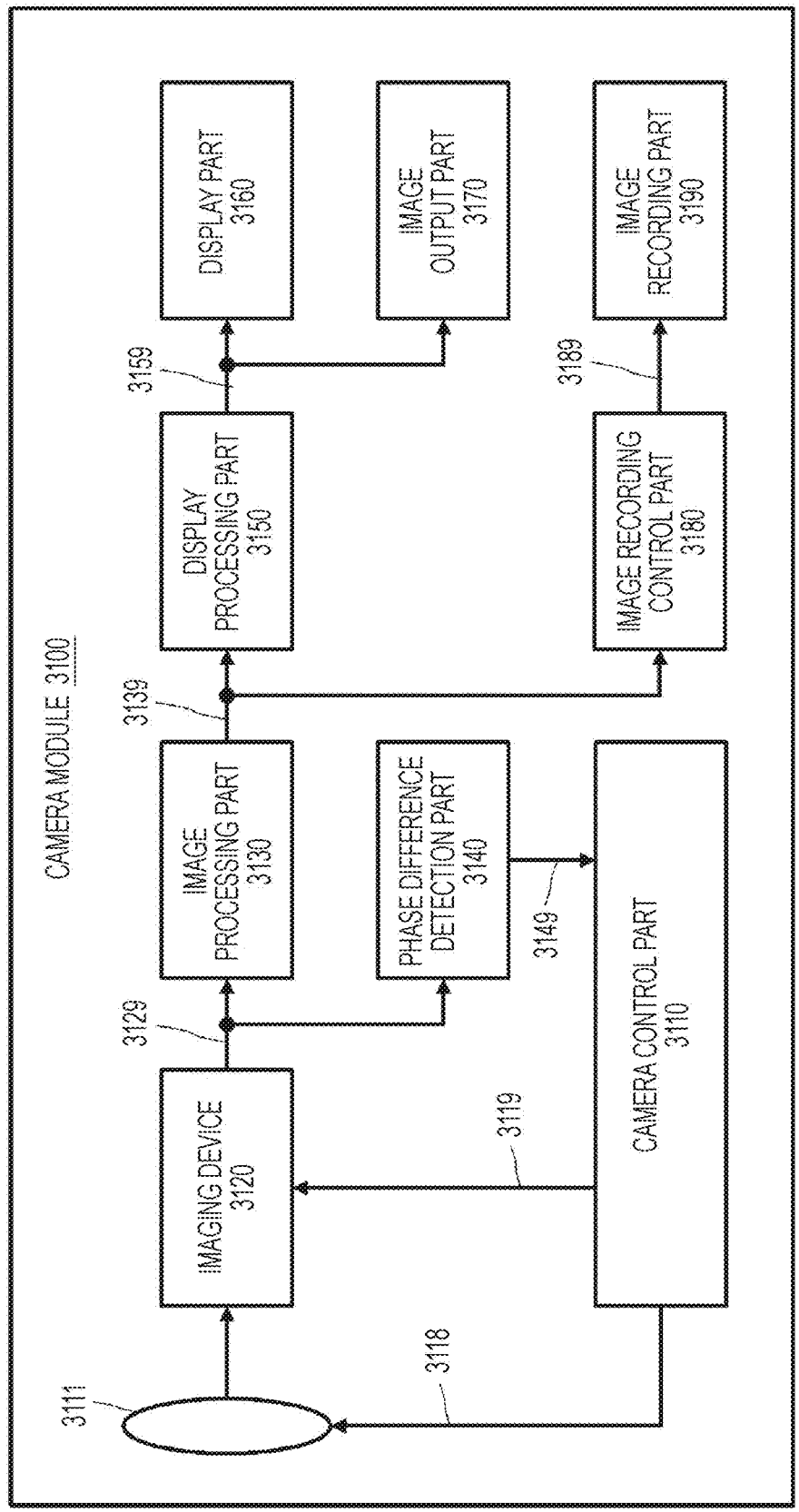
FIG. 31 is a diagram illustrating an exemplary configuration of a camera module 3100 applicable as a vehicle-mounted camera.

FIG. 31 illustrates an exemplary configuration of a camera module 3100 applicable as a vehicle-mounted camera. The illustrated camera module 3100 includes a camera control part 3110, a shooting lens 3111, an imaging device 3120, an image processing part 3130, a phase difference detection part 3140, a display processing part 3150, a display part 3160, an image output part 3170, an image recording control part 3180, and an image recording part 3190.

The camera control part 3110 controls the entire camera module 3100. For example, the camera control part 3110 outputs a control signal to the imaging device 3200 via a signal line 3119, and causes the imaging device 3200 to shoot an image in response to a user's operation. The control signal includes a signal indicating the live view mode or the capture mode. The live view mode is a mode for shooting an image at a certain interval (per 1/30 seconds, for example) and displaying it on the display part 3160. On the other hand, the capture mode is a mode for shooting and recording a moving picture or a still image. A moving picture includes a plurality of images shot at a certain interval. An image shot in the live view mode is set at a lower resolution than an image shot in the capture mode. Further, the camera control part 3110 receives a phase difference detected by the phase difference detection part 3140 and controls the positions of the focusing lens and the like in the shooting lens 3111 depending on the phase difference thereby to adjust a focal distance in response to a user's operation.

The shooting lens 3111 is capable of changing a focal distance. For example, what is called a four-group zoom lens including a focusing lens, a variator, a compensator, and a master lens (none of which is illustrated) is used as the shooting lens 3111.

The imaging device 3120 converts the amount of light received via the shooting lens 3111 into a potential, and outputs a pixel value depending on the potential. For example, the imaging device 3120 includes a plurality of normal pixels and a plurality of phase difference pixels. A phase difference pixel is directed for detecting a phase difference. Each phase difference pixel is configured of a pair of pixels (which will be denoted as "left pixel" and "right pixel" below) configured to receive a pair of eyes-divided lights, respectively. On the other hand, the normal pixels are other than the phase difference pixels, and are used to generate an image. The imaging device 3120 reads the pixels values of the normal pixels and outputs them to the image processing part 3130 via a signal line 3129 under control of the camera control part 3110. Further, the imaging device 3120 reads the pixel values of the phase difference pixels and outputs them to the phase difference detection part 3140 via the signal line 3129.

The image processing part 3130 performs an image processing such as mosaic processing on an image generated by the pixel values of the normal pixels. The image processing part 3130 holds the image configured of the pixel values of the normal pixels, interpolates the pixel values of the phase difference pixels in the image, further performs an image processing such as mosaic processing or white balance processing on the interpolated image as needed, and then outputs the processed image to the display processing part 3150 and the image recording control part 3180 via a signal line 3139. Further, the image processing part 3130 may perform a recognition processing on the shot image.

The phase difference detection part 3140 detects a phase difference from the pixel values of the phase difference pixels. For example, the phase difference detection part 3140 generates distributions of luminance of left pixels and right pixels, respectively, and detects a phase difference from a degree of correlation therebetween. The phase difference detection part 3140 outputs the detected phase difference to the camera control part 3110 via a signal line 3149.

The display processing part 3150 performs a display processing such as γ correction processing, color correction processing, or contrast adjustment processing on the image as needed. The display processing part 3150 outputs the image subjected to the display processing to the display part 3160 and the image output part 3170 via a signal line 3159.

The display part 3160 displays the image from the display processing part 3150. Further, the image output part 3170 outputs the image from the display processing part 3150 to a device externally connected to the camera module 3100.

The image recording control part 3180 outputs the image from the image processing part 3130 to the image recording part 3190 via a signal line 3189, and causes the image recording part 3190 to record the image. The image recording part 3190 records the image passed from the image recording control part 3180.

Figure 32:
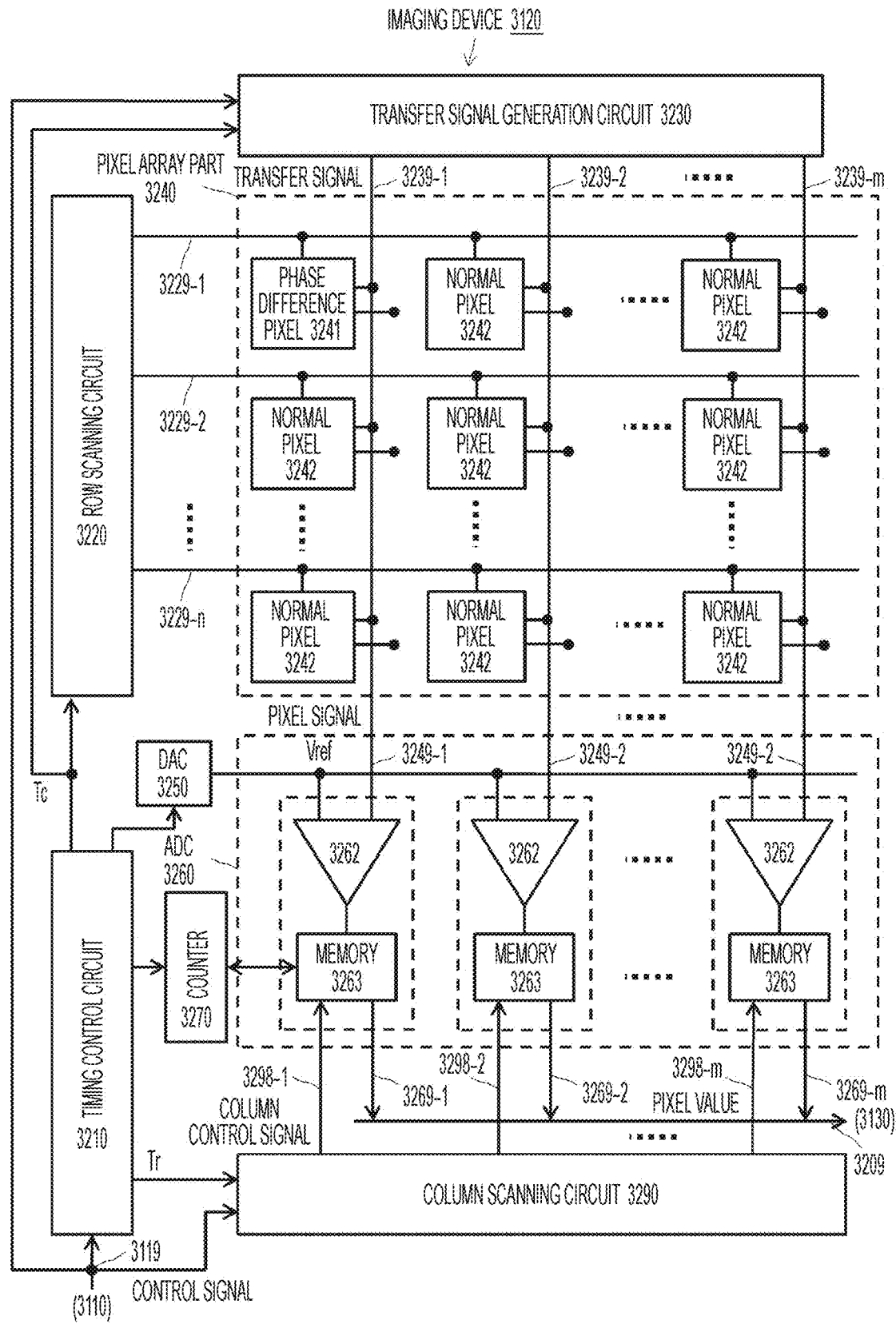
FIG. 32 is a diagram illustrating an exemplary configuration of an imaging device 3120.

FIG. 32 illustrates an exemplary configuration of the imaging device 3120. The imaging device 3120 includes a timing control circuit 3210, a row scanning circuit 3220, a transfer signal generation circuit 3230, a pixel array part 3240, a D/A conversion part (DAC) 3250, an A/D (ADC) conversion part 3260, a counter 3270, and a column scanning circuit 3290.

The timing control circuit 3210 controls a timing to output a pixel value in response to a control signal from the camera control part 3110. The timing control circuit 3210 outputs timing signals Tc and Tr thereby to control the timings to scan the rows and columns. The timing signal Tc is directed for indicating a timing to start scanning the rows. On the other hand, the timing signal Tr is directed for indicating a timing to start scanning the columns in each row. Here, a row is an arrangement of a plurality of pixels in one direction in the pixel array part 3240, and is also denoted as horizontal line. A row including the phase difference pixels among the rows (horizontal lines) is denoted as phase difference line, and a row not including a phase difference pixel is denoted as normal line. On the other hand, a column is an arrangement of a plurality of pixels in a direction orthogonal to the rows in the pixel array part 3240, and is also denoted as vertical line.

Specifically, the timing control circuit 3210 generates a timing signal Tc when a shooting period for shooting one image starts, and supplies it to the row scanning circuit 3220 and the transfer signal generation circuit 3230. The shooting period is divided into a normal pixel output period for outputting the pixel values of the normal pixels, and a phase difference pixel output period for outputting the pixel values of the phase difference pixels. The timing control circuit 3210 outputs a timing signal Tc when the shooting period starts, and then outputs a timing signal Tc when the phase difference pixel output period starts. The timing control circuit 3210 then generates a timing signal Tr and supplies it to the column scanning circuit 3290 in synchronization with a timing to select the rows within the shooting period. However, a smaller number of rows are selected in the live view mode, and thus the timing control circuit 3210 generates a smaller number of timing signals Tr within the shooting period than in the capture mode.

For example, in a case where one image of n rows by m columns including k phase difference lines is shot, the timing control circuit 3210 generates a timing signal Tc once when the shooting period starts, and generates a timing signal Tr within the normal pixel output period n times. Here, n and m are an integer of 2 or more, and k is an integer between 1 and n. The timing control circuit 3210 then generates a timing signal Tc once when the phase difference pixel output period starts, and generates a timing signal Tr within the phase difference pixel output period k times. Further, the timing control circuit 3210 supplies a digital signal indicating a reference voltage value to the D/A conversion part 3250. Further, the timing control circuit 3210 controls the counter 3270 and sets a counter value at the initial value in synchronization with the timings to generate a timing signal Tr.

The row scanning circuit 3220 selects each of the rows according to the timing signal Tc and the control signal. The row scanning circuit 3220 sequentially outputs a row selection signal to each of the rows via signal lines 3229-1 to 3229-$n$ within the normal pixel output period thereby to select a row. The row selection signals are set at high level in a case where a row is selected, and is set at low level in a case where it is not selected, for example. Further, the row scanning circuit 3220 sequentially selects each of the phase difference lines within the phase difference pixel output period. However, the row scanning circuit 3220 selects a smaller number of rows within the shooting period in the live view mode than in the capture mode. Additionally, the row scanning circuit 3220 is an exemplary row scanning part described in CLAIMS.

The transfer signal generation circuit 3230 outputs a transfer signal to each of the pixels in the selected row according to the timing signal Tc and the control signal thereby to drive the pixel. The transfer signal is set at high level in a case where a pixel is driven, and is set at low level in a case where it is not driven, for example. The transfer signal generation circuit 3230 acquires a timing when the row scanning circuit 3220 selects a row from the timing signal Tc. The transfer signal generation circuit 3230 drives the respective normal pixels in the selected row at the same time in synchronization with the row selection timing within the normal pixel output period. The transfer signal generation circuit 3230 then drives the respective phase difference pixels in the selected row at the same time in synchronization with the row selection timing within the phase difference pixel output period. However, a smaller number of rows are selected in the live view mode than in the capture mode, and thus the normal pixel output period and the phase difference pixel output period are shorter. Additionally, the transfer signal generation circuit 3230 is an exemplary drive part described in CLAIMS.

The pixel array part (pixel region) 3240 is configured in which a plurality of phase difference pixels 3241 and a plurality of normal pixels 3242 are two-dimensionally arranged in a grid shape, for example. Each of the pixels outputs a pixel signal as an electric signal at a potential depending on the amount of received light to the A/D conversion part 3260 via a signal line of a corresponding column among signal lines 3249-1 to 3249-m in a case where it has a high-level row selection signal and a high-level transfer signal input.

The D/A conversion part 3250 digital to analog (D/A) converts the reference voltage value from the timing control circuit 210, and supplies a reference voltage Vref to the A/D conversion part 260.

The A/D conversion part 3260 converts an analog pixel signal into a digital signal. The A/D conversion part 3260 includes a plurality of (m, for example) A/D conversion circuits. Each of the A/D conversion circuits includes a comparator 3262 and a memory 3263. The comparator 3262 is directed to comparing the referring voltage Vref with a voltage of a pixel signal and to outputting a comparison result. Each A/D conversion circuit integrates a pixel signal by an integration circuit (not illustrated), for example, and causes the counter 3270 to count the period until the output value of the comparator 3262 indicates that the integrated voltage exceeds the reference voltage Vref. The value counted by the counter 3270 is then held as a pixel value in the memory 3263.

The memories 3263 are directed to holding pixel values. Each memory 3263 has a column selection signal input via a signal line of a corresponding column among signal lines 3298-1 to 3298-m. A column selection signal is directed to selecting a memory 3263 corresponding to a column and to causing it to output a pixel value. For example, the column selection signal is set at high level in a case where a pixel value is to be output, and is set at low level in a case where it is not to be output. The memory 3263 outputs a pixel value via a signal line 3209 in a case where the column selection signal is at high level.

The column scanning circuit 3290 reads and outputs a pixel value of each of the pixels in the selected row according to the timing signal Tr and the control signal. The transfer signal generation circuit 3230 reads and outputs the pixel values of the normal pixels held in the A/D conversion part 3260 in a predetermined order whenever it has a timing signal Tr input within the normal pixel output period. Further, the transfer signal generation circuit 3230 reads and outputs the pixel values of the phase difference pixels held in the A/D conversion part 3260 in a predetermined order whenever it has a timing signal Tr input. Here, the column scanning circuit 3290 counts the number of times of the timing signal Tr thereby to acquire the start and end points of each of the normal pixel output period and the phase difference pixel output period. For example, the normal pixel output period is a period after the first timing signal Tr is input and until the n-th timing signal Tr is input during image shooting for n rows. However, a smaller number of rows are selected in the live view mode than in the capture mode, and thus the number of rows for the timing signals counted in each period is also smaller. Additionally, the column scanning circuit 3290 is an exemplary column scanning part described in CLAIMS.

Figure 8:
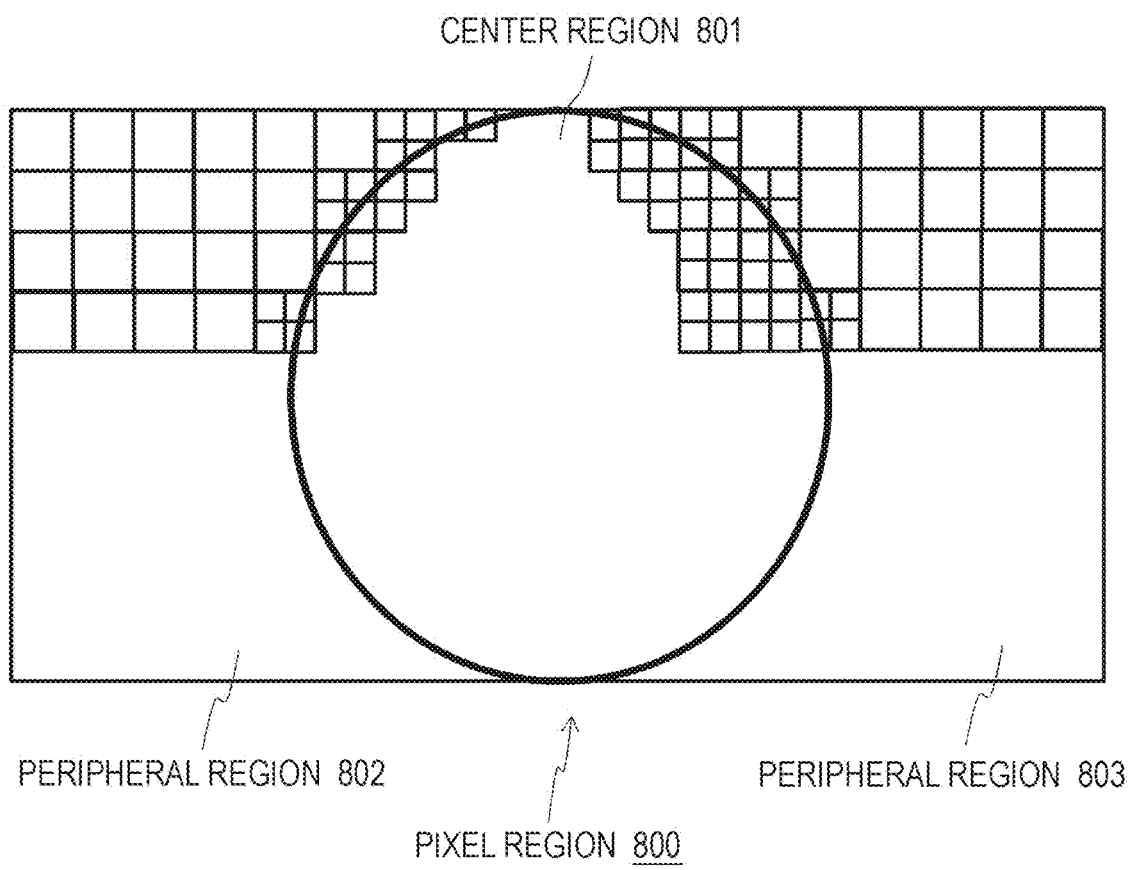
FIG. 8 is a diagram illustrating a configuration of a pixel region 800 of an imaging device applicable to a vehicle-mounted camera.

FIG. 8 illustrates an exemplary configuration of a pixel region 800 of an imaging device applicable as a vehicle-mounted camera according to the present embodiment. The illustrated pixel region 800 is divided into a plurality of regions, pixels in a different size are arranged in each region, and a sensitivity or a resolution per region is optimized depending on an application (or a driving situation during shooting).

In the example illustrated in FIG. 8, the pixel region 800 of the imaging device is divided into three regions including a center region 801 and peripheral regions 803 and 802 on the right and left of the center region 801, respectively. As described below, region division is realized by independent control of pixels or pixel region such as the AD conversion processing per region or independent reading in units of pixel. The peripheral regions 802 and 803 are higher in sensitivity than the center region 801 so that the exposure time can be shortened and consequently the frame rate can be increased, thereby eliminating blur or focal plane distortion in the peripheral regions 802 and 803.

A method for realizing high sensitivity in each divided region may be a method using gain control (largely increasing a gain in a region in which the sensitivity is to be increased) or pixel addition or a method by adjusting a pixel size (increasing a pixel size of a region in which the sensitivity is to be increased). For example, gain control or pixel addition is performed on part of a region thereby to increase the sensitivity of the region. Further, adjusting a pixel size employs a method for manufacturing a dedicated imaging device mounting pixels in a different size per region. For example, a region in which large-size pixels are arranged has a higher sensitivity than a region in which small-size pixels are arranged. Additionally, a region on which pixel addition is performed can be assumed to adjust an apparent pixel size to be larger.

Figure 33:
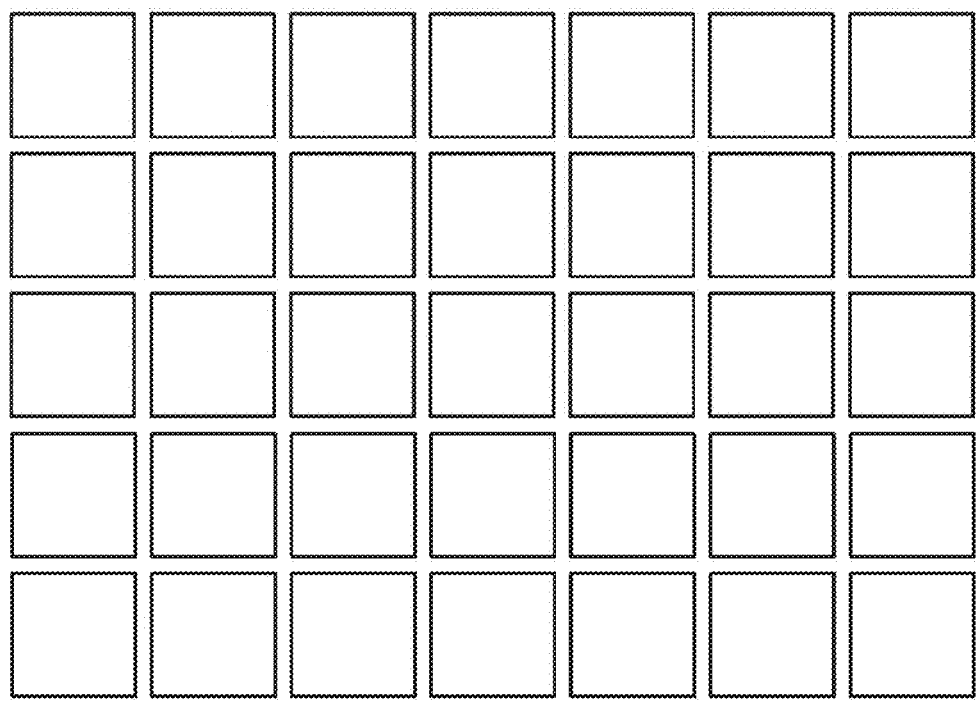
FIG. 33 is a diagram illustrating an exemplary configuration of a pixel region configured of uniform-size pixels.
Figure 34:
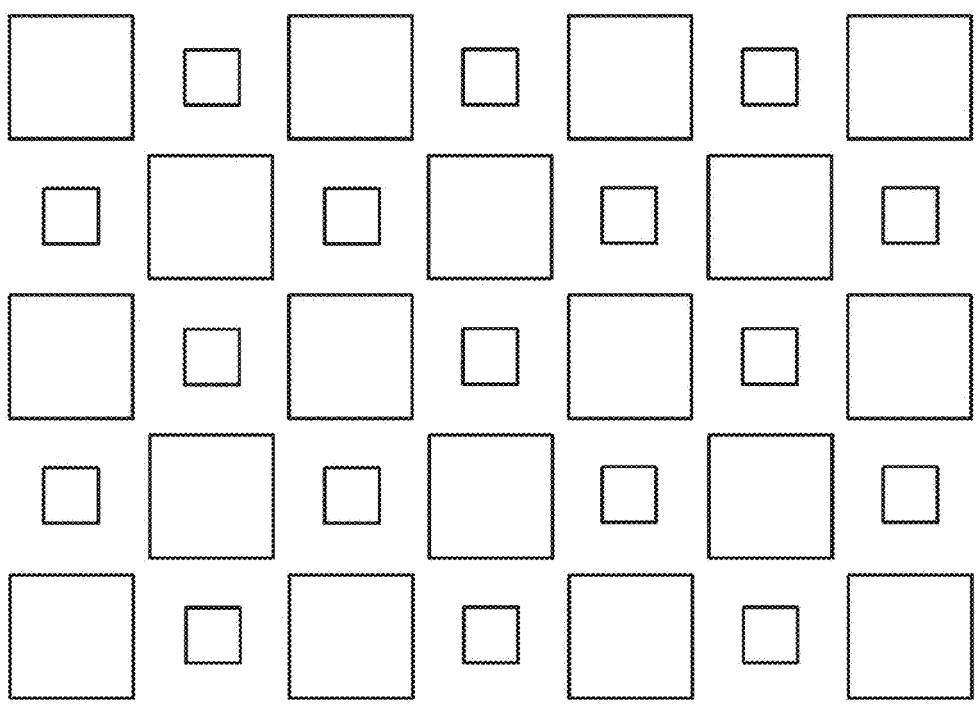
FIG. 34 is a diagram illustrating an exemplary configuration of a pixel region configured of uniform-size pixels.
Figure 35:
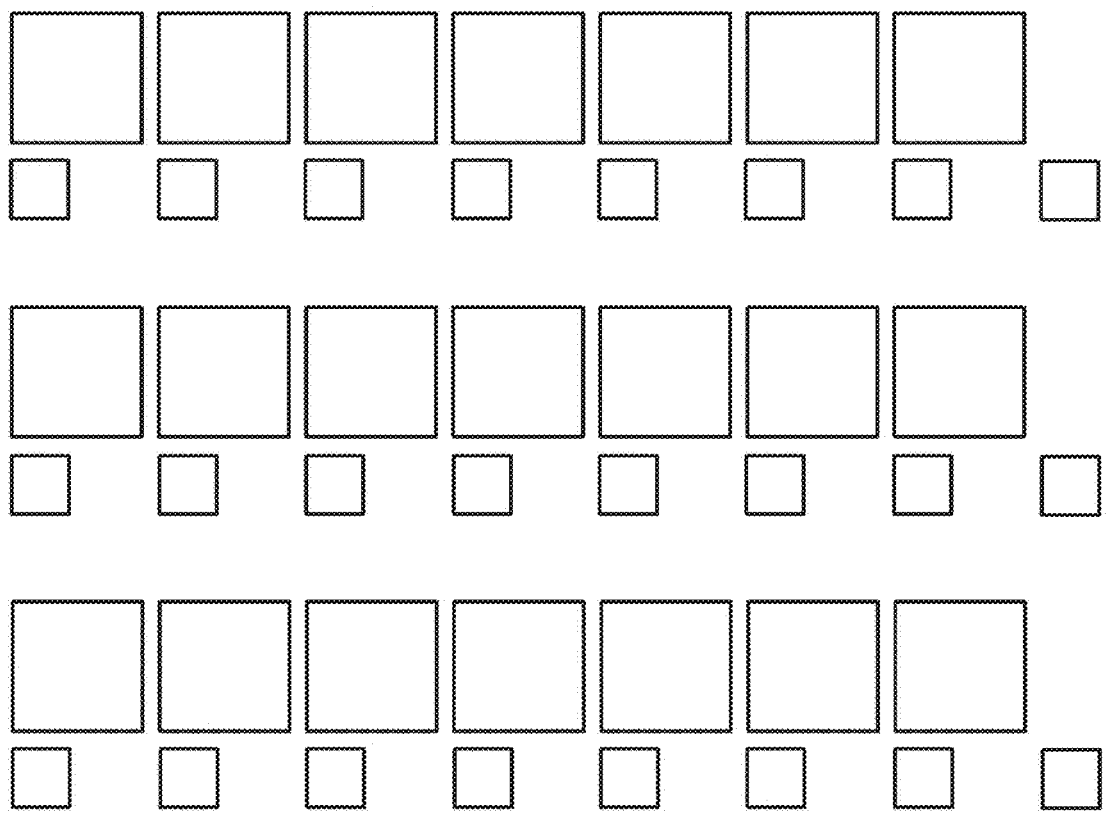
FIG. 35 is a diagram illustrating an exemplary configuration of a pixel region configured of uniform-size pixels.

In the example illustrated in FIG. 8, fine pixels are arranged in the center region 801, while large-size pixels are arranged in each of the peripheral regions 802 and 803. However, the following description assumes that pixel addition is performed in the peripheral regions 802 and 803 both in an imaging device manufactured with a pixel size changed per divided region and in an imaging device in which uniform-size pixels are arranged over the pixel region. Further, FIG. 8 illustrates a pixel arrangement of only part of each of the regions 801 to 83 for simple illustration. Additionally, the arrangement of uniform-size pixels over the pixel region includes a case where pixels in different sizes are mixed but pixels in each size are uniformly distributed in the pixel region as illustrated in FIG. 34 or FIG. 35 in addition to a case where all the pixels are in the same size as illustrated in FIG. 33.

The center region 801 is configured of fine pixels, and thus realizes high-resolution shooting. On the other hand, the peripheral regions 802 and 803 are configured of large-size pixels and thus have a low resolution. It is not an object to shoot the peripheral regions 802 and 803 at a low resolution, but the large-size pixels have a large light receiving area, thereby realizing high sensitivity. Thus, due to high sensitivity, the exposure time of the peripheral regions 802 and 803 can be shortened and blur can be reduced when fast driving or shooting a moving object. Further, the exposure time is increased so that the peripheral regions 802 and 803 (which are not irradiated by the headlamps) can be shot at a sufficient sensitivity while traveling during the nighttime or in a dark place.

Further, when the pixel size is increased and the resolution is lowered, the number of pixels per row (or per unit length) is reduced, and thus the reading speed of the peripheral regions 802 and 803 improves (assuming that the pixel rate (reading time per pixel) is constant). Therefore, the peripheral regions 802 and 803 can be shot at a high frame rate (or can be continuously shot at a high speed), and the peripheral regions 802 and 803 are continuously shot at a high speed when fast driving or shooting a moving object, thereby improving the object recognition rate of the moving object.

If the imaging device in which pixels in different sizes are arranged between the center region and the peripheral regions as illustrated in FIG. 8 is employed, the shooting conditions (exposure condition, sensitivity, frame rate, and reading speed) can be controlled per region. A method for configuring an imaging device with a different pixel size per region may be a method for apparently increasing a pixel size of part of a region by a signal processing such as pixel addition or gain adjustment in an imaging device in which uniform-size pixels are arranged, or a method for manufacturing an imaging device in which pixels in a different size are arranged per region. In consideration of design or productive efficiency of pixels or on-chip lenses, the former configuration method using an imaging device in which uniform-size pixels are arranged is more advantageous. Further, the former method is advantageous in that the position and the size of each of the center region and the peripheral regions can be adaptively changed by a signal processing. Additionally, the technology for the imaging device in which pixels in different sizes are arranged is disclosed also in Patent Document 3 or Patent Document 4, for example.

Figure 9:
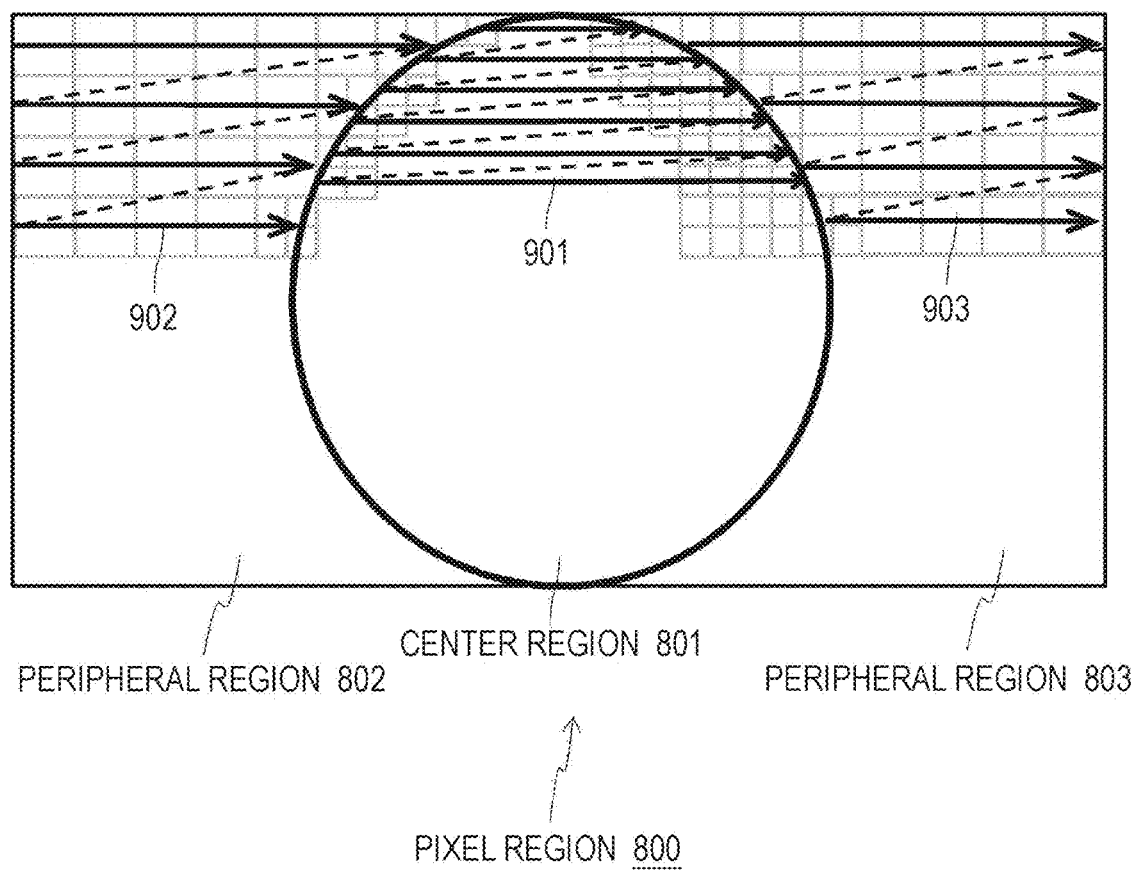
FIG. 9 is a diagram illustrating how the pixel region 800 is scanned per divided region.

Further, the present embodiment assumes that the pixel region 800 of the imaging device is scanned (pixels are read) per divided region in parallel. FIG. 9 illustrates how the pixel region 800 is scanned per divided region. In the Figure, scan lines in the respective regions including the center region 801 and the peripheral regions 802 and 803 are denoted with reference numerals 901, 902, and 903, respectively. The center region 801 is different in pixel size from the peripheral regions 802 and 803, and an interval between the scan lines is different therebetween. That is, the number of scan lines in the peripheral regions 802 and 803 is smaller and the reading time per line is shorter than in the center region 801, and thus a time to read one frame can be shorter in the peripheral regions 802 and 803, thereby achieving a higher frame rate.

Figure 10:
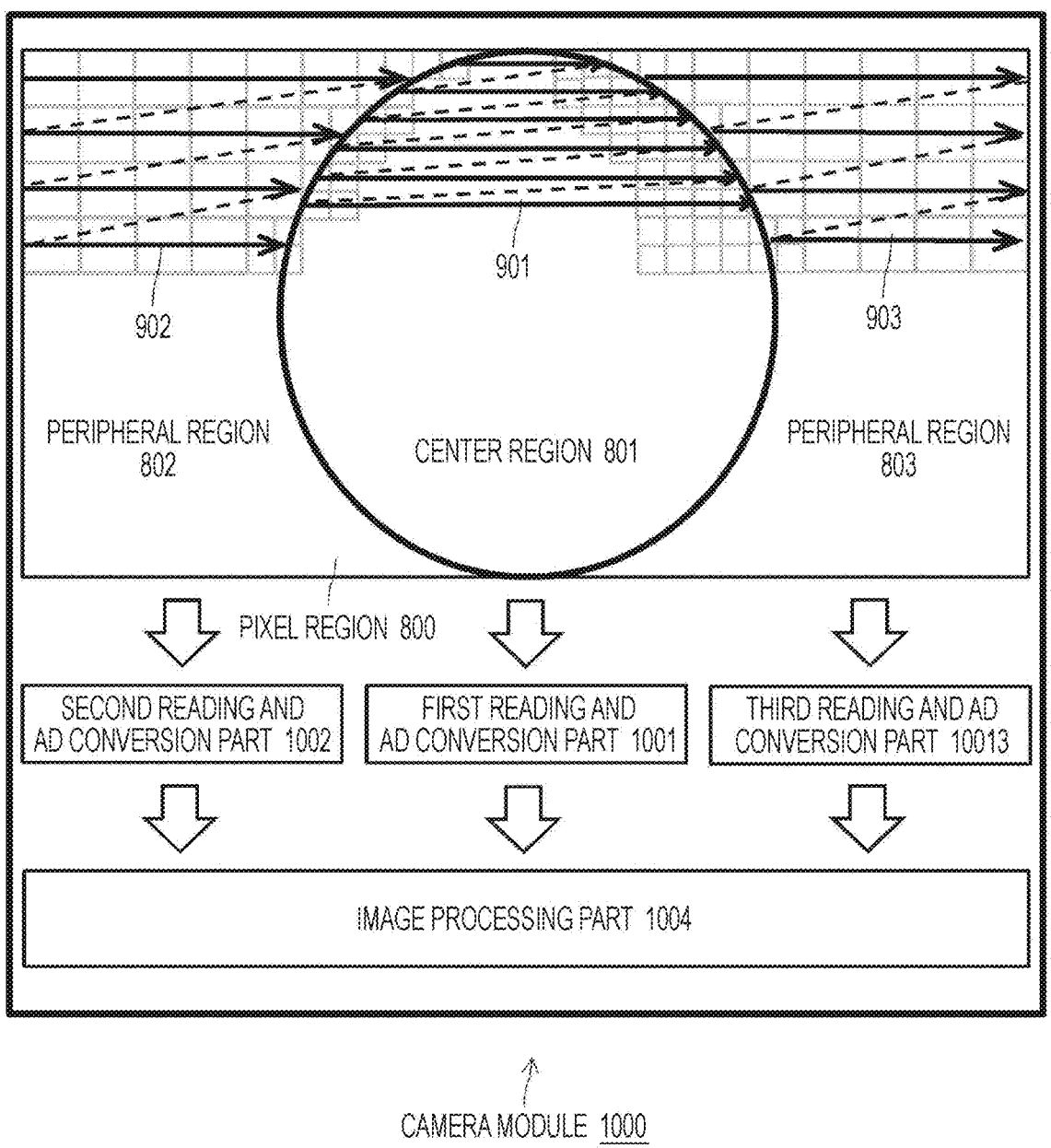
FIG. 10 is a diagram schematically illustrating an exemplary configuration of a camera module 1000 for reading the respective regions 801 to 803 in the pixel region 800 of the imaging device in parallel.

FIG. 10 schematically illustrates an exemplary configuration of a camera module 1000 configured to read each of the regions 801 to 803 in the pixel region 800 of the imaging device in parallel. In the Figure, a first reading and AD conversion part 1001 reads a pixel in the center region 801 and AD-converts a reading signal. Further, a second reading and AD conversion part 1002 and a third reading and AD conversion part 1003 read a pixel in the peripheral regions 802 and 803 and AD-convert a reading signal in parallel with the first reading and AD conversion part 1001. Each of the reading and reading signal AD conversion parts 1001 to 1003 outputs the AD-converted pixel signal to an image processing part 1004. The shooting apparatus can be configured in which the pixel array in which pixels in different sizes are arranged in the center region 801 and the peripheral regions 802 and 803 is assumed as the first layer, the reading signal AD conversion parts 1001 to 1003 in the regions 801 to 803 are assumed as the second layer, and the image processing part 1004 at the final stage is assumed as the third layer and the layers are laminated. The image processing part 1004 performs the object recognition processing or the like on a moving object captured in each of the regions 801 to 803, for example. The pixel region 800 is scanned per divided region in parallel and is subjected to a signal processing such as AD conversion, thereby individually controlling the exposure time or the frame rate per region. Additionally, the pixel region 8000 and the AD conversion parts 1001 to 1003 are generally combined (or including a memory region configured to accumulate AD-converted pixel signals as needed) thereby to configure a single imaging device, and the image processing part 1004 at the latter stage is added to the imaging device thereby to configure the shooting apparatus (camera module). However, in the case of a vehicle-mounted camera, the function corresponding to the image processing part 1004 is not mounted as a circuit module in the camera module, but may be integrated in a control circuit chip of the vehicle.

Assuming that the pixel rate is constant, the center region 801 has a small pixel size and a high resolution, but the reading speed of the reading signal AD conversion part 1001 is lower as the number of pixels per line is larger, and thus the frame rate in the center region 801 is lower. On the other hand, the peripheral regions 802 and 803 have a large pixel size, and thus have a high sensitivity and a low resolution, but if the respective reading and reading signal AD conversion parts 1001 to 1003 are assumed as circuits operating at the same operation frequency in the same chip, a higher frame rate of the peripheral regions 802 and 803 can be realized.

Additionally, the imaging device, which is configured such that a signal processing such as AD conversion per region can be performed in parallel, is disclosed also in Patent Document 5 or Patent Document 6, for example.

Figure 11:
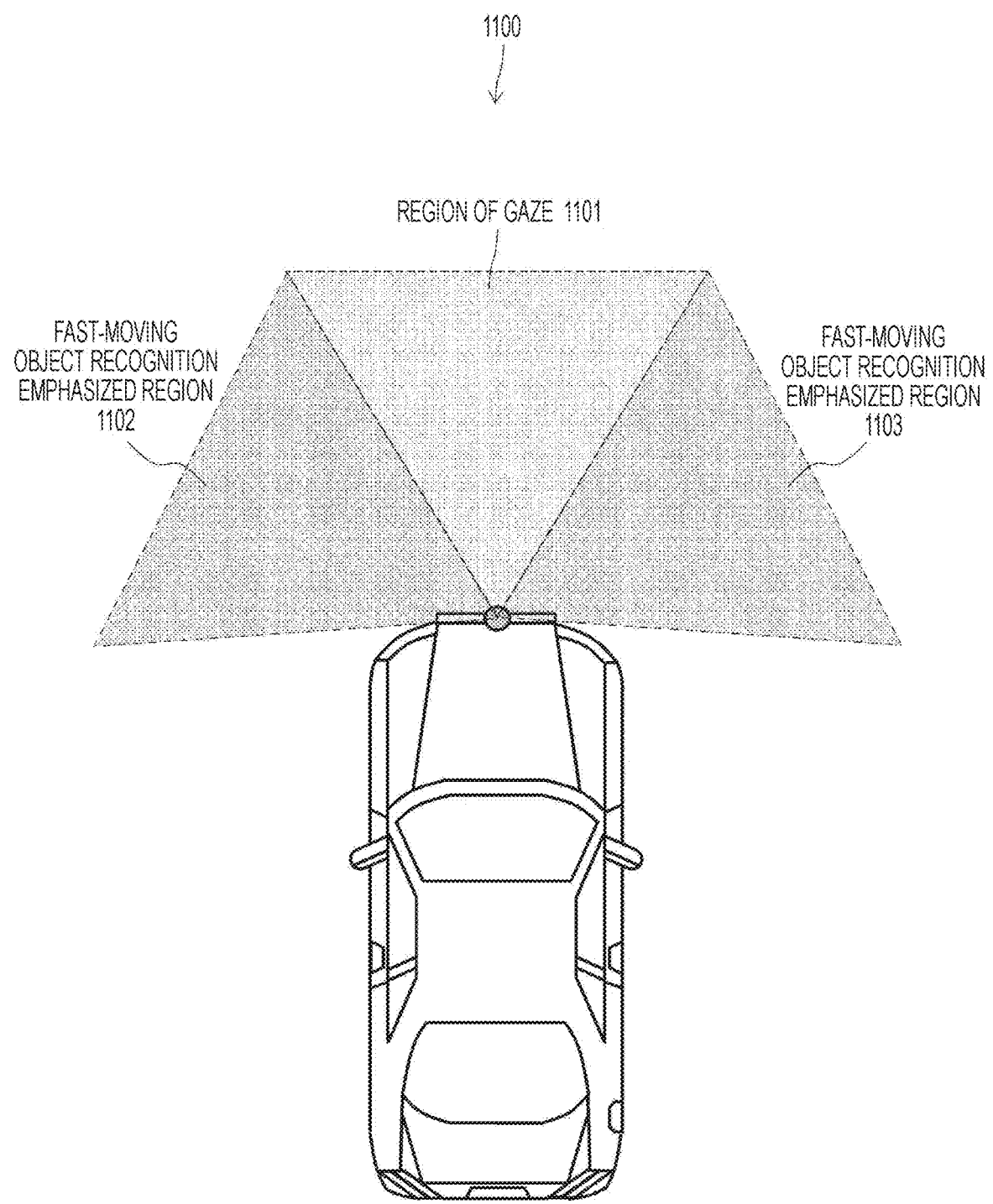
FIG. 11 is a diagram illustrating a shooting range 1100 when the shooting apparatus with the configuration illustrated in FIG. 8 to FIG. 10 is installed on the front nose of a vehicle.

FIG. 11 schematically illustrates a shooting range 1100 when the shooting apparatus having the configuration illustrated in FIG. 8 to FIG. 10 is installed near the center of the front nose of the vehicle such that the eye direction matches with the traveling direction of the vehicle. The shooting apparatus divides and shoots the shooting range 1100 into three shooting ranges 1101 to 1103, and performs an image processing.

The shooting range denoted with the reference numeral 1101 is a region of gaze which is shot at a high resolution in the center region 801 in the pixel region 800. For example, an object, which enters the region of gaze, such as the back of a leading vehicle, a road sign (road guidance) installed along a road, a road sign drawn on a road, the tail lamps of a leading vehicle, or a pedestrian walking on a crosswalk, can be shot at a high resolution in the center region 801. Further, the image processing part 1004 can accurately recognize the object from the image shot in the center region 801, or can measure the distance to the object.

On the other hand, the shooting ranges denoted with the reference numerals 1102 and 1103 are fast-moving object recognition emphasized regions shot in the peripheral regions 802 and 803 in the pixel region 800. As previously described with reference to FIG. 3, while the vehicle is driving at a high speed, an object coming into the shooting range 1102 or 1103 moves faster than an object in the shooting range 1101. The peripheral regions 802 and 803 are configured of large-size pixels and have a low resolution, but have a high reading speed, thereby shooting at a high frame rate (or continuously shooting at a high speed) and improving a fast-moving object recognition accuracy. Further, the peripheral regions 802 and 803 have a large pixel size and a high sensitivity, and thus the exposure time can be further shortened and blur can be further reduced than in the region of gaze 1101.

Additionally, the fast-moving object recognition emphasized regions are not shot in the peripheral regions 802 and 803 with a low resolution and a high sensitivity in the pixel region 800, but an edge processing may be applied to images shot in the peripheral regions 802 and 803 with a still high resolution (in the development process, for example), thereby enhancing the object recognition rate.

B-3. Shooting Condition Processing Per Region

The shooting apparatus illustrated in FIG. 8 to FIG. 10 is configured to scan the pixel region 800 per divided region in parallel and to perform a signal processing, and can individually control the shooting conditions such as exposure time, sensitivity, frame rate, and reading speed per region (as described above).

Figure 12:
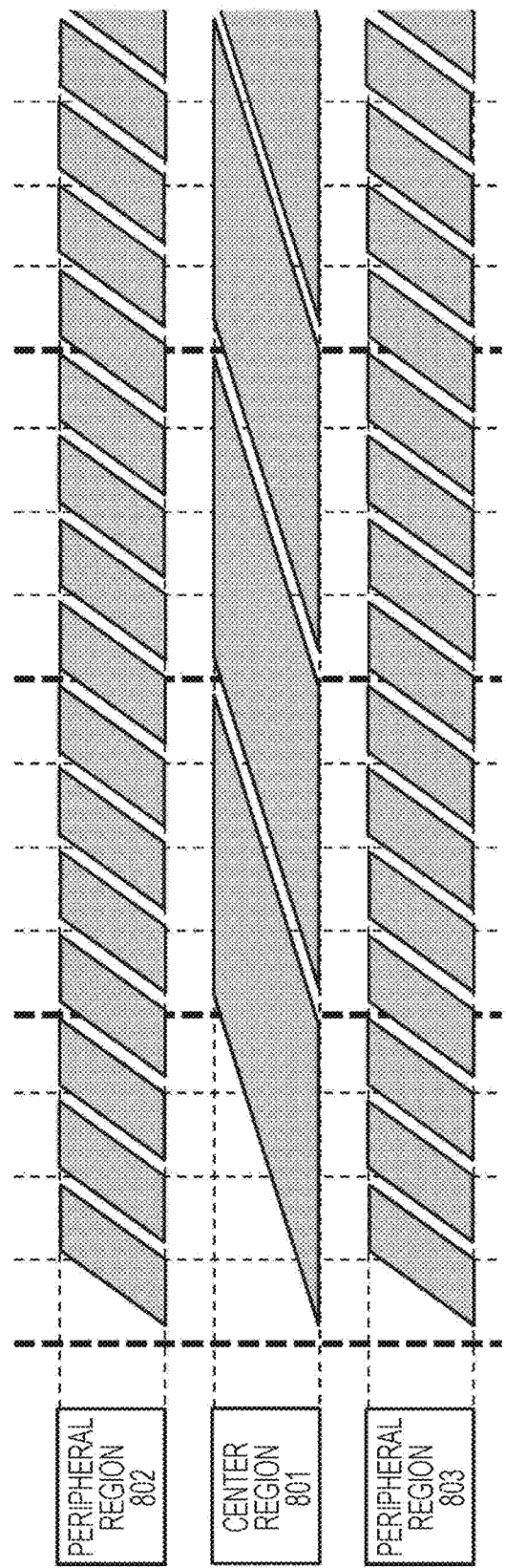
FIG. 12 is a diagram illustrating an exemplary timing chart of an exposure/reading processing per region in the pixel region 800.

FIG. 12 illustrates an exemplary timing chart on the exposure/reading processing per region in the pixel region 800. As described above, the exposure/reading processing in the center region 801 and the peripheral regions 802 and 803 is performed in parallel. The horizontal axis is a time axis and the vertical axis is a scan line (row number) in the Figure. Here, the imaging device assumes an imaging device configured to perform the reading operation per row such as CMOS image sensor.

Figure 13:
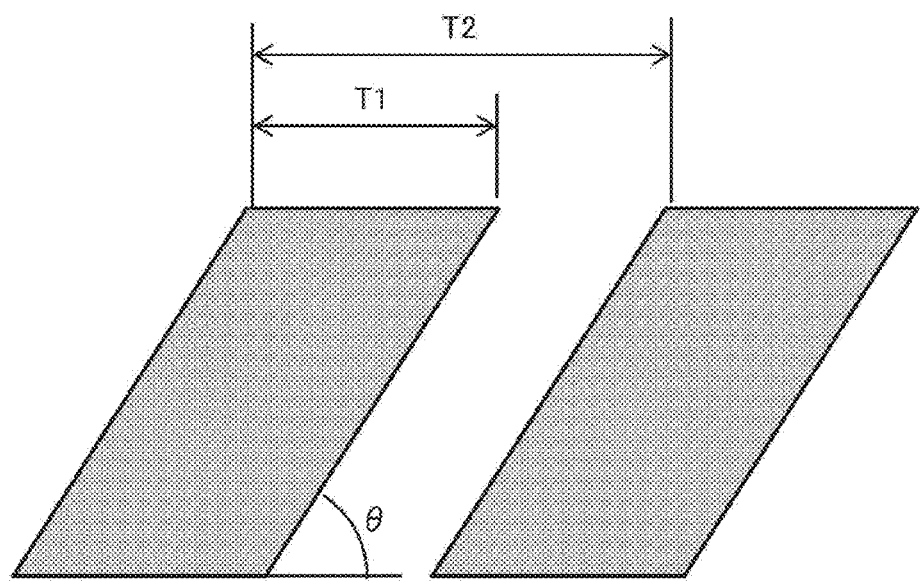
FIG. 13 is a diagram illustrating a timing chart of the exposure processing for one frame.

The parallelograms in gray in FIG. 12 indicate an exposure operation in each of the center region 801 and the peripheral regions 802 and 803. Here, a time T1 corresponding to a length of the base of a parallelogram is an exposure time for one scan line with reference to FIG. 13 illustrating the timing chart of the exposure processing for one frame. The exposure time is basically determined by the shutter speed. Further, a time T2 corresponding to an interval between adjacent parallelograms is a frame interval, and a value obtained by dividing a unit time by T2 indicates a frame rate. Further, an angle θ formed between an oblique side and the base of a parallelogram corresponds to an offset in reading time per scan line, or a reading speed. When the reading speed is low, the angle θ is small, and focal plane distortion (described above) easily occurs when shooting a moving object. To the contrary, when the reading speed is high, the angle θ is large, and focal plane distortion can be restricted. At a lower resolution (or in a smaller number of pixels per line), the reading speed is higher. The reading speed is higher also at a higher AD conversion speed.

Referring to FIG. 12 again, it is assumed that the center region 801 is configured of small-size pixels and a high-resolution image is shot therein. On the other hand, the peripheral regions 802 and 803 are configured of large-size pixels and have a high sensitivity, and thus can have a shorter exposure time than the center region 801 (the length (T1) of the base of a parallelogram of the peripheral regions 802 and 803 is shorter in FIG. 12). Thus, it is possible to reduce blur occurring in the landscapes in the peripheral regions when shooting a moving object or fast driving. Further, a higher frame rate may be achieved by use of the short exposure time of the peripheral regions 802 and 803 (the interval T2 between adjacent parallelograms can be reduced in FIG. 13), thereby improving the object recognition accuracy when fast driving or shooting a moving object.

Further, the peripheral regions 802 and 803 are set at a lower resolution, and thus can be higher in the reading speed than the center region 801. Therefore, the tilt θ of oblique lines of a parallelogram of the peripheral regions 802 and 803 is larger, thereby restricting focal plane distortion. Of course, the reading speed is higher also by increasing the signal processing speed (such as AD conversion speed) in the peripheral regions, not setting the peripheral regions at a lower resolution, thereby restricting blur or focal plane distortion.

Essentially, the peripheral regions 802 and 803 can be set at a higher frame rate and accurate object recognition can be performed therein by the exposure/reading operation as illustrated in FIG. 12, and blur in a fast-moving object can be reduced due to the short exposure time. The exposure/reading operation illustrated in FIG. 12 is effective when the vehicle is driving at a high speed or a moving object is recognized, for example.

For example, in a case where the technology disclosed in the present specification is applied to the shooting part 2916 configured to shoot behind the vehicle when the vehicle changes lanes for passing while traveling on an expressway, the lanes shot in the peripheral regions or an approaching vehicle is accurately recognized, thereby performing accurate passing control.

Figure 14:
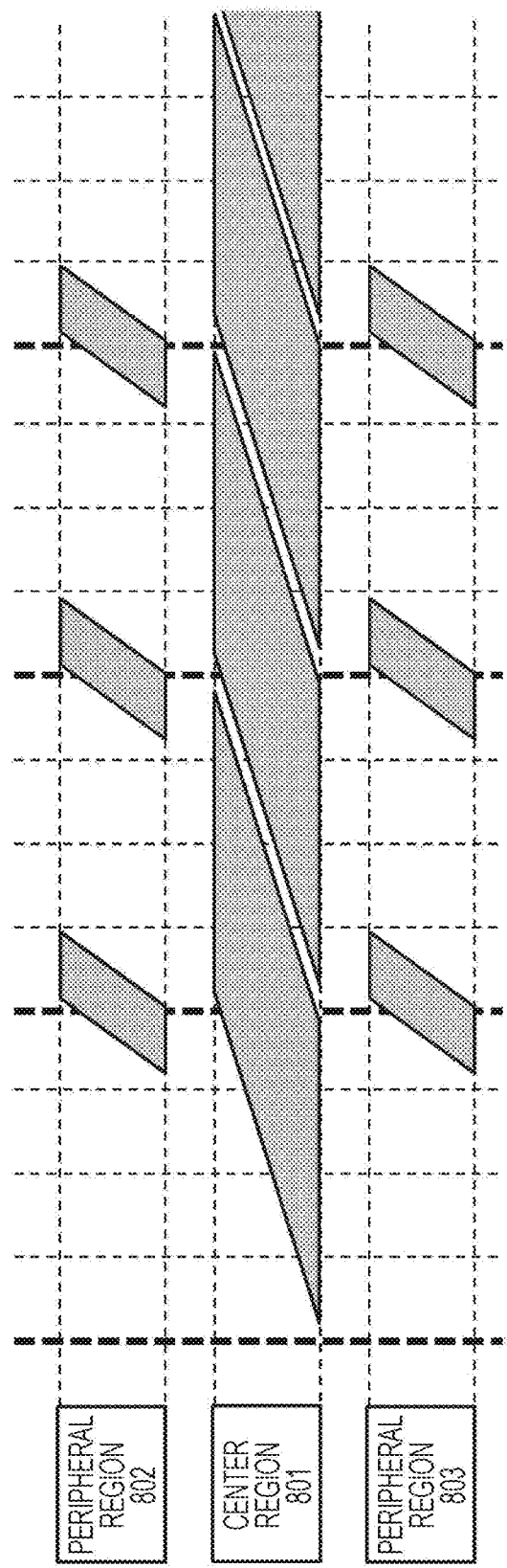
FIG. 14 is a diagram illustrating other exemplary timing chart of the exposure/reading processing per region in the pixel region 800.

FIG. 14 illustrates other exemplary timing chart on the exposure/reading processing in the pixel region 800. The processing is common with the reading processing illustrated in FIG. 12 in that the peripheral regions 802 and 803 are shot in a shorter exposure time than the center region 801, but is different therefrom in that the peripheral regions 802 and 803 are set at the same frame rate as the center region 801 (or the peripheral regions 802 and 803 are horizontally flowed at a high speed). Fast reading is performed in the peripheral regions 802 and 803, blur or focal plane distortion in a moving object is reduced, and thus a fast-moving object can be accurately recognized even not at a high frame rate.

Figure 15:
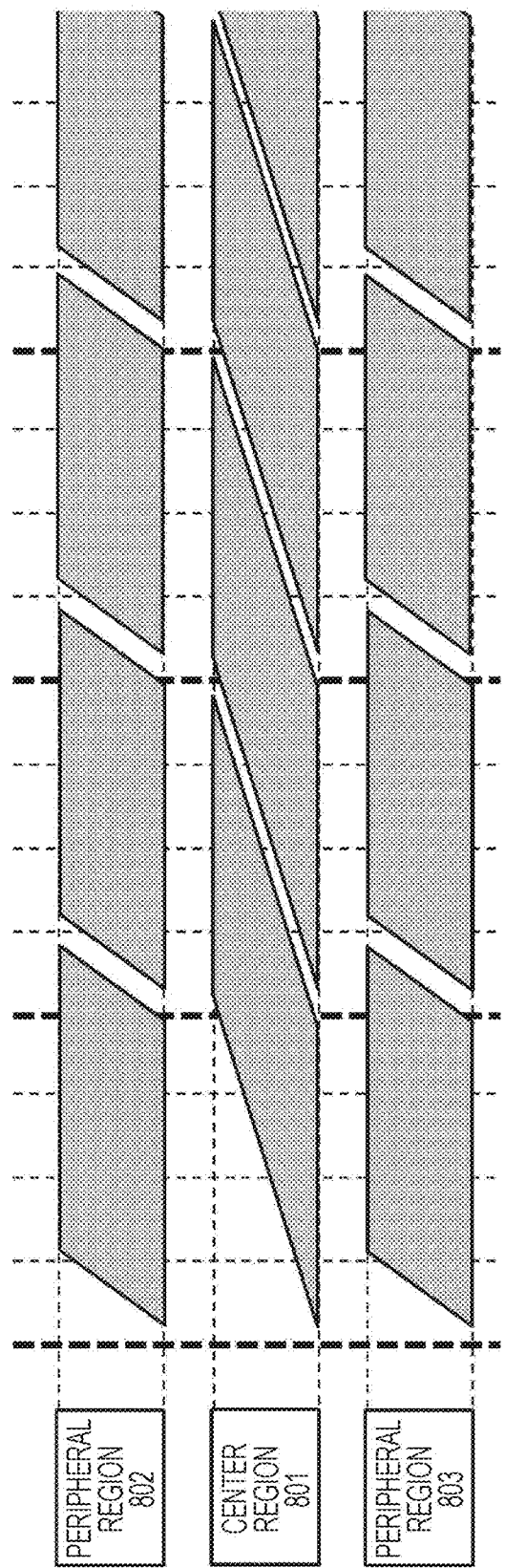
FIG. 15 is a diagram illustrating other exemplary timing chart of the exposure/reading processing per region in the pixel region 800.

Further, FIG. 15 illustrates still other exemplary timing chart on the exposure/reading processing in the pixel region 800. In the illustrated example, the peripheral regions 802 and 803 and the center region 801 are set at the same exposure time and at the same frame rate for shooting. Large-size pixels are arranged in the peripheral regions 802 and 803, and the sensitivity therein is higher for the light receiving area even in the same exposure time (described above). Therefore, the exposure time of the peripheral regions 802 and 803 is set as long as that of the center region 801, and thus visibility of a low-illuminance object is improved. For example, low-illuminance objects, which are not irradiated by the headlamps, are shot in the peripheral regions 802 and 803 while traveling during the nighttime (see FIG. 7, for example), but the low-illuminance objects can be captured at a high sensitivity by the exposure processing illustrated in FIG. 15. Though not illustrated, the exposure time of the peripheral regions 802 and 803 may be longer than that of the center region 801. When the images in the respective regions 801 to 803 shot under different exposure conditions are read and combined into one image, gray level correction is made thereby to acquire the entire image with high visibility.

Additionally, a change in the image per frame in the center region is small as described with reference to FIG. 3. Thus, a plurality of frames in the center region may be combined and displayed. For example, a plurality of frames of the center region shot while changing exposure are high dynamic range (HDR) combined thereby to generate an image with a wide dynamic range.

B-4. Shooting Condition Control Depending on Driving Situation

With the shooting apparatus including the imaging device in which pixel sizes are different between the center region and the peripheral regions as illustrated in FIG. 8 to FIG. 10, the shooting conditions of the peripheral regions 802 and 803 are adaptively controlled relative to the center region 801 depending on a driving situation of the vehicle, thereby realizing a reduction in blur, the accurate recognition processing on a moving object, high-sensitivity shooting of a low-illuminance object, and the like. The adjustment parameters of the shooting conditions of the peripheral regions 802 and 803 may be exposure time, sensitivity, frame rate, resolution, and reading speed. The appropriate shooting conditions of the peripheral regions 802 and 803 in each driving situation are indicated per adjustment parameter in the following Table 1. However, the Table indicates that differential adjustment of the peripheral regions 802 and 803 is made relative to the center region 801 by way of example, and indicates "high" or "low" relative to the center region 801. Further, the adjustment parameters which do not need the differential adjustment (or which may require normal adjustment) are denoted with "–". Additionally, the definitions of "exposure time" and "frame rate" in the Table are as described above.

TABLE 1

| Driving situation | Shooting conditions of peripheral regions | | | |
| --- | --- | --- | --- | --- |
| | Exposure time | Sensitivity | Frame rate | Reading speed |
| During stop/normal traveling | — | — | — | — |
| During fast traveling | Short | — | High | High |
| Going-through/downtown | Short | High | — | — |
| Nighttime, dark place | Long | High | — | — |
| Moving object recognition | Short | High | High | High |
| Abnormal driving | — | — | High | High |
| Traveling in tunnel | — | High | High | — |

Effects by adjusting each adjustment parameter and an adjustment method will be first described. The exposure time can be basically adjusted by the shutter speed of the shooting apparatus. When the exposure time is shortened, the shutter speed is increased (as described above), thereby restricting blur. Thus, the exposure time is shortened, thereby reducing blur occurring in the landscapes in the peripheral regions when shooting a moving object or fast driving. The amount of received light of the imaging device is small in a short exposure time, and thus the sensitivity lowers or the sensitivity needs to be increased. To the contrary, there is an effect that the amount of received light of the imaging device increases and the sensitivity is high in a long exposure time.

When the sensitivity is increased, an object can be shot in a dark place such as during the nighttime or in a tunnel (or in the peripheral regions where the lights emitted from the headlamps do not reach). Further, shooting in a short exposure time is enabled at a high sensitivity, and consequently there can be derived an effect that blur occurring in the landscapes in the peripheral regions is reduced in a short exposure time when shooting a moving object or fast driving. For example, the gain in the shooting signal processing is increased thereby to increase the sensitivity. Further, when the pixel size is increased, the amount of received light per pixel increases and a high sensitivity is achieved. With the imaging device equipped with the pixel addition function, the apparent pixel size increases by addition, and the sensitivity similarly increases. However, when the pixel size is increased or pixel addition is performed, the resolution lowers.

When the frame rate is increased, the number of frames processed per unit time increases, and thus a motion of a moving object can be smoothly captured, thereby reducing blur occurring in the landscapes in the peripheral regions while fast driving. The shooting signal processing speed has to be increased in order to increase the frame rate, but a high frame rate can be realized by increasing the AD conversion speed or the circuit operation clock frequency. Further, the exposure time needs to be short in order to increase the frame rate, and the sensitivity lowers or the sensitivity needs to be increased. A method for improving a gain, increasing a pixel size, performing pixel addition or thinning reading, or the like is employed in order to increase the sensitivity. However, when pixel addition or thinning reading is performed, the resolution lowers. When pixel addition is performed, the sensitivity increases, but the sensitivity does not improve by thinning reading.

When the reading speed is increased, the reading time is shortened (or the angle θ in FIG. 13 increases), thereby reducing focal plane distortion when shooting a moving object. The shooting signal processing speed is increased (the AD conversion speed is improved by largely increasing the circuit operation clock frequency, for example), thereby increasing the reading speed.

During normal (or low-speed) traveling or backward traveling, the frame rate and the exposure time are the same between the center region and the peripheral regions (see FIG. 15, for example), and an image is uniform between the center region and the peripheral regions. For example, when the drive system control unit 2100 recognizes normal traveling or backward traveling on the basis of the rotation speed of the wheels detected by the vehicle state detection part 2110, the vehicle exterior information detection unit 2400 may designate the frame rate and the exposure time of the peripheral regions for the shooting part 2410.

During fast traveling, the peripheral regions are set at a shorter exposure time, a higher frame rate, and a higher reading speed than the center region (see FIG. 12, for example). The center region is set at a normal frame rate and a normal exposure time with the resolution emphasized (or still at a high resolution). On the other hand, the exposure time is shortened in the peripheral regions, thereby reducing blur occurring in the landscapes in the peripheral regions when fast driving. Additionally, it may be preferable that the peripheral regions are set at a high sensitivity in order to compensate for the exposure in a short exposure time. Further, the peripheral regions are set at a high frame rate, thereby reducing blur occurring in the landscapes in the peripheral regions. Further, the peripheral regions are set at a high reading speed, thereby reducing focal plane distortion occurring in the landscapes in the peripheral regions while fast driving. The frame rate is increased, the exposure time is shortened, and the resolution of a moving object is emphasized. For example, when the drive system control unit 2100 recognizes fast traveling on the basis of the rotation speed of the wheels detected by the vehicle state detection part 2110, the vehicle exterior information detection unit 2400 may designate at least one of the shorter exposure time, the higher frame rate, and the higher reading speed of the peripheral regions for the shooting part 2410.

While going through or traveling downtown, an object approaching by the vehicle needs to be sensed. Thus, while going through or traveling downtown, the peripheral regions are set at a shorter exposure time and a higher sensitivity than the center region. The exposure time is shortened, and thus an object approaching by the vehicle can be captured with less blur. Further, the sensitivity is increased, and thus shooting is enabled in a short exposure time. For example, whether the street is narrow or whether a building is approaching is sensed on the basis of map information or road information acquired in the navigation system included in the instrument panel 2730, and the vehicle exterior information detection unit 2400 may designate the shorter exposure time and the higher sensitivity of the peripheral regions for the shooting part 2410.

However, it is enough that the exposure time is shortened and the sensitivity is increased only in a peripheral region where an object is approaching, not in both regions, while going through or traveling downtown (a peripheral region where a moving object to be recognized is not present does not need to be adjusted). For example, which side of the vehicle an object is approaching is recognized on the basis of a recognized object in an image shot by the shooting part 2410, or the surrounding information detection sensor included in the vehicle exterior information detection part 2420, and the vehicle exterior information detection unit 2400 may designate the frame rate and the exposure time of the peripheral region for the shooting part 2410.

It is assumed that while traveling during the nighttime or in a dark place (such as in a tunnel), the headlamps are lit to illuminate the center region but the lights emitted from the headlamps do not reach the peripheral regions. Thus, while traveling during the nighttime or in a dark place (such as in a tunnel), assuming that both the peripheral regions 802 and 803 and the center region 801 are adjusted at a high sensitivity, the peripheral regions 802 and 803 are further adjusted at a longer exposure time and a higher sensitivity. Since when the exposure time is increased, the amount of received light of the imaging device increases, the peripheral regions where the lights emitted from the headlamps do not reach can be shot at a high sensitivity. Further, the peripheral regions are configured of an imaging device in a large pixel size or are subjected to pixel addition, thereby shooting at a low resolution but at a high sensitivity. For example, the vehicle exterior information detection unit 2400 may output an instruction in response to an input operation to the shooting part 2410 when the driver adjusts the sensitivity to be higher via the input part 2800 during the nighttime or in a dark place. Alternatively, when the nighttime or a dark place (or reduced illuminance) is sensed on the basis of a detection result of the sunshine sensor included in the vehicle exterior information detection part 2420, the vehicle exterior information detection unit 2400 may instruct the shooting part 2410 to increase the exposure time in the peripheral regions. Further, when an entry into a tunnel is sensed on the basis of map information or road information acquired in the navigation system, the vehicle exterior information detection unit 2400 may designate the exposure time of the peripheral regions for the shooting part 2410.

Alternatively, the headlamps are lit during the nighttime (including cloudy weather or rainy weather) or in a dark place, and thus the body system control unit 2200 may designate the exposure time of the peripheral regions for the shooting part 2410 in response to the lit headlamps. As previously described with reference to FIG. 7, the center region irradiated by the headlamps is at high luminance and can be clearly shot, but the lights emitted from the headlamps do not reach the peripheral regions, and thus the peripheral regions are shot at a higher sensitivity and in a longer exposure time. Further, the exposure time of the peripheral regions may be designated for the shooting part 2410 when the body system control unit 2200 switches the headlamps to high beam or low beam.

The peripheral regions are set at a shorter exposure time, a higher sensitivity, a higher frame rate, and a higher reading speed than the center region when recognizing a moving object. The moving object recognition rate lowers also in the center region, but the recognition rate further lowers in the peripheral regions. The exposure time is reduced, thereby reducing blur occurring in a moving object. Further, when the sensitivity is increased, shooting is enabled in a shorter exposure time, thereby reducing blur occurring in a moving object. Further, the frame rate is increased, thereby reducing blur occurring in a moving object. Furthermore, the reading speed is increased, thereby reducing focal plane distortion in a moving object.

Abnormal driving is spinning, slipping, lateral turning, and the like. Generally, spinning is that the tires slip on a road, the vehicle body rotates, and a target direction is largely different from the orientation of the vehicle, and slipping is that the tires slip but the vehicle body does not largely rotate. Similarly as in fast traveling, the frame rate is increased and the exposure time is shortened in the peripheral regions during abnormal driving thereby to emphasize the resolution of a moving object. For example, the acceleration sensor included in the vehicle state detection part 2110 detects addition of abnormal acceleration to the vehicle, or recognizes an abnormal motion of a surrounding image shot by the shooting part 2410, thereby sensing abnormal driving. Then, the vehicle exterior information detection unit 2400 may designate the frame rate and the exposure time of the peripheral regions for the shooting part 2410.

It is assumed that while traveling in a tunnel, the headlamps are lit to illuminate the center region but the lights emitted from the headlamps do not reach the peripheral regions. Thus, while traveling in a tunnel, the peripheral regions are adjusted to have a higher sensitivity and a higher frame rate than the center region. The sensitivity is increased, thereby preferably shooting the peripheral regions where the lights emitted from the headlamps do not reach. Further, the frame rate is increased, thereby reducing blur occurring in the landscapes (the walls of the tunnel) in the peripheral regions. For example, when traveling in a tunnel is determined on the basis of information of the car navigation, the vehicle exterior information detection unit 2400 may instruct the shooting part 2410 to adjust the peripheral regions to have a higher sensitivity and a higher frame rate. Alternatively, traveling in a tunnel can be recognized on the basis of a recognition result of an image shot by the vehicle-mounted camera.

Additionally, though omitted in Table 1, resolution may be included in the adjustment parameters of the shooting conditions. For example, in a case where an imaging device (described below) capable of increasing the apparent pixel size by pixel addition or thinning reading is used, the resolution can be adjusted. For example, a region where pixel addition is performed has a lower resolution but a higher sensitivity, thereby shortening the exposure time and further increasing the frame rate.

Development mode may be further included in the adjustment parameters of the shooting conditions. For example, the center region is set in a development processing mode with color reproducibility and visibility emphasized, while the peripheral regions are set in a development processing mode of performing simple development or edge emphasis in order to improve visibility of a moving object.

Figure 29:
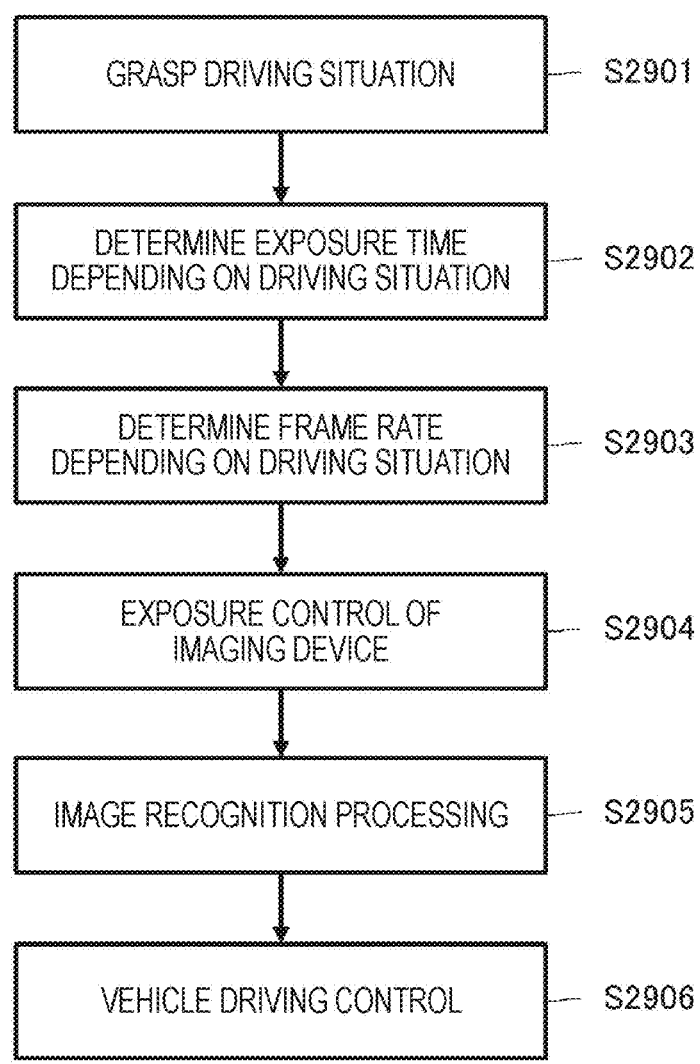
FIG. 29 is a flowchart illustrating a processing procedure of performing shooting condition control of a peripheral region depending on a driving situation.

FIG. 29 is a flowchart illustrating a processing procedure of performing shooting condition control of each region (peripheral region) depending on a driving situation on an imaging device provided with a center region and peripheral regions in a pixel region. The integrated control unit 2600 in the vehicle control system 2000 mainly executes predetermined programs, for example, so that the illustrated processing procedure is realized.

At first, a current driving situation (fast traveling, going-through/traveling downtown, traveling during the nighttime or in a dark place, appearance of a moving object, abnormal driving, traveling in a tunnel, or the like) of the vehicle is grasped on the basis of a detection result of at least one of the vehicle state detection part 2110, the vehicle exterior information detection part 2420, and the vehicle interior state detection part 2510, an analysis result of an image shot by the shooting part 2410, or the like (step S2901).

Then, the shooting conditions (exposure condition, sensitivity, frame rate, and reading speed) of the peripheral regions suitable for the driving situation are determined on the basis of Table 1, for example, (steps S2902 and 2903).

Then, the exposure processing is performed on the vehicle-mounted camera under the determined shooting conditions (step S2904).

Further, the recognition processing is performed on an image shot by the vehicle-mounted camera as described above (step S2905), and the vehicle driving control may be performed on the basis of a recognition result of the peripheral regions, or the like (step S2906). The driving control will be described below in detail.

B-5. Shooting Condition Control Using Imaging Device where Uniform-Size Pixels are Arranged There will be described herein methods for controlling the shooting conditions (exposure time, sensitivity, frame rate, and reading speed) in a case where an imaging device in which uniform-size pixels are arranged is used. The following methods are combined thereby to perform control depending on a driving situation described in B-4.

The exposure time corresponds to the shutter speed. The sensitivity of pixels needs to be improved in order to realize a short exposure time. A method for largely increasing a gain or a method for increasing an apparent pixel size by pixel addition may be employed in the imaging device in which uniform-size pixels are arranged. However, when pixel addition is performed, the resolution lowers. For example, the exposure time is shortened in the peripheral regions, thereby reducing blur occurring in the landscapes in the peripheral regions when shooting a moving object or fast driving.

Further, a method for largely increasing a gain or a method for increasing an apparent pixel size by pixel addition may be employed to increase the sensitivity in the imaging device in which uniform-size pixels are arranged. However, pixel addition causes a low resolution. When the sensitivity is increased, an object in a dark place such as during the nighttime or in a tunnel (or in the peripheral regions where the lights emitted from the headlamps do not reach) can be clearly shot. Further, if the sensitivity is high, shooting in a short exposure time is enabled, and there is consequently derived an effect that blur occurring in the landscapes in the peripheral regions can be reduced in the short exposure time when shooting a moving object or fast driving.

Further, the shooting signal processing speed has to be improved in order to increase the frame rate in the imaging device in which uniform-size pixels are arranged, but a higher frame rate can be realized by increasing the AD conversion speed or the circuit operation clock frequency. Further, the number of apparent pixels is reduced by pixel addition or thinning processing to reduce a processing load per frame, thereby realizing a higher frame rate. Further, the exposure time has to be short in order to increase the frame rate, and the sensitivity lower or the sensitivity needs to be increased. A method for improving a gain or performing pixel addition may be employed for increasing the sensitivity, for example. However, when pixel addition is performed, the resolution lowers. Additionally, the processing time per frame can be reduced due to a reduction in the number of pixels by thinning reading, but the sensitivity does not improve. When the frame rate is increased, the number of frames processed per unit time increases, and thus a motion of a moving object can be smoothly captured, thereby reducing blur occurring in the landscapes in the peripheral regions while fast driving.

Further, the shooting signal processing speed may be increased (for example, the AD conversion speed is improved by largely increasing the circuit operation clock frequency, for example) in order to increase the reading speed in the imaging device in which uniform-size pixels are arranged. When the reading speed is increased, the reading time is shortened (or the angle θ in FIG. 13 increases), thereby reducing focal plane distortion when shooting a moving object.

Additionally, pixel addition is directed to acquiring an addition signal of pixel values of a plurality of pixels with the same color in the pixel value reading processing. For example, electrons generated in each pixel to be added are accumulated in floating diffusion (FD) to be added, thereby realizing pixel addition. The pixels subjected to pixel addition are apparently one pixel. That is, the pixels subjected to pixel addition are lower in resolution, and are consequently to be pixels capable of being read at a high sensitivity and at a high reading speed. However, pixels to be subjected to pixel addition are assumed as adjacent pixels, or pixels not adjacent but in a short distance. With reference to the examples illustrated in FIG. 8 to FIG. 10, pixel addition is not performed in the center region thereby to keep the resolution high, while pixel addition is performed in the peripheral regions, thereby realizing a high sensitivity and a high frame rate in the peripheral regions.

For a color layout, the Bayer layout is typical, which is a periodic layout assuming four pixels in 2×2 as a unit layout, where two pixels in the four pixels in the unit layout are obliquely arranged as G pixels and the other two pixels are an R pixel and a B pixel. There is known, in an imaging device in the Bayer layout, a method for performing pixel addition by same-colored pixel addition/reading for adding and reading a plurality of pixels for which the color filters of the same color are adjacent in the horizontal direction or in the vertical direction, or in the horizontal direction and in the vertical direction, for example.

However, the color layout is not limited to the Bayer layout and may be other layout pattern, and in this case, pixel addition may be performed by same-colored pixel addition/reading. Here, other layout pattern is not limited to a periodic layout of unit pixels of 2×2, and may be a periodic layout of unit pixels of 3×3, 3×4, or the like.

Figure 22:
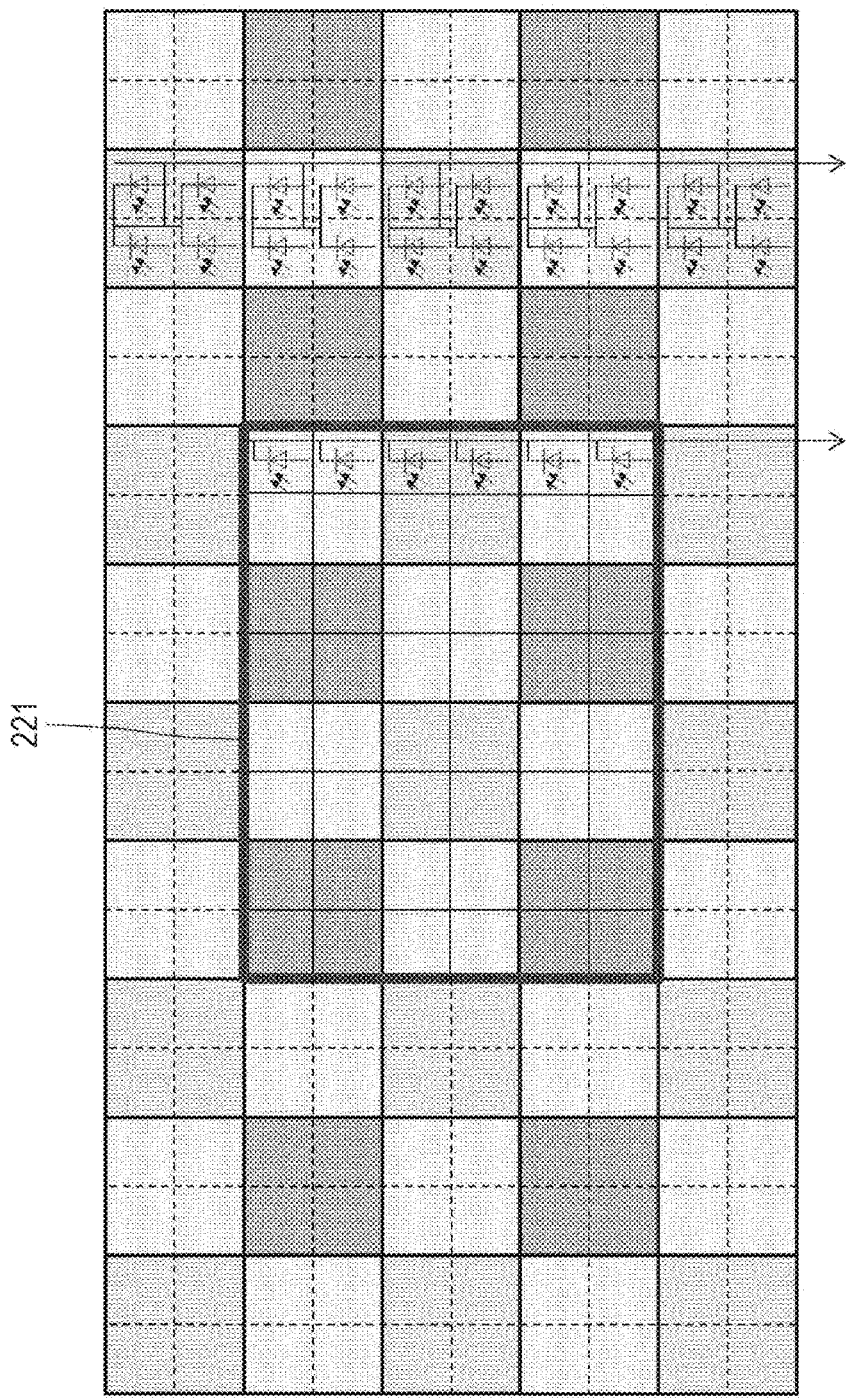
FIG. 22 is a diagram illustrating an exemplary imaging device where a pixel region is divided by pixel addition.

FIG. 22 illustrates an exemplary imaging device configured to perform region division on a pixel region by pixel addition by way of example. Each pixel of RGB is configured in 2×2 pixels, and the number of effective pixels is entirely ¼. However, a small number of pixels are drawn for the simplified Figure, but it should be understood that the pixel array is actually configured of a large number of pixels in the vertical and horizontal directions.

The inside of a region surrounded in a bold line denoted with the reference numeral 221 is a center region in FIG. 22, where pixel addition is not performed and the pixel value reading processing is performed. Thus, a shot image in the center region is kept at a high resolution. On the other hand, the peripheral region is outside the bold line 221, where 2×2 pixel addition is performed on each pixel of RGB so that each of the pixels functions as a pixel apparently in a four-time size. Therefore, the peripheral region is ¼ times lower in the resolution but is higher in the sensitivity than the center region (or than in the case of the normal pixel value reading processing without pixel addition), and is capable of being fast read. Of course, if pixel addition is not performed in the imaging device illustrated in FIG. 22, the imaging device can be used as a normal imaging device (pixel addition is not performed and all pixels are read). For example, the imaging device may be used as an imaging device configured to read all pixels during stop or normal traveling.

FIG. 22 illustrates an exemplary circuit configuration configured to add and then read charges accumulated per 2×2 pixels, but a signal read from each pixel may be subjected to the addition processing in the signal processing part. Further, FIG. 22 illustrates that region division is performed on the imaging device in the 2×2 pixel layout by pixel addition by way of example, but the technology disclosed in the present specification is not limited to a specific color filter layout. For example, the configuration for pixel addition is employed thereby to perform similar region division as described above also in imaging devices in various color layouts such as RGBIR using some of G pixels as IR (infrared sensor), RGBW including white pixels, a layout embedding phase difference pixels therein (such as layout in which some of R pixels in the 2×2 pixel layout are replaced with phase difference pixels, layout using a polarization filter for some pixels, or the like), and layout system other than the Bayer layout.

Additionally, pixel addition itself is a technology disclosed also in Patent Document 7, and is used for high-sensitivity shooting, for example. Further, the reading speed can be increased also by the thinning processing, not by pixel addition, but the sensitivity cannot be increased.

B-6. Shooting Condition Control Using Dedicated Imaging Device

There will be subsequently described methods for controlling the shooting conditions (exposure time, sensitivity, frame rate, and reading speed) in a case where a dedicated imaging device in which pixels in a different size are arranger per region of a center region and peripheral regions. Unless particularly stated, it is assumed that pixels with a smaller size and a higher resolution are arranged in the center region than in the peripheral regions, or pixels in a larger size are arranged in the peripheral regions than in the center region. The following methods are combined thereby to perform control depending on a driving situation described in B-4.

As previously described, large-size pixels have a high sensitivity and a high reading speed. Due to a high sensitivity, a short exposure time can be easily realized, and as the exposure time is longer, the sensitivity is much higher. Further, due to a shot exposure time and a high reading speed, a high frame rate can be easily realized.

The exposure time corresponds to the shutter speed. The regions where large-size pixels are arranged have a high sensitivity and thus the exposure time can be shortened. For example, the peripheral regions where large-size pixels are arranged are set at a short exposure time, thereby reducing blur occurring in the landscapes in the peripheral regions when shooting a moving object and fast driving.

Further, since the regions where large-size pixels are arranged have a high sensitivity, even if the lights emitted from the headlamps do not reach the regions while traveling during the nighttime or in a dark place, the regions are set at a long exposure time so that the sensitivity is much higher and an object can be clearly shot. Further, the sensitivity is further increased in the method for largely increasing a gain. Of course, pixel addition may be employed together.

Further, the regions where large-size pixels are arranged have a high sensitivity, and thus have a short exposure time and a high reading speed so that the frame rate can be easily increased. The AD conversion speed or the circuit operation clock frequency is increased, thereby realizing a higher frame rate. When the frame rate is increased, the number of frames processed per unit time increases, and thus a motion of a moving object can be smoothly captured, thereby reducing blur occurring in the landscapes in the peripheral regions when fast driving.

Further, the regions where large-size pixels are arranged originally have a high reading speed. The shooting signal processing speed is increased (the AD conversion speed is improved by largely increasing the circuit operation clock frequency, for example), thereby further increasing the reading speed. When the reading speed is increased, the reading time is shortened (or the angle θ in FIG. 13 increases), thereby reducing focal plane distortion when shooting a moving object.

B-7. Variation of Region Division

FIG. 8 illustrates that the pixel region 800 of the imaging device is divided into three regions such that the center region 801 is arranged almost at the center and the peripheral regions 803 and 802 are on the right and left sides of it, respectively, by way of example. The region division can be applied in a case where the shooting apparatus is installed almost at the center of the front nose of the vehicle such that the eye direction directs in the eye direction of the vehicle, for example, as illustrated in FIG. 11.

An optimum region division method is different depending on a place where the shooting apparatus is installed in the vehicle, or an orientation of the eye direction of the imaging device at its installation place (a tilt relative to the traveling direction of the vehicle).

Figure 16:
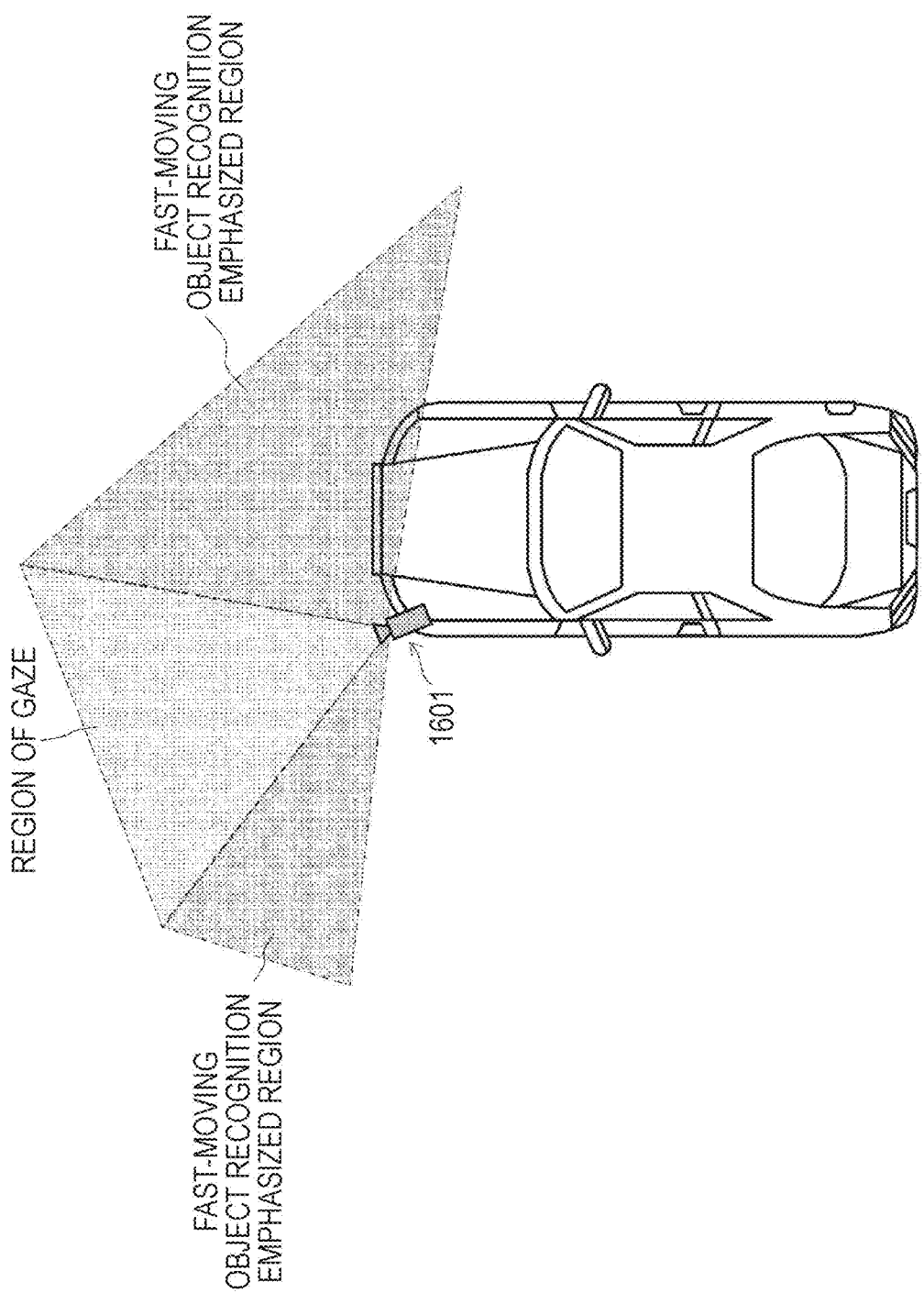
FIG. 16 is a diagram illustrating an exemplary installation place of the shooting apparatus on a vehicle.
Figure 17:
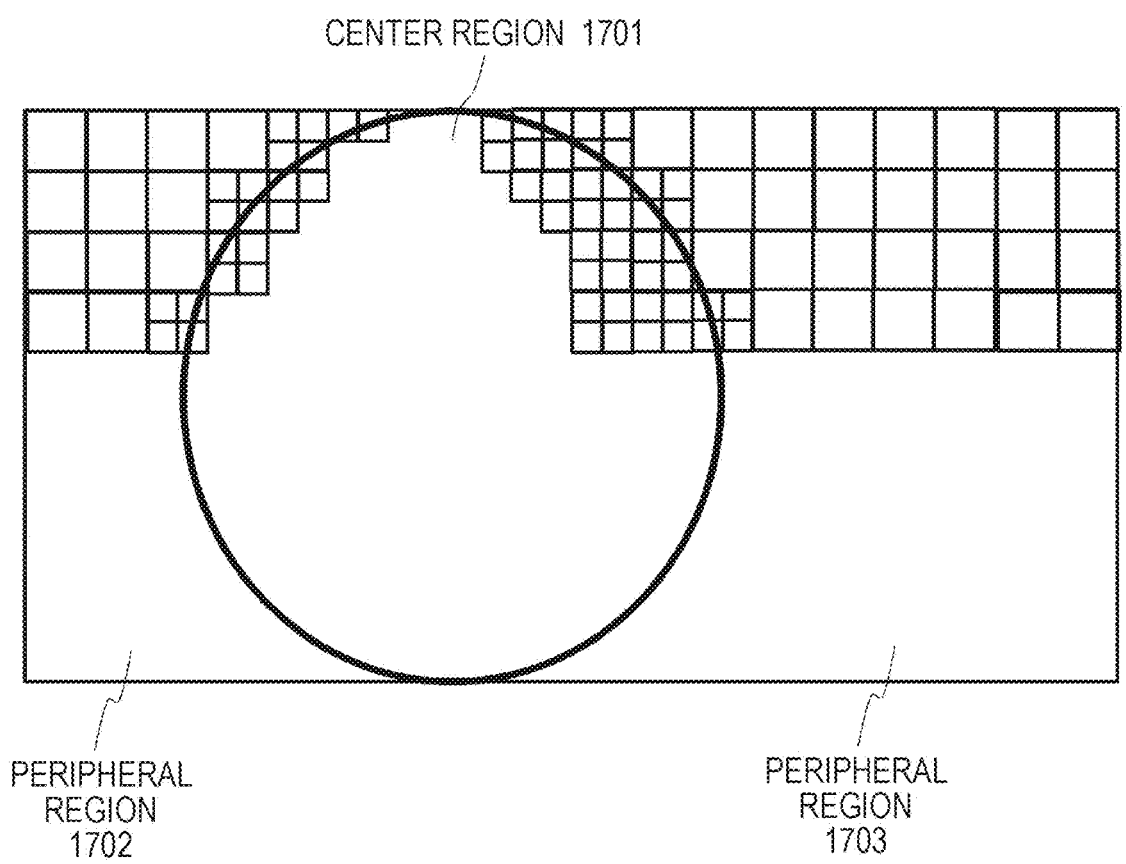
FIG. 17 is a diagram illustrating exemplary region division of a pixel region of an imaging device in a shooting apparatus 1601.

For example, in the case of a shooting apparatus which is installed near the left end of the front nose of the vehicle (or near the head of the left fender or near the left headlamp) such that the eye direction is tilted leftward from the traveling direction of the vehicle as denoted with the reference numeral 1601 in FIG. 16, it is preferable that region division is performed such that a center region 1701 with a high resolution is arranged leftward from the center of the pixel region and peripheral regions 1703 and 1702 with a low resolution (or a high sensitivity and a high reading speed) are arranged on the right and left sides of it, respectively, as illustrated in FIG. 17. The left peripheral region 1702 is narrower and the right peripheral region 1703 is wider.

Figure 18:
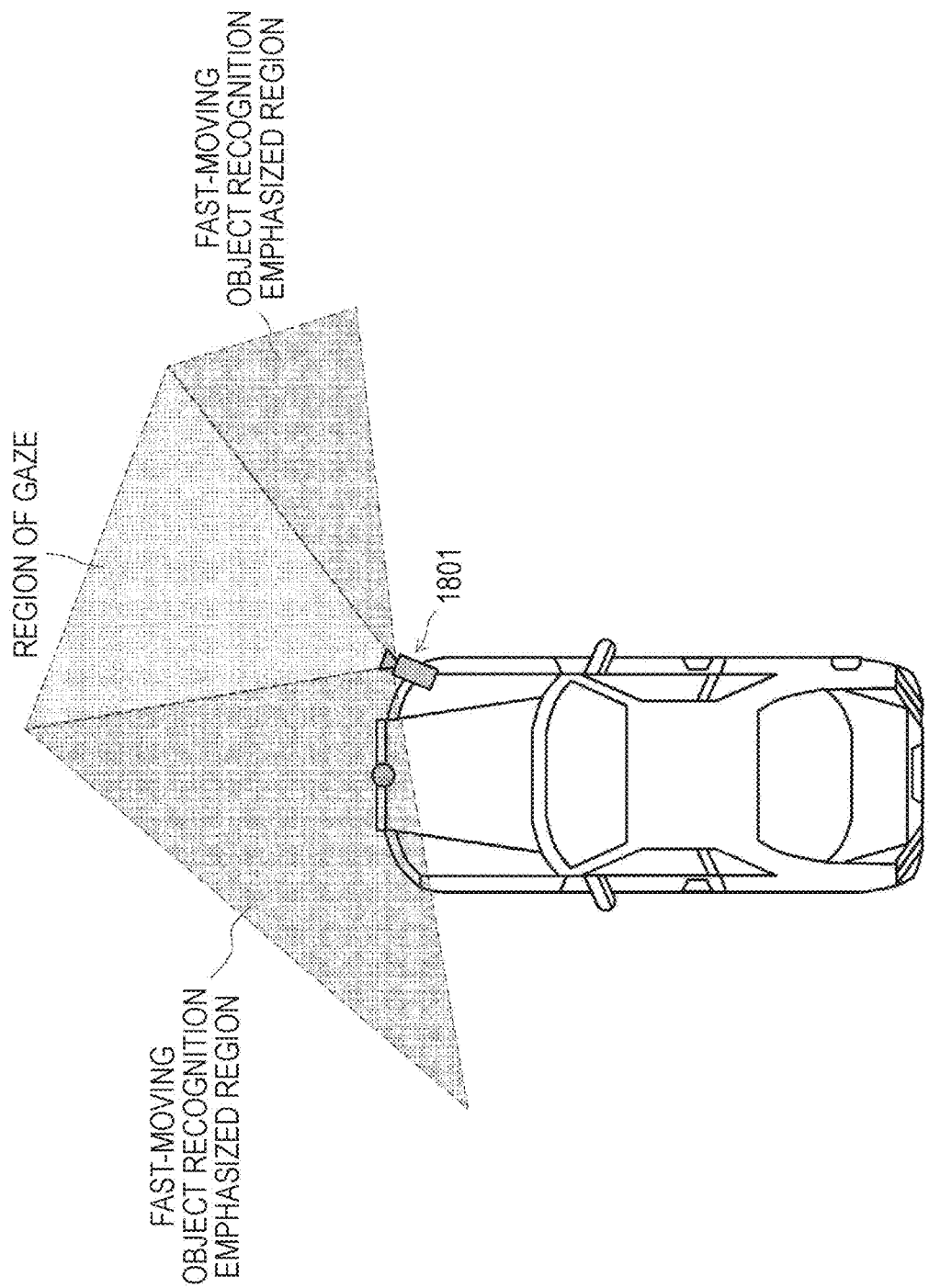
FIG. 18 is a diagram illustrating an exemplary installation place of a shooting apparatus on a vehicle.
Figure 19:
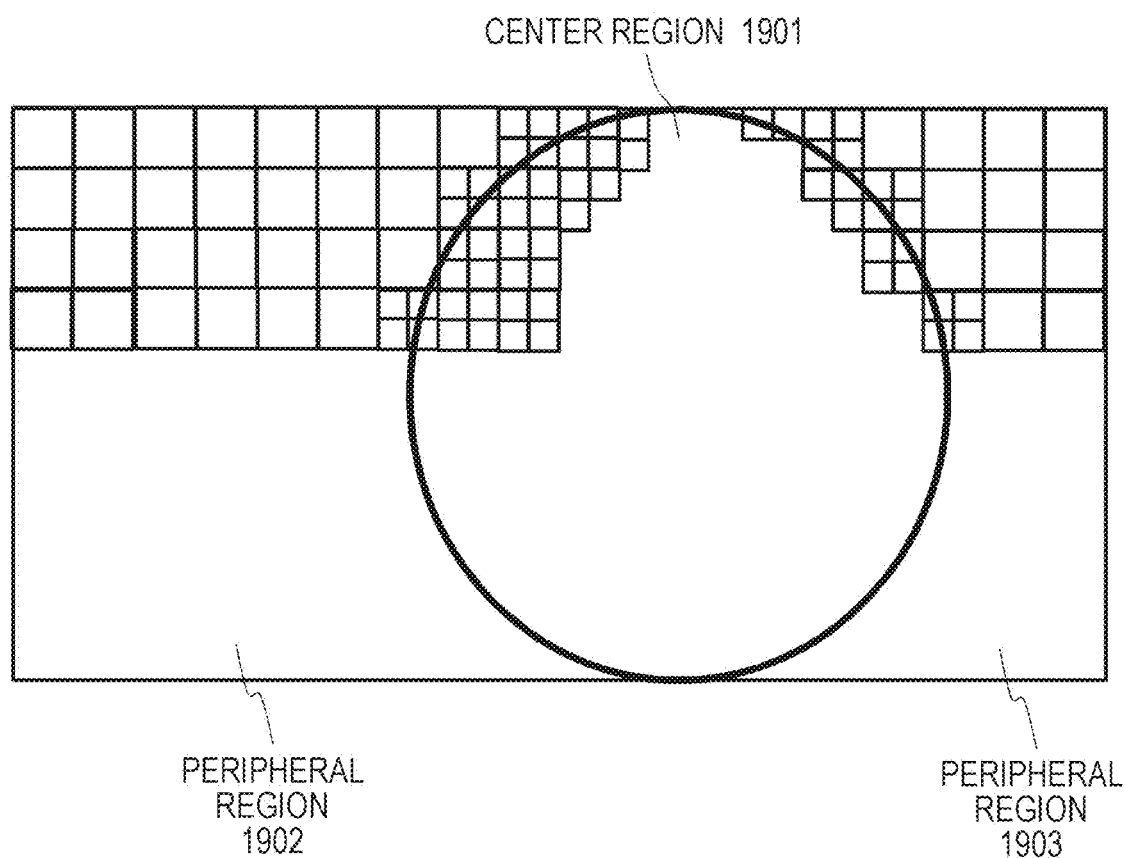
FIG. 19 is a diagram illustrating exemplary region division of a pixel region of an imaging device in a shooting apparatus 1801.

Similarly, in the case of a shooting apparatus which is arranged near the right end of the front nose of the vehicle (or near the head of the right fender or near the right headlamp) such that the eye direction is tilted rightward from the traveling direction of the vehicle as denoted with the reference numeral 1801 in FIG. 18, it is preferable that region division is performed such that a center region 1901 with a high resolution is arranged rightward from the center of the pixel region and peripheral regions 1903 and 1902 with a low resolution (or a high sensitivity and a high reading speed) are arranged on the right and left sides of it, respectively, as illustrated in FIG. 19. The left peripheral region 1902 is wider and the right peripheral region 1903 is narrower.

Figure 20:
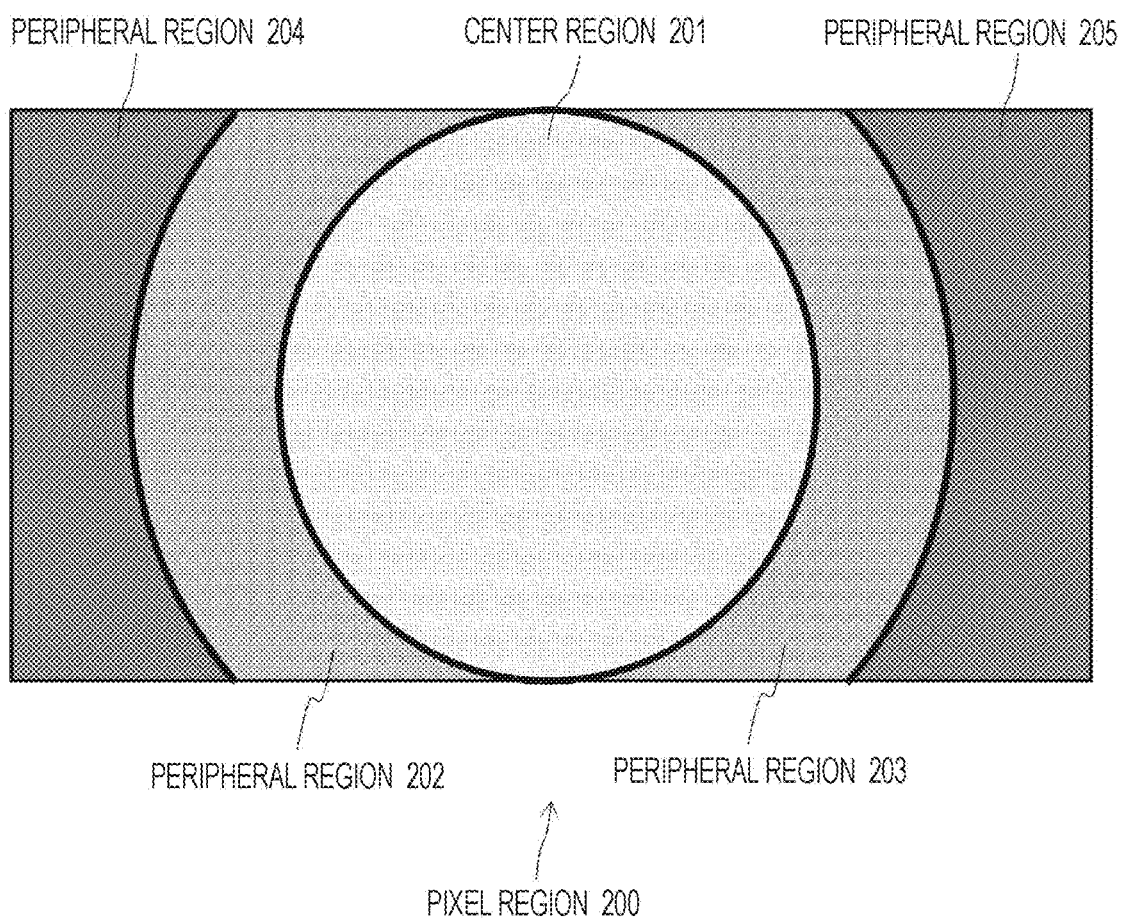
FIG. 20 is a diagram illustrating a pixel region 200 divided into three phases of peripheral regions.

Further, FIG. 8 illustrates the pixel region 800 which is configured of the high-resolution center region 801 configured of small-size pixels and the low-resolution (high sensitivity and high reading speed) peripheral regions 802 and 803 configured of large-size pixels by use of two kinds of pixels in different pixel sizes by way of example. As a variant, a pixel region 200 divided into three kinds of regions may be configured as illustrated in FIG. 20. In the Figure, the reference numeral 201 denotes a center region configured of small-size pixels, the reference numerals 202 and 203 denote first peripheral regions configured of middle-size pixels, and the reference numerals 204 and 205 denote second peripheral regions configured of large-size pixels. Though not illustrated, the pixel region divided into three or more phases of peripheral regions can be configured by use of four or more kinds of pixels in different sizes.

In a case where the pixel region is divided into a plurality of phases of peripheral regions as illustrated in FIG. 20, the pixel region is basically configured such that a farther region from the center region has a lower resolution (in other words, a higher resolution and a higher reading speed). For example, as the vehicle sped increases, the center region may be reduced, the peripheral regions may be set at a higher sensitivity or a higher frame rate, or the number of divisions of peripheral regions may be increased.

Figure 21:
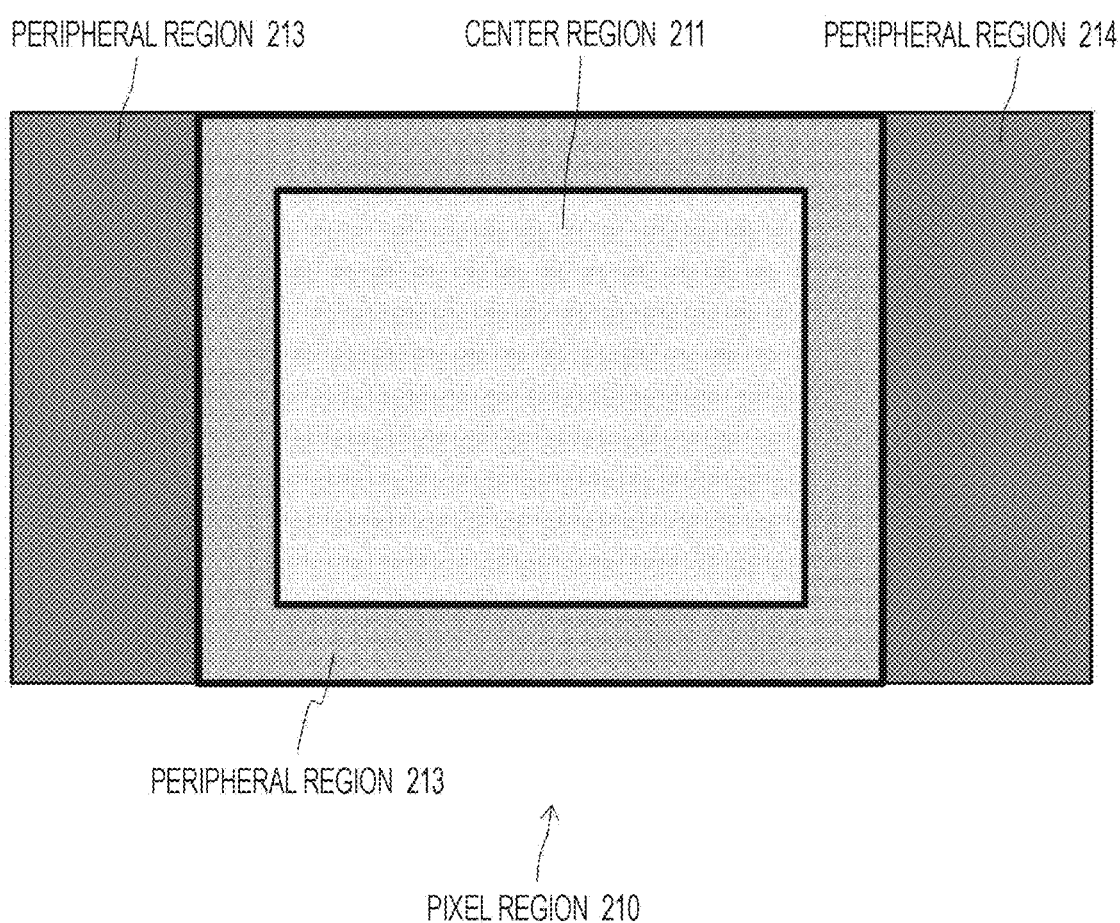
FIG. 21 is a diagram illustrating a pixel region 210 divided into rectangular regions by way of example.

Further, the shape (contour) of each divided region is not limited to circular. FIG. 21 illustrates an exemplary configuration of a pixel region 210 which is divided into a center region 211, a first peripheral region 212, and second peripheral regions 213 and 214, which are rectangular, respectively.

Additionally, the regions with a high sensitivity (or a low resolution) are drawn in thick gray in FIG. 20 and FIG. 21.

The imaging device in which the center region is leftward or rightward from the center of the pixel region illustrated in FIG. 17 or FIG. 19 may also be divided into two or more phases of peripheral regions similarly to the example illustrated in FIG. 20 or FIG. 21, and the shape of each region may be other than circular.

Also in the case of an imaging device divided into regions in a different way from those in FIG. 8 to FIG. 10, the shooting conditions (exposure time, sensitivity, frame rate, and reading speed) of each phase of peripheral region may be controlled depending on a driving situation (such as fast traveling, going-through/traveling downtown, traveling during the nighttime or in a dark place, appearance of a moving object, abnormal driving, or traveling in tunnel) of the vehicle as indicated in Table 1.

In a dedicated imaging device in which pixels in a different size are arranged per region, the arrangement of a center region and peripheral regions is fixed. To the contrary, in a case where a method for forming a center region and peripheral regions by use of a signal processing such as gain control or pixel addition is employed in an imaging device in which uniform-size pixels are arranged (see B-4), the signal processing is independently switched per region or in units of pixel, thereby flexibly and dynamically changing the position, shape, and size of each region. Further, the number of pixels to be subjected to pixel addition is changed, thereby forming any number of phases of peripheral regions as illustrated in FIG. 20 or FIG. 21 by way of example. In other words, in consideration of design or productive efficiency of pixels or on-chip lenses, the imaging device in which uniform-size pixels are arranged is more excellent than the dedicated imaging device.

In the method for applying the signal processing to the imaging device in which uniform-size pixels are arranged, the position of the center region can be moved leftward or right as illustrated in FIG. 17 or FIG. 19 depending on a place or an orientation in which the shooting apparatus is installed, for example. Further, the position, size, and shape of the center region or peripheral regions, and the number of phases of peripheral regions can be determined depending a driving situation (such as fast traveling, going-through/traveling downtown, traveling during the nighttime or in a dark place, appearance of a moving object, abnormal driving, or traveling in a tunnel) of the vehicle, and the shooting conditions (exposure time, sensitivity, frame rate, and reading speed) of each region can be adaptively and dynamically changed as indicated in Table 1.

Figure 23A:
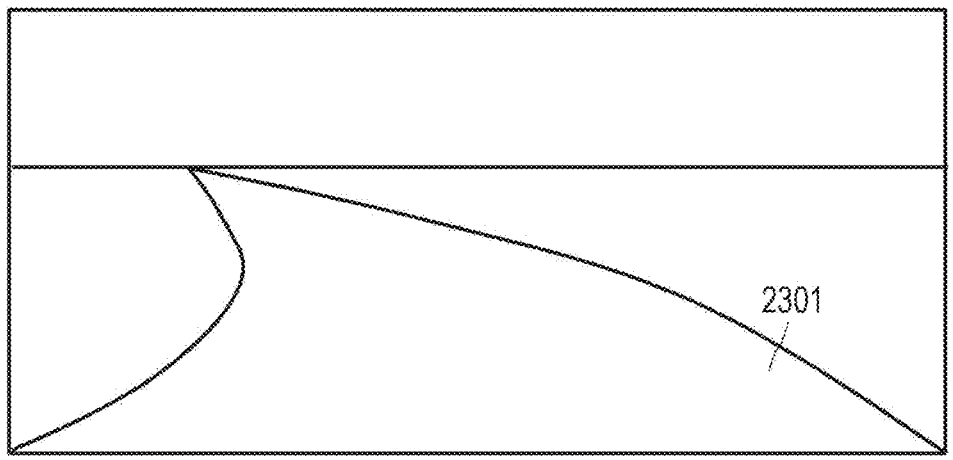
FIGS. 23A, 23B, and 23C are diagrams for explaining adaptive control of region division of a pixel region.
Figure 23B:
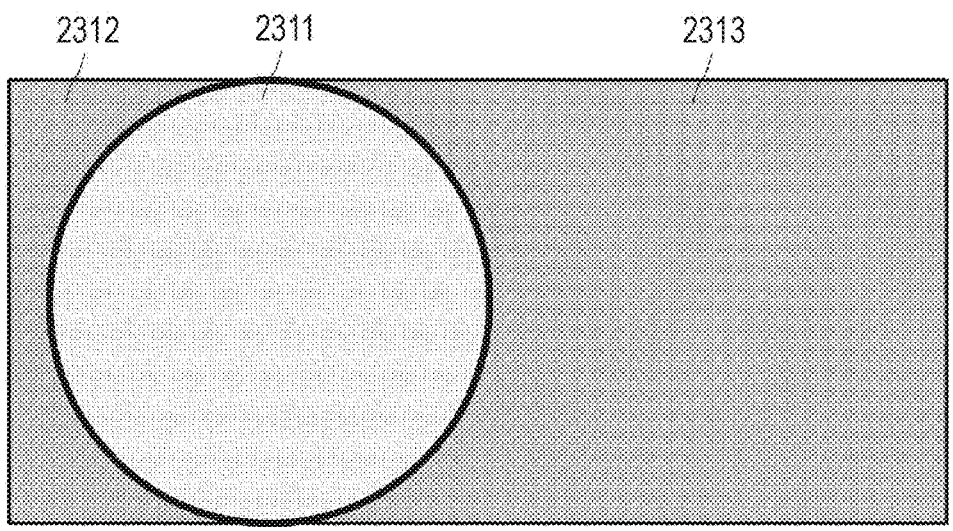

For example, when the vehicle approaches a left-hand curve 2301 as illustrated in FIG. 23A, an image shot in front of the vehicle (in the traveling direction of the vehicle) by the shooting apparatus installed almost at the center of the front node of the vehicle faster moves in the landscape (object) on the right side of the pixel region corresponding to the outer periphery of the curve 2301, and blur easily occurs therein. As the vehicle speed increases at the curve 2301, blur is more remarkable. Thus, it is preferable to change region division of the pixel region such that a center region 2311 is leftward from the center of the pixel region as illustrated in FIG. 23B. Consequently, a left peripheral region 2312 is narrower and a right peripheral region 2313 is wider. Further, the appropriate shooting conditions are not necessarily the same between the right and left peripheral regions. The right peripheral region 2313 may be set at a shorter exposure time and a higher frame rate than the left peripheral region 2312.

Whenever the steering angle of the steering wheel exceeds a certain angle, the center region 2311 may be stepwise shifted leftward. Further, as the vehicle speed increases, the amount of shift in the center region may be increased or decreased, the peripheral regions may be set at a higher sensitivity or a higher frame rate, or the number of divisions of peripheral regions may be increased.

Figure 23C:
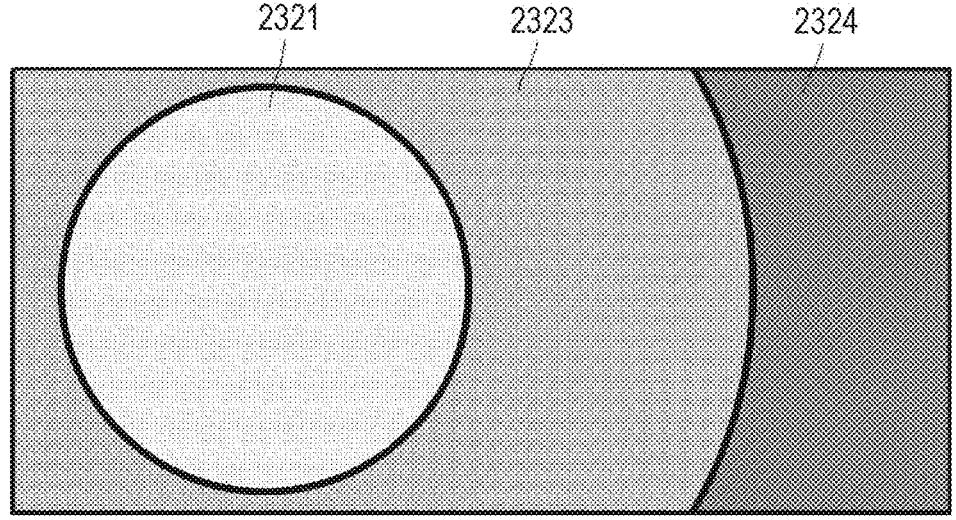

As the vehicle speed increases, an object on the outer periphery of the curve 2301 faster moves. Thus, it is preferable that a center region 2321 is smaller, the peripheral regions are divided in multi-phases (two phases of peripheral regions 2323 and 2324 in the illustrated example), and the outer peripheral region 2324 is set at a higher sensitivity and a higher reading speed (or a lower resolution) thereby to keep the object recognition rate of a moving object on the edge of the pixel region as illustrated in FIG. 23C. When the vehicle speed exceeds a certain value at the curve 2301, the peripheral regions may be set at a higher sensitivity and a higher frame rate, or the peripheral regions may be divided into multi-phases.

Figure 24A:
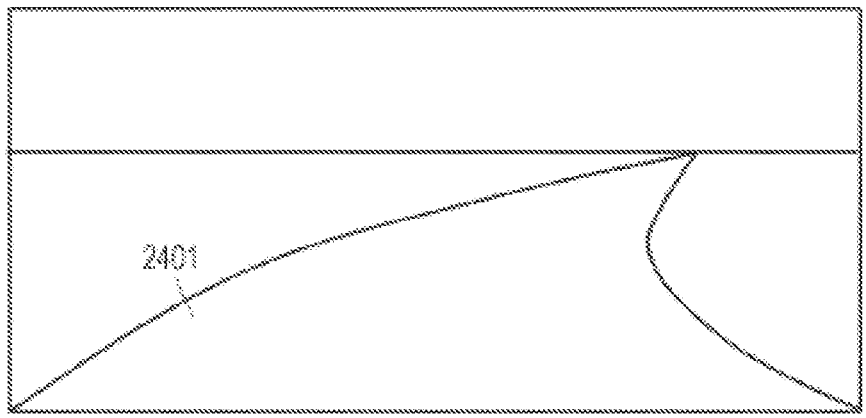
FIGS. 24A, 24B, and 24C are diagrams for explaining adaptive control of region division of a pixel region.
Figure 24B:
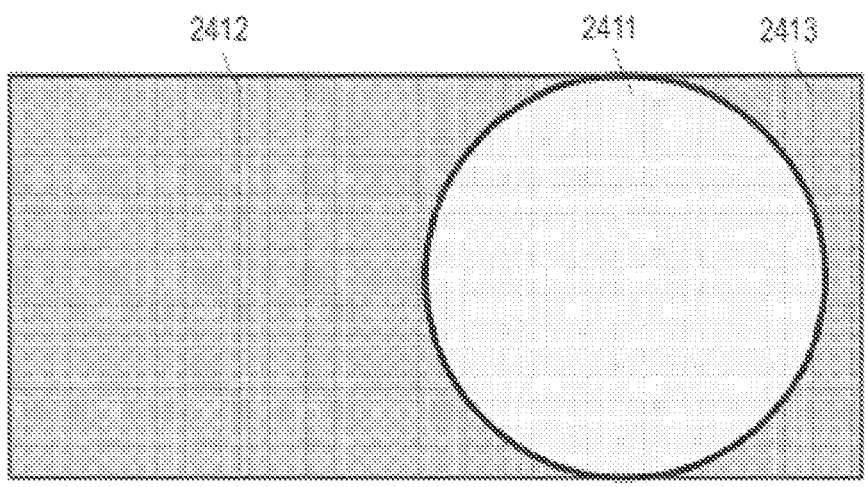

Further, when the vehicle approaches a right-hand curve 2401 as illustrated in FIG. 24A, an image shot in front of the vehicle (in the traveling direction of the vehicle) by the shooting apparatus installed almost at the center of the front nose of the vehicle faster moves in the landscape (object) on the right side of the pixel region corresponding to the outer periphery of the curve 2401, and blur easily occurs therein. As the vehicle speed increases at the curve 2401, blur is more remarkable. Thus, it is preferable to change region division of the pixel region such that a center region 2411 is rightward from the center of the pixel region as illustrated in FIG. 24B. Consequently, a right peripheral region 2413 is narrower and a left peripheral region 2412 is wider. Further, the appropriate shooting conditions are not necessarily the same between the right and left peripheral regions. The left peripheral region 2412 may be set at a shorter exposure time and a higher frame rate than the right peripheral region 2413.

Whenever the steering angle of the steering wheel exceeds a certain value, the center region 2411 may be stepwise shifted rightward. Further, as the vehicle speed increases, the amount of shift of the center region may be increased or decreased, the peripheral regions may be set at a higher sensitivity or a higher frame rate, or the number of divisions of peripheral regions may be increased.

Figure 24C:
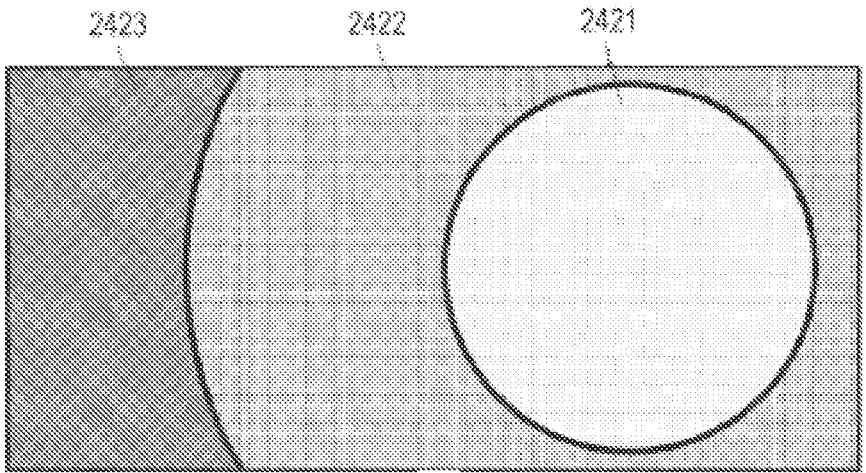

As the vehicle speed increases, an object on the other periphery of the curve 2401 faster moves. Thus, it is preferable that a center region 2421 is smaller, the peripheral regions are divided into multi-phases (two phases of peripheral regions 2422 and 2423 in the illustrated example), and the outer peripheral region 2423 is set at a higher sensitivity and a higher reading speed (or a lower resolution), thereby keeping the object recognition rate of a moving object at the edge of the pixel region as illustrated in FIG. 24C. When the vehicle speed exceeds a certain value at the curve 2401, the peripheral regions may be set at a higher sensitivity and a higher frame rate, or the peripheral regions may be divided in multi-phases.

For example, it is possible to measure an approach of the vehicle to a right-hand or left-hand curve or the vehicle speed at the time on the basis of the steering angle of the steering wheel, the engine revolutions, the rotation speed of the wheels, or the like detected by the vehicle state detection part 2110, thereby performing adaptive control of region division as illustrated in FIGS. 23A, 23B, 23C, 24A, 24B and 24C.

Figure 25A:
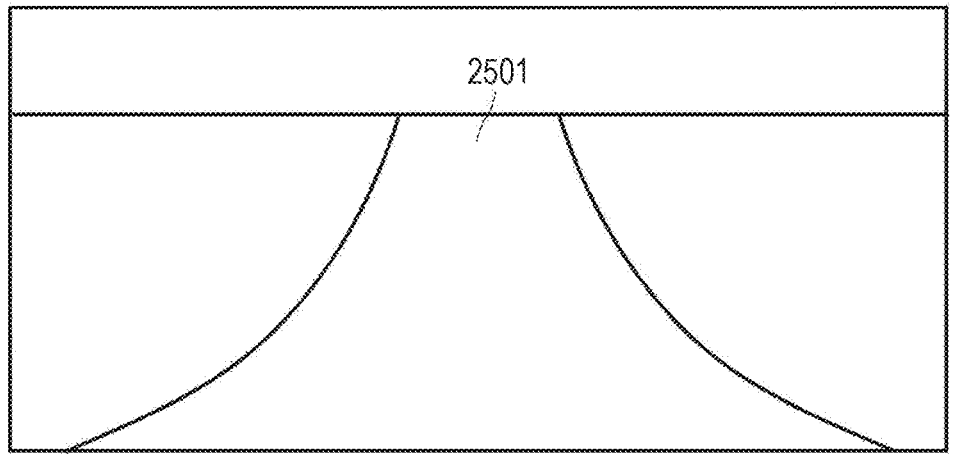
FIGS. 25A and 25B are diagrams for explaining adaptive control of region division of a pixel region.
Figure 25B:
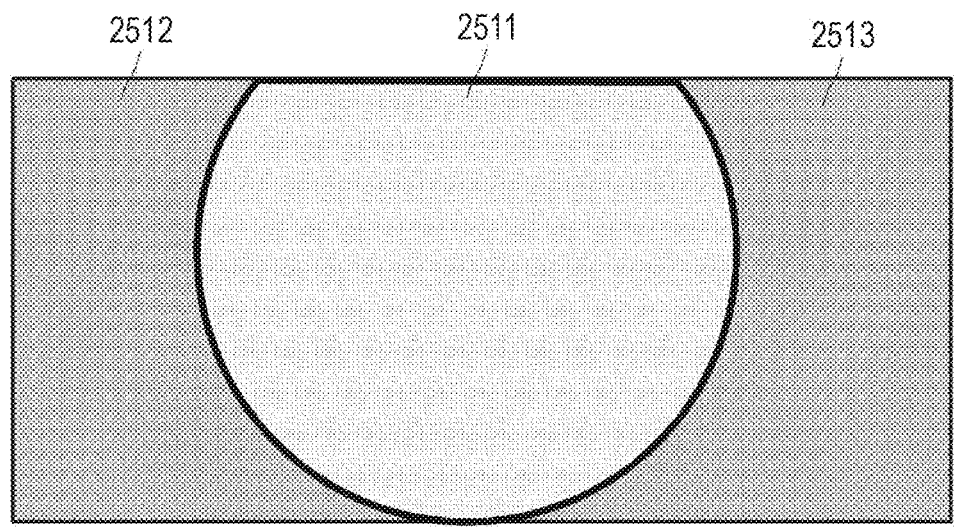

Further, when the vehicle approaches an upward slope 2501 as illustrated in FIG. 25A, a vanishing point of the upward slope 2501 in the region of gaze of the driver shifts upward from the center of the screen in an image shot in front of the vehicle (in the traveling direction of the vehicle) by the shooting apparatus installed almost at the center of the front nose of the vehicle, and the road is largely shot. Alternatively, the driver's eyes tend to direct upward. Therefore, it is preferable to shift and widen the center position of a center region 2511 upward along the upward slope 2501 as illustrated in FIG. 25B.

Figure 26A:
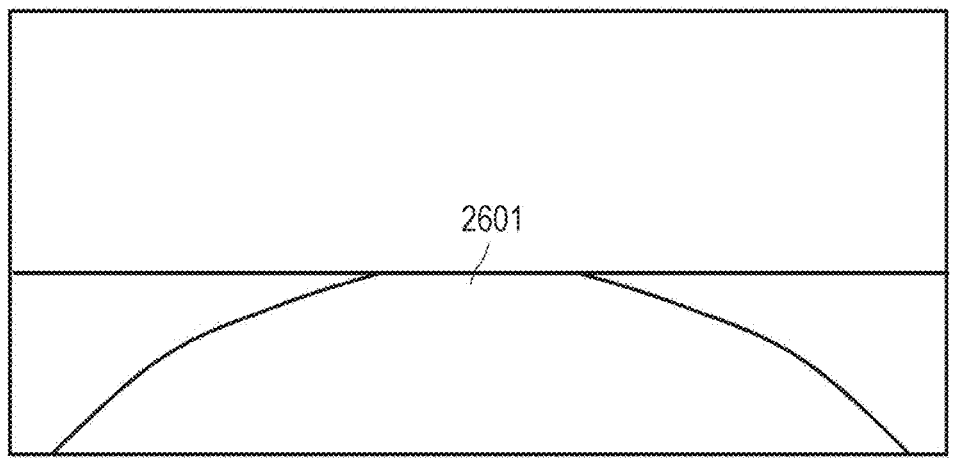
FIGS. 26A and 26B are diagrams for explaining adaptive control of region division of a pixel region.
Figure 26B:
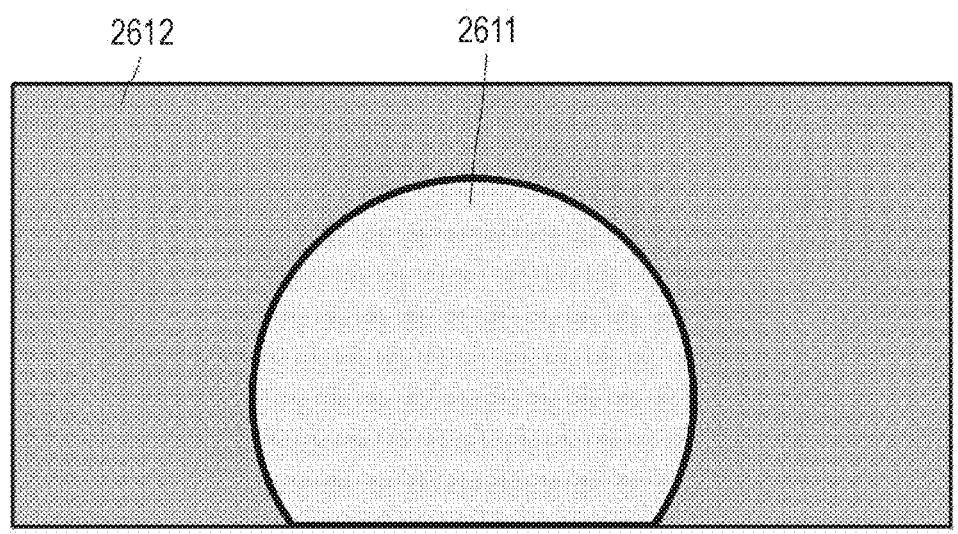

On the other hand, when the vehicle approaches a downward slope 2601 as illustrated in FIG. 26A, a vanishing point of the downward slope 2601 in the region of gaze of the driver shifts downward from the center of the screen in an image shot in front of the vehicle (in the traveling direction of the vehicle) by the shooting apparatus installed almost at the center of the front nose of the vehicle, and the road rapidly disappears. Alternatively, the driver's eyes tend to direct downward. Therefore, it is preferable to shift the center position of a center region 2611 downward along the downward slope 2601 as illustrated in FIG. 26B.

For example, it is possible to determine whether or not the vehicle is traveling on a slope on the basis of an angular speed (mainly pitch rate) of axial rotation of the vehicle body detected by the vehicle state detection part 2110, an object recognition result on a road in an image shot by the vehicle-mounted camera, map information or road information acquired in the navigation system included in the instrument panel 2730, and the like, thereby performing adaptive control of region division as illustrated in FIGS. 25A, 25B, 26A, and 26B.

Exemplary adaptive control of region division illustrated in FIGS. 23A, 23B, 23C, 24A, 24B, 24C, 25A, 25B, 26A, and 26B may define a region including a vanishing point as a center region. Therefore, a vanishing point of the vehicle-mounted camera is tracked over time on the basis of the steering angle of the steering wheel, a measurement result of the tilt around the pitch axis of the vehicle body, or the like, thereby shifting the center region to include the vanishing point. Further, the size or shape of the center region may be changed depending on the vehicle speed or other driving situation.

Further, there may be a method for defining a region including a point of gaze of the driver (or eye direction) as a center region. For example, the center position of a center region is dynamically (over time) shifted and its outer peripheral regions are also shifted to follow the point of gaze of the driver sensed on the basis of an image shot by the Dramoni camera included in the vehicle interior information detection part 2510. Alternatively, instead of shifting the center region according to the point of gaze of the driver, the vicinity of the point of gaze may be set at a higher resolution (or returned to a similar resolution to the center region instead of performing pixel addition) when the point of gaze of the driver moves toward a peripheral region. This is because an object of interest is present in the eye direction of the driver and may have to be recognized at a high resolution.

Further, when the headlamps are lit during the nighttime (including cloudy weather or rainy weather) or in a dark place, the center region irradiated by the headlamps can be clearly shot but the lights emitted from the headlamps do not reach the peripheral regions as previously described with reference to FIG. 7. Thus, the peripheral regions are shot at a high sensitivity due to pixel addition, and in a long exposure time.

Further, region division of the pixel region of the imaging device may be adaptively controlled depending on switching between high beam and low beam in the body system control unit 2200 while the headlamps are lit.

Figure 27A:
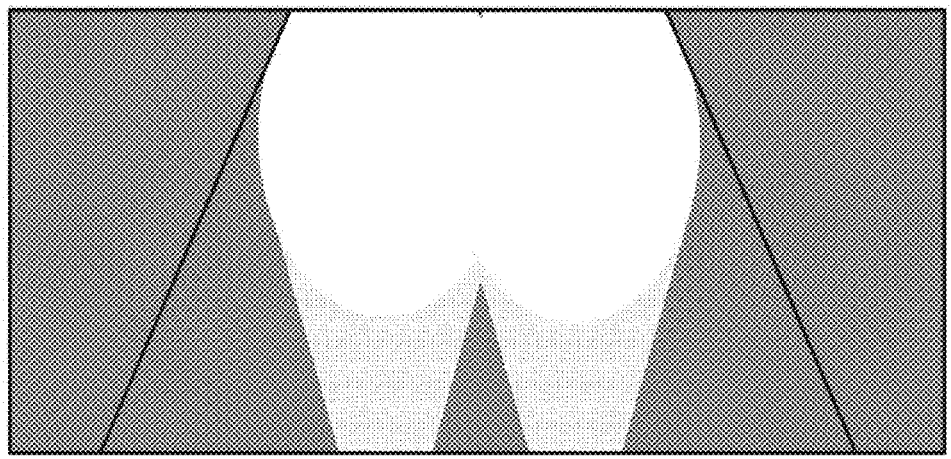
FIGS. 27A and 27B are diagrams for explaining adaptive control of region division of a pixel region.
Figure 27B:
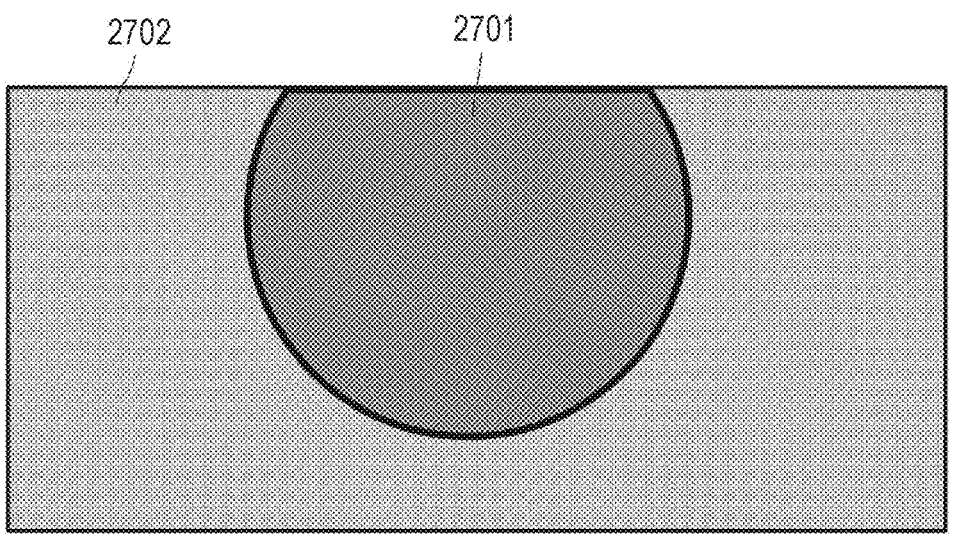

When the headlamps are switched to high beam, a high-luminance region irradiated by the headlamps shifts upward from the center of the pixel region as illustrated in FIG. 27A. Thus, it is preferable that the center position of a center region 2701 is shifted upward and the portion where the lights emitted from the headlamps does not reach is assumed as a peripheral region 2702 and can be shot at a high resolution as illustrated in FIG. 27B.

Figure 28A:
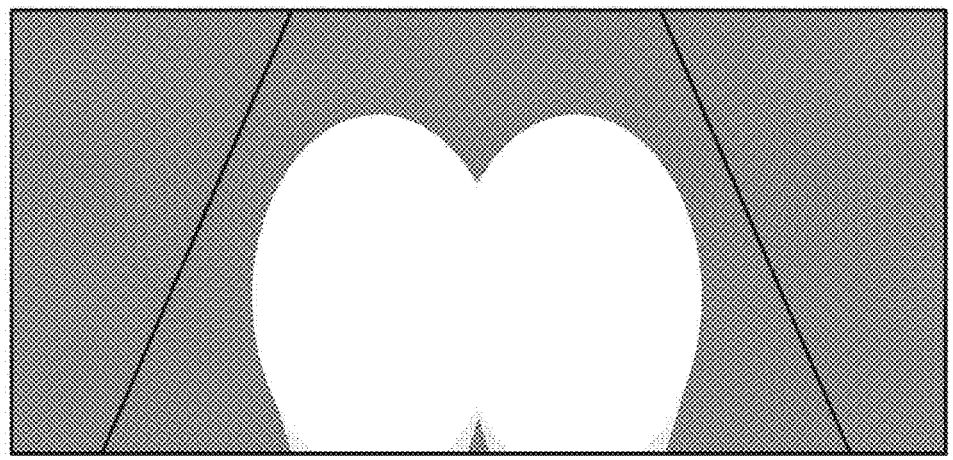
FIGS. 28A and 28B are diagrams for explaining adaptive control of region division of a pixel region.
Figure 28B:
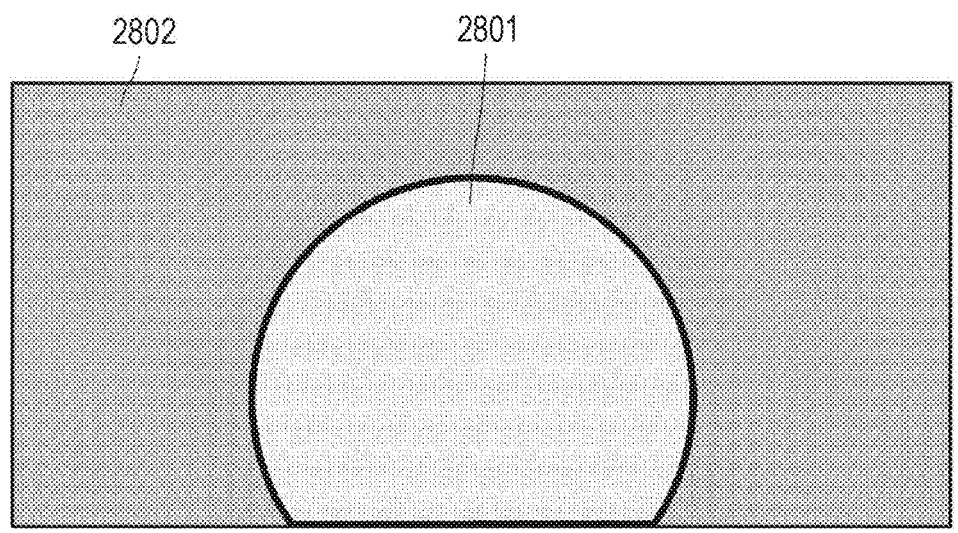

To the contrary, when the headlamps are switched to low beam, a high-luminance region irradiated by the headlamps shifts downward from the center of the pixel region as illustrated in FIG. 28A. Thus, it is preferable that the center position of a center region 2801 is shifted downward and the portion where the lights emitted from the headlamps do not reach is assumed as a peripheral region 2802 and can be shot at a high resolution as illustrated in FIG. 28B.

For example, the adaptive control of region division as illustrated in FIGS. 27A, 27B, 28A, and 28B can be performed in association with switching control between high beam and low beam of the headlamps by the body system control unit 2200.

Figure 30:
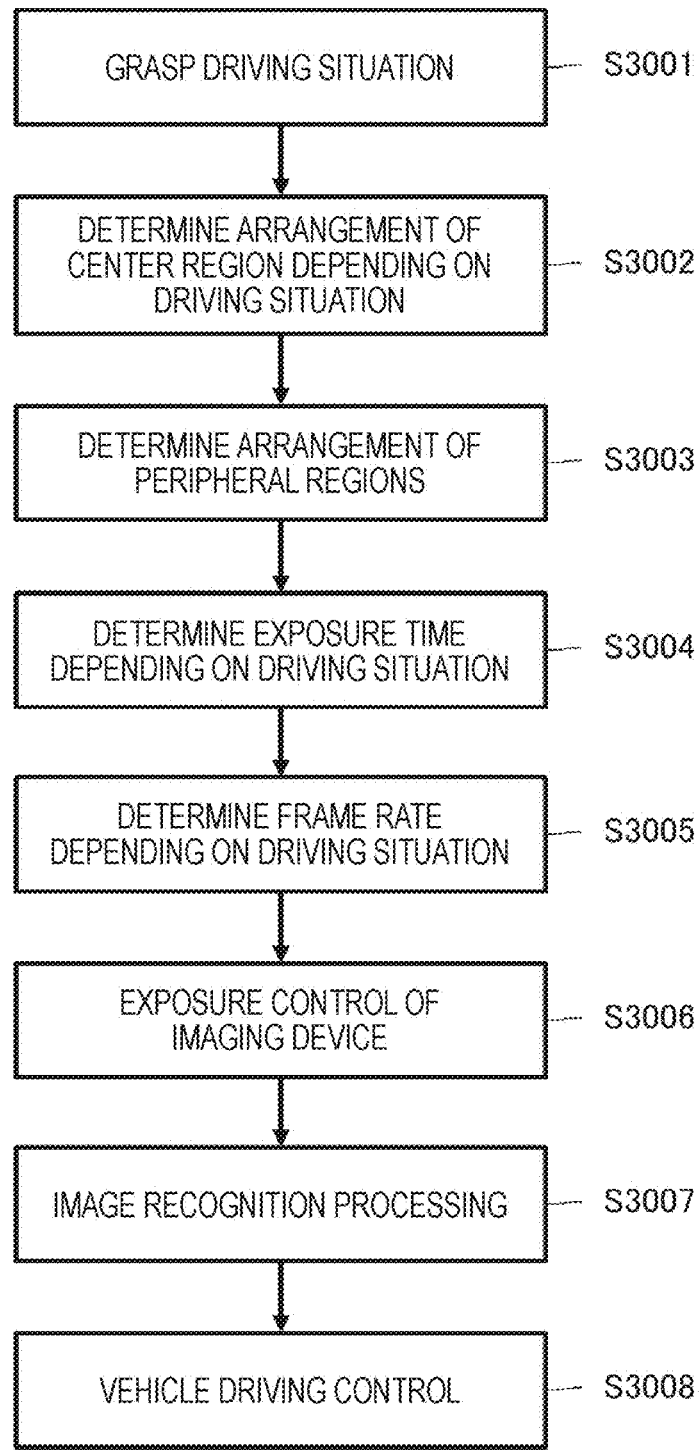
FIG. 30 is a flowchart illustrating a processing procedure of performing region division of a pixel region and shooting condition control of a peripheral region depending on a driving situation.

FIG. 30 illustrates a flowchart of a processing procedure for performing region division of a pixel region and shooting condition control of each region (peripheral region) depending on a driving situation in a shooting apparatus in which a center region and peripheral regions are provided in a pixel region by use of a signal processing such as pixel addition. The illustrated processing procedure assumes to be applied to a shooting apparatus in which uniform-size pixels are arranged, but can be performed also in a shooting apparatus in which each region is configured of pixels in a different size. Further, the integrated control unit 2600 in the vehicle control system 2000 mainly executes predetermined programs, for example, so that the illustrated processing procedure is realized.

At first, a current driving situation (such as fast traveling, going-through/traveling downtown, traveling during the nighttime or in a dark place, appearance of a moving object, abnormal driving, or traveling in a tunnel) of the vehicle is grasped on the basis of a detection result of at least one of the vehicle state detection part 2110, the vehicle exterior information detection part 2420, and the vehicle interior state detection part 2510, an analysis result of an image shot by the shooting part 2410, or the like (step S3001).

Then, the position, shape, and size of the center region suitable for the driving situation are determined (step S3002).

Then, the number of phases of peripheral regions and the position, shape, and size of each phase of peripheral region, which are suitable for the driving situation, are determined (step S3003).

Then, the shooting conditions (exposure condition, sensitivity, frame rate, and reading speed) of each phase of peripheral region suitable for the driving situation are determined on the basis of Table 1, for example (steps S3004 and 3005).

The exposure processing is then performed on the vehicle-mounted camera under the determined shooting conditions (step S3006).

The recognition processing is further performed on an image shot by the vehicle mounted camera as described above (step S3007), and vehicle driving control may be performed on the basis of a recognition result of the peripheral regions, or the like (step S3008). Driving control will be described below in detail.

B-8. Method for Using Image of Peripheral Region

According to the technology disclosed in the present specification, it is possible to improve the object recognition rate of peripheral regions in an image shot by the vehicle-mounted camera. An object recognized in a peripheral region can be used for prediction or avoidance of danger such as collision, or for driving support or driving control of the vehicle by monitoring or tracking the object.

The peripheral regions are set at a high sensitivity to be adaptively shot at a high frame rate or in a short exposure time so that the recognition rate of a road sign (road guidance) installed along a road or a road sign or lane drawn on a road can be enhanced. A recognition result of a road sign or the like can be used for safe driving support or cruise control such as lane deviation alarm, traveling speed control, and passing control.

Further, the peripheral regions are set at a high sensitivity to be adaptively shot at a high frame rate or in a short exposure time so that the recognition rate of a pedestrian, a crosswalk, or an obstacle coming into a peripheral region can be enhanced. The recognition result may be displayed inside the vehicle by use of a head-up display, instrument panel, or the like, or may be output in speech, thereby warning of a pedestrian or an obstacle.

Exemplary driving control using an image of a peripheral region will be listed.

(1) Recognition of Oncoming Vehicle or Forward-Traveling Vehicle Hazard alarm, inter-vehicle adjustment, braking control, passing control, lane change notification (2) Recognition of Bicycle or Two-Wheels
Running-out alarm, braking control, avoidance driving from danger/collision, notification to user (driver)

(3) Recognition of Pedestrian, Recognition of Crosswalk
Running-out alarm, braking control, avoidance driving from danger/collision (4) Recognition of Lane
Lane deviation alarm, cruise control (5) Recognition of Sign
Speed control, alarm (6) Recognition of Road Guidance
Speed control, navigation (7) Previous (Near-Miss) Recognition Leading to Accident
Self-recording (dashboard camera), operation of safety apparatus (such as air-bag)

B-9. Shot Image Display Method

An image shot by the shooting apparatus in which a pixel region is divided into regions can be displayed inside the vehicle by use of a head-up display or instrument panel, for example, or displayed as a recorded image on an apparatus outside the vehicle.

Further, in a case where the technology disclosed in the present specification is applied to a motorcycle, an image shot by the vehicle-mounted camera (or information acquired from images of peripheral regions or object recognition result of peripheral regions, for example) may be augmented reality (AR) displayed on the shield of a helmet which the driver wears, or the like, for example.

It may be difficult to recognize which portion is the center region or a peripheral region in an image during image display. Particularly, as described in B-7, it is remarkably difficult to grasp each divided region in a case where region division is adaptively controlled. Thus, in a case where an image shot by the shooting apparatus in which a pixel region is divided into regions is displayed, an image may be presented per divided region. Alternatively, it is desirable that the borders between regions can be visually confirmed by blending the regions, for example, when one image is displayed.

Further, a change in an image per frame is smaller in the center region as described with reference to FIG. 3. Thus, a plurality of frames in the center region may be combined and displayed. For example, a plurality of shot images of the center region are HDR-combined while changing exposure, thereby generating an image with a wide dynamic range.

INDUSTRIAL APPLICABILITY

The technology disclosed in the present specification has been described above in detail with reference to specific embodiments. However, it is clear that those skilled in the art can modify or replace the embodiments without departing from the spirit of the technology disclosed in the present specification.

The technology disclosed in the present specification can be applied to a vehicle-mounted camera installed in any eye direction at anyplace in a vehicle in order to shoot around the vehicle (outside the vehicle), such as front nose, side mirrors, rear bumper, or back door of the vehicle. Further, the technology disclosed in the present specification can be applied to digital mirror cameras.

In addition, the technology disclosed in the present specification can be applied to various vehicles such as automobile (including gasoline powered car and diesel powered car), electric-powered car, electric hybrid car, motorcycle, bicycle, and personal mobility. Further, the technology disclosed in the present specification can be applied to a shooting apparatus mounted on a mobile object (such as air plane) other than vehicles traveling on roads, or a monitoring camera.

In short, the technology disclosed in the present specification has been described by way of example, and the contents described in the present specification should not be limitedly interpreted. CLAIMS should be referred to in order to determine the spirit of the technology disclosed in the present specification.

Additionally, the technology disclosed in the present specification can take the following configurations.

(1) A shooting control apparatus including:
   a control part configured to control shooting conditions of a center region in a shooting part having a plurality of pixels to be any of a higher sensitivity, a higher frame rate, a shorter exposure time, and a higher operation frequency than peripheral regions in the shooting part.
(2) The shooting control apparatus according to (1),
   in which the control part sets the peripheral regions at a higher sensitivity than the center region.
(3) The shooting control apparatus according to (1),
   in which the control part sets the peripheral regions at a shorter exposure time than the center region.
(4) The shooting control apparatus according to (1),
   in which the control part sets the peripheral regions at a longer exposure time than the center region.
(5) The shooting control apparatus according to (1),
   in which the control part sets the peripheral regions at a higher frame rate than the center region.
(6) The shooting control apparatus according to (1),
   in which the control part performs a signal processing in the peripheral regions at a higher operation frequency than in the center region.
(7) The shooting control apparatus according to (1),
   in which the control part sets the peripheral regions at a higher sensitivity and a higher frame rate than the center region.
(8) The shooting control apparatus according to (1),
   in which the control part sets the peripheral regions at a higher sensitivity than the center region and at the same frame rate as the center region.
(9) The shooting control apparatus according to (1),
   in which the control part sets the peripheral regions at a higher sensitivity than the center region and at the same or a longer exposure time as or than the center region.
(10) The shooting control apparatus according to any of (2) to (9),
   in which the control part performs pixel addition reading or thinning reading on the peripheral regions.
(11) The shooting control apparatus according to any of (1) to (10),
   in which the control part controls shooting conditions of the peripheral regions relative to the center region depending on a place where the shooting part is mounted on a vehicle or a driving situation of the vehicle.
(12) The shooting control apparatus according to any of (1) to (11),
   in which the control part controls at least one of the position, the shape, and the size of the center region depending on a place where the shooting part is mounted on a vehicle or a driving situation of the vehicle.
(13) The shooting control apparatus according to any of (1) to (12),
   in which the control part controls at least one of the number of phases of the peripheral regions, the position, the shape, and the size of each peripheral region depending on a driving situation of a vehicle mounting the shooting part thereon.
(14) A shooting control method including:
   a control step of controlling shooting conditions of a center region in a shooting part having a plurality of pixels to be any of a higher sensitivity, a higher frame rate, a shorter exposure time, and a higher operation frequency than peripheral regions in the shooting part.
(15) A shooting apparatus including:
   an imaging device including a center region, and peripheral regions configured of larger-size pixels than the center region.
(16) The shooting apparatus according to (15),
   in which each of the center region and the peripheral regions is scanned in parallel.
(17) The shooting apparatus according to (15), further including:
   a signal processing part configured to perform pixel reading and an AD conversion processing for each of the center region and the peripheral regions.
(18) The shooting apparatus according to (15),
   in which the peripheral regions are set at a shorter exposure time than the center region.
(19) The shooting apparatus according to (15),
   in which the peripheral regions are set at a higher frame rate than the center region.
(20) The shooting apparatus according to (15),
   in which at least one of an exposure time or a frame rate of the peripheral regions is controlled relative to the center region depending on a driving situation of a vehicle mounting the shooting apparatus thereon.

REFERENCE SIGNS LIST

2000 Vehicle control system
2010 Communication network
2100 Drive system control unit
2110 Vehicle state detection part
2200 Body system control unit
2300 Battery control unit
2310 Battery apparatus
2400 Vehicle exterior information detection unit
2410 Shooting part
2420 Vehicle exterior information detection part
2500 Vehicle interior information detection unit
2510 Vehicle interior state detection part
2600 Integrated control unit
2610 Microcomputer 2620 General-purpose communication interface
2630 Dedicated communication interface
2640 Positioning part
2650 Beacon reception part
2660 In-vehicle device interface
2670 Speech/image output part
2680 Vehicle-mounted network interface
2690 Storage part
2710 Audio speaker
2720 Display part
2730 Instrument panel
2760 In-vehicle device
2800 Input part
2900 Vehicle
2910, 2912, 2914, 2916, 2918 Shooting part
2920, 2922, 2924 Vehicle exterior information detection part
2926, 2928, 2930 Vehicle exterior information detection part
3100 Camera module
3110 Camera control part
3111 Shooting lens
3120 Imaging device
3130 Image processing part
3140 Phase difference detection part
3150 Display processing part
3160 Display part
3170 Image output part
3180 Image recording control part
3210 Timing control circuit
3220 Row scanning circuit
3230 Transfer signal generation circuit
3240 Pixel array part
3241 Phase difference pixel
3242 Normal pixel
3250 D/A conversion part
3260 A/D conversion part
3262 Comparator
3263 Memory
3270 Counter
3290 Column scanning circuit

The invention claimed is:

1. A shooting control apparatus, comprising:
a control part configured to:
determine a driving situation of a vehicle on which a shooting part is mounted, wherein
the shooting part includes a center region and a plurality of peripheral regions;
change a number of the plurality of peripheral regions and at least one of an exposure time or a frame rate of the plurality of peripheral regions relative to the center region of the shooting part based on the determined driving situation, wherein the plurality of peripheral regions is divided into a plurality of regions each having a different pixel size; and
control shooting conditions of each region of the plurality of regions based on the determined driving situation.

2. The shooting control apparatus according to claim 1, wherein the control part is further configured to set the plurality of peripheral regions at a higher sensitivity than the center region.

3. The shooting control apparatus according to claim 1, wherein the control part is further configured to set the plurality of peripheral regions at a shorter exposure time than the center region.

4. The shooting control apparatus according to claim 1, wherein the control part is further configured to set the plurality of peripheral regions at a longer exposure time than the center region.

5. The shooting control apparatus according to claim 1, wherein the control part is further configured to set the plurality of peripheral regions at a higher frame rate than the center region.

6. The shooting control apparatus according to claim 1, wherein the control part is further configured to execute a signal processing in the plurality of peripheral regions at a higher operation frequency than in the center region.

7. The shooting control apparatus according to claim 1, wherein the control part is further configured to set the plurality of peripheral regions at a higher sensitivity and a higher frame rate than the center region.

8. The shooting control apparatus according to claim 1, wherein the control part is further configured to:
set the plurality of peripheral regions at a higher sensitivity than the center region; and
set the plurality of peripheral regions at a same frame rate as the center region.

9. The shooting control apparatus according to claim 1, wherein the control part is further configured to:
set the plurality of peripheral regions at a higher sensitivity than the center region; and
set the plurality of peripheral regions at one of a same exposure time as the center region or a longer exposure time as or than the center region.

10. The shooting control apparatus according to claim 2, wherein the control part is further configured to execute pixel addition reading or thinning reading in the plurality of peripheral regions.

11. The shooting control apparatus according to claim 1, wherein the control part is further configured to control shooting conditions of the plurality of peripheral regions relative to the center region based on one of a place where the shooting part is mounted on the vehicle or the determined driving situation of the vehicle.

12. The shooting control apparatus according to claim 1, wherein the control part is further configured to control at least one of a position, a shape, or a size of the center region based on one of a place where the shooting part is mounted on the vehicle or the determined driving situation of the vehicle.

13. The shooting control apparatus according to claim 1, wherein the control part is further configured to control at least one of a number of phases of the plurality of peripheral regions, a position, a shape, or a size of each peripheral region of the plurality of peripheral regions based on the determined driving situation of the vehicle.

14. A shooting control method, comprising:
determining a driving situation of a vehicle on which a shooting part is mounted, wherein
the shooting part includes a center region and a plurality of peripheral regions;
changing a number of the plurality of peripheral regions and at least one of an exposure time or a frame rate of the plurality of peripheral regions relative to the center region of the shooting part based on the determined driving situation, wherein the plurality of peripheral regions is divided into a plurality of regions each having a different pixel size; and
controlling shooting conditions of each region of the plurality of regions based on the determined driving situation.

15. A shooting apparatus, comprising:
an imaging device includes:
  a center region; and
a plurality of peripheral regions, wherein
  the plurality of peripheral regions has larger-size pixels than the center region,
  a number of the plurality of peripheral regions is changed based on a driving situation of a vehicle on which the shooting apparatus is mounted,
  at least one of an at least one of an exposure time or frame rate of the plurality of peripheral regions is changed relative to the center region of the imaging device,
  the plurality of peripheral regions is divided into a plurality of regions each having a different pixel size, and
  shooting conditions of each region of the plurality of regions is controlled based on the driving situation.

16. The shooting apparatus according to claim 15, wherein each of the center region and the plurality of peripheral regions is scanned in parallel.

17. The shooting apparatus according to claim 15, further comprising
  a signal processing part configured to execute a pixel reading process and an AD conversion process for each of the center region and the plurality of peripheral regions.

18. The shooting apparatus according to claim 15, wherein the plurality of peripheral regions is set at a shorter exposure time than the center region.

19. The shooting apparatus according to claim 15, wherein the plurality of peripheral regions is set at a higher frame rate than the center region.

* * * * *